US012305529B1

(12) United States Patent
Pastor et al.

(10) Patent No.: US 12,305,529 B1
(45) Date of Patent: May 20, 2025

(54) COMPRESSOR STATOR VANE AIRFOILS

(71) Applicant: GE Infrastructure Technology LLC, Greenville, SC (US)

(72) Inventors: Grady Pastor, Greenville, SC (US); Matthew John McKeever, Greer, SC (US); Matthew David Turner, Greenville, SC (US); Juliano Avolio, Greenville, SC (US); Kevin Michael Barnett, Greenville, SC (US); Karan Ghule, Bengaluru (IN); Kashif Akhtar, Bengaluru (IN)

(73) Assignee: GE Vernova Infrastructure Technology LLC, Greenville, SC (US)

( * ) Notice: Subject to any disclaimer, the term of this patent is extended or adjusted under 35 U.S.C. 154(b) by 0 days.

(21) Appl. No.: 18/669,669

(22) Filed: May 21, 2024

(51) Int. Cl.
*F01D 5/14* (2006.01)
*F01D 9/04* (2006.01)

(52) U.S. Cl.
CPC ............ *F01D 5/141* (2013.01); *F01D 9/041* (2013.01); *F05D 2220/32* (2013.01); *F05D 2240/12* (2013.01); *F05D 2240/301* (2013.01); *F05D 2240/303* (2013.01); *F05D 2240/304* (2013.01); *F05D 2250/74* (2013.01)

(58) Field of Classification Search
CPC ........ F01D 5/141; F01D 9/041; F04D 29/324; F04D 29/544; F05D 2220/30; F05D 2220/32; F05D 2240/12; F05D 2250/74
See application file for complete search history.

(56) References Cited

U.S. PATENT DOCUMENTS 5,980,209 A 11/1999 Barry et al.
6,503,054 B1 * 1/2003 Bielek ..................... F01D 5/141 415/191
6,685,434 B1 * 2/2004 Humanchuk ........... F01D 5/141 416/DIG. 2
6,779,980 B1 * 8/2004 Brittingham ............ F01D 5/187 416/243
7,063,509 B2 * 6/2006 Snook ..................... F01D 5/141 416/189
7,249,933 B2 * 7/2007 Lee ......................... F01D 5/143 416/193 A
7,467,920 B2 * 12/2008 Sullivan .................. F01D 5/141 416/243
8,807,950 B2 * 8/2014 Bielek ..................... F01D 5/142 416/243
9,017,019 B2 4/2015 McKeever et al.
(Continued)

*Primary Examiner* — Brian Christopher Delrue
(74) *Attorney, Agent, or Firm* — Dority & Manning, P.A.

(57) ABSTRACT

A stator vane includes an airfoil having an airfoil shape. The airfoil shape has a nominal profile substantially in accordance with Cartesian coordinate values of X, Y, and Z set forth in one of TABLE I, TABLE II, or TABLE III. The Cartesian coordinate values of X, Y, and Z are defined relative to a point data origin at a base of the airfoil. The Cartesian coordinate values of X, Y, and Z are non-dimensional values that are convertible to dimensional distances expressed in a unit of distance by multiplying the Cartesian coordinate values of X, Y, and Z by a scaling factor of the airfoil in the unit of distance. The X and Y values are connected by smooth continuing arcs to define airfoil profile sections at each Z value. The airfoil profile sections at Z values are joined smoothly with one another to form a complete airfoil shape.

19 Claims, 4 Drawing Sheets

(56) References Cited

U.S. PATENT DOCUMENTS

| | | | | |
|---|---|---|---|---|
| 9,957,805 | B2 * | 5/2018 | Soni | F01D 5/20 |
| 10,087,952 | B2 * | 10/2018 | Dutka | F01D 5/141 |
| 10,533,440 | B2 * | 1/2020 | Brozyna | F01D 9/041 |

* cited by examiner

COMPRESSOR STATOR VANE AIRFOILS

FIELD

The present disclosure relates to an airfoil for a compressor stator vane disposed within a stage of a compressor section of a land-based gas turbine system and, more particularly, relates to a shape defining a profile for an airfoil of a compressor stator vane. Airfoils having the shapes defined herein may be used in the fifth compressor stage, the sixth compressor stage, and the seventh compressor stage.

BACKGROUND

Some simple cycle or combined cycle power plant systems employ turbomachines in their design and operation. Generally, turbomachines employ airfoils (e.g., stator vanes or nozzles and rotor blades), which during operation are exposed to fluid flows. These airfoils are configured to aerodynamically interact with the fluid flows and to transfer energy to or from these fluid flows as part of power generation. For example, the airfoils may be used to compress fluid, to create thrust, to convert kinetic energy to mechanical energy, and/or to convert thermal energy to mechanical energy. As a result of these interactions and conversions, the aerodynamic characteristics of these airfoils may result in losses that have an impact on system and turbine operation, performance, thrust, efficiency, and power.

BRIEF DESCRIPTION

Aspects and advantages of the stator vanes and turbomachines in accordance with the present disclosure will be set forth in part in the following description, or may be obvious from the description, or may be learned through practice of the technology.

In accordance with one embodiment, a stator vane is provided. A stator vane includes an airfoil having an airfoil shape. The airfoil shape has a nominal profile substantially in accordance with Cartesian coordinate values of X, Y, and Z set forth in one of TABLE I, TABLE II, or TABLE III. The Cartesian coordinate values of X, Y, and Z are defined relative to a point data origin at a base of the airfoil. The Cartesian coordinate values of X, Y, and Z are non-dimensional values that are convertible to dimensional distances expressed in a unit of distance by multiplying the Cartesian coordinate values of X, Y, and Z by a scaling factor of the airfoil in the unit of distance. The X and Y values are connected by smooth continuing arcs to define airfoil profile sections at each Z value. The airfoil profile sections at Z values are joined smoothly with one another to form a complete airfoil shape.

In accordance with another embodiment, a stator vane is provided. The stator vane includes an airfoil having a nominal suction-side profile substantially in accordance with suction-side Cartesian coordinate values of X, Y, and Z set forth in one of TABLE I, TABLE II, or TABLE III. The Cartesian coordinate values of X, Y, and Z are defined relative to a point data origin at a base of the airfoil. The Cartesian coordinate values of X, Y, and Z are non-dimensional values that are convertible to dimensional distances expressed in a unit of distance by multiplying the Cartesian coordinate values of X, Y, and Z by a scaling factor of the airfoil in the unit of distance. The X and Y values are connected by smooth continuing arcs to define suction-side profile sections at each Z value. The suction-side profile sections at the Z values are joined smoothly with one another to form a complete airfoil suction-side shape.

In accordance with yet another embodiment, a turbomachine is provided. The turbomachine includes a compressor section, a turbine section downstream from the compressor section, and a combustion section downstream from the compressor section and upstream from the turbine section. A stator vane is disposed within the compressor section. The stator vane includes an airfoil having an airfoil shape. The airfoil shape has a nominal profile substantially in accordance with Cartesian coordinate values of X, Y, and Z set forth in one of TABLE I, TABLE II, or TABLE III. The Cartesian coordinate values of X, Y, and Z are defined relative to a point data origin at a base of the airfoil. The Cartesian coordinate values of X, Y, and Z are non-dimensional values that are convertible to dimensional distances expressed in a unit of distance by multiplying the Cartesian coordinate values of X, Y, and Z by a scaling factor of the airfoil in the unit of distance. The X and Y values are connected by smooth continuing arcs to define airfoil profile sections at each Z value. The airfoil profile sections at Z values are joined smoothly with one another to form a complete airfoil shape.

These and other features, aspects and advantages of the present stator vanes and turbomachines will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present stator vanes and turbomachines, including the best mode of making and using the present systems and methods, directed to one of ordinary skill in the art, is set forth in the specification, which makes reference to the appended figures, in which.

DETAILED DESCRIPTION

Figure 1:
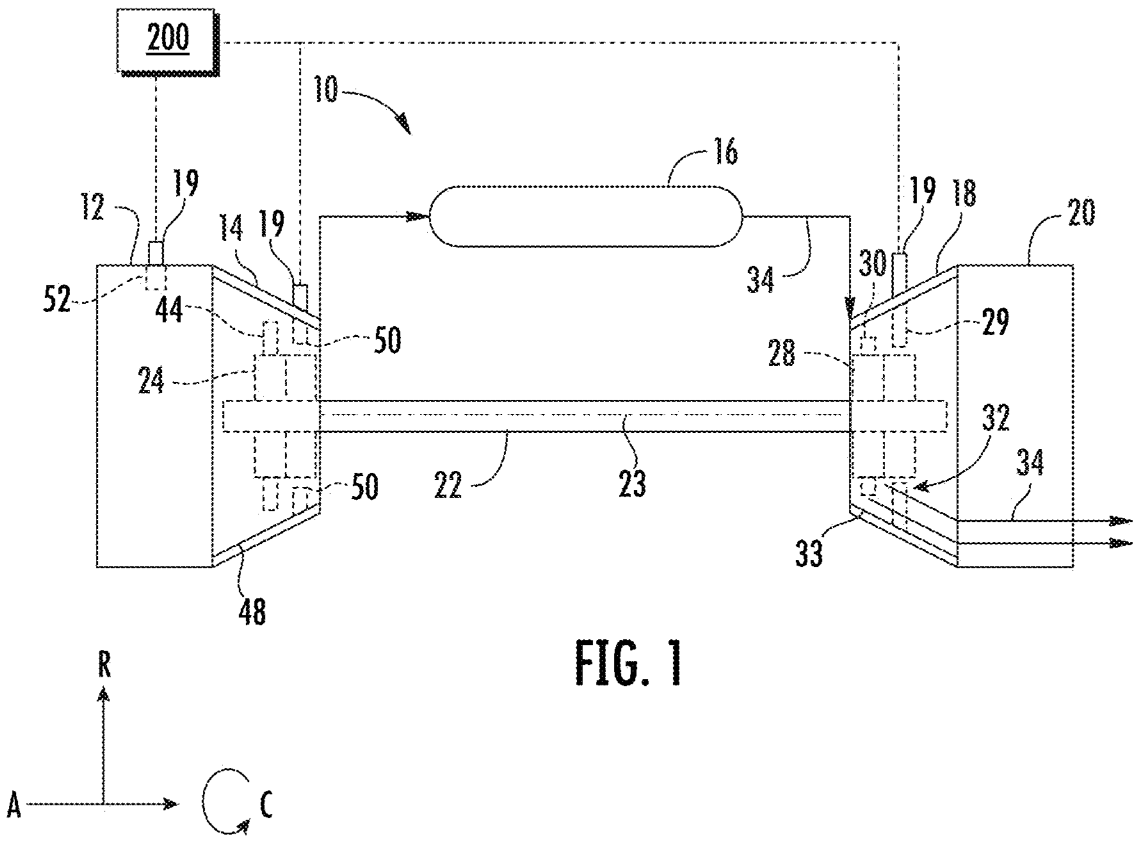
FIG. 1 is a schematic illustration of a turbomachine in accordance with embodiments of the present disclosure.

Reference now will be made in detail to embodiments of the present stator vanes and turbomachines, one or more examples of which are illustrated in the drawings. Each example is provided by way of explanation, rather than limitation of, the technology. In fact, it will be apparent to those skilled in the art that modifications and variations can be made in the present technology without departing from the scope or spirit of the claimed technology. For instance, features illustrated or described as part of one embodiment can be used with another embodiment to yield a still further embodiment. Thus, it is intended that the present disclosure covers such modifications and variations as come within the scope of the appended claims and their equivalents.

The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components.

As used herein, the terms "upstream" (or "forward") and "downstream" (or "aft") refer to the relative direction with respect to fluid flow in a fluid pathway. For example, "upstream" refers to the direction from which the fluid flows, and "downstream" refers to the direction to which the fluid flows. The term "radially" refers to the relative direction that is substantially perpendicular to an axial centerline of a particular component, the term "axially" refers to the relative direction that is substantially parallel and/or coaxially aligned to an axial centerline of a particular component, and the term "circumferentially" refers to the relative direction that extends around the axial centerline of a particular component.

Terms of approximation, such as "generally," "substantially," or "about" include values within ten percent greater or less than the stated value. When used in the context of an angle or direction, such terms include within ten degrees greater or less than the stated angle or direction. For example, "generally vertical" includes directions within ten degrees of vertical in any direction, e.g., clockwise or counter-clockwise.

Referring now to the drawings, FIG. 1 illustrates a schematic diagram of one embodiment of a turbomachine, which in the illustrated embodiment is a gas turbine 10. Although an industrial or land-based gas turbine is shown and described herein, the present disclosure is not limited to an industrial and/or land-based gas turbine unless otherwise specified in the claims. For example, the stator vane airfoils as described herein may be used in any type of turbomachine including but not limited to a steam turbine, an aircraft gas turbine, or a marine gas turbine.

As shown, gas turbine 10 generally includes an inlet section 12, a compressor section 14 disposed downstream of the inlet section 12, one or more combustors (not shown) within a combustor section 16 disposed downstream of the compressor section 14, a turbine section 18 disposed downstream of the combustor section 16, and an exhaust section 20 disposed downstream of the turbine section 18. Additionally, the gas turbine 10 may include one or more shafts 22 coupled between the compressor section 14 and the turbine section 18.

The multi-stage axial compressor section or compressor section 14 may generally include a plurality of rotor disks 24 (one of which is shown) and a plurality of rotor blades 44 extending radially outwardly from and connected to each rotor disk 24. Each rotor disk 24 in turn may be coupled to or form a portion of the shaft 22 that extends through the compressor section 14. The compressor section 14 may further include one or more stator vanes 50 arranged circumferentially around the shaft 22. The stator vanes 50 may be fixed to a static casing or compressor casing 48 that extends circumferentially around the rotor blades 44.

The turbine section 18 may generally include a plurality of rotor disks 28 (one of which is shown) and a plurality of rotor blades 30 extending radially outwardly from and being interconnected to each rotor disk 28. Each rotor disk 28 in turn may be coupled to or form a portion of the shaft 22 that extends through the turbine section 18. The turbine section 18 further includes a turbine casing 33 that circumferentially surrounds the turbine portion of the shaft 22 and the rotor blades 30, thereby at least partially defining a hot gas path 32 through the turbine section 18. The turbine casing 33 may be configured to support a plurality of stages of stationary nozzles 29 extending radially inwardly from the inner circumference of the turbine casing 33.

During operation, a working fluid such as air flows through the inlet section 12 and into the compressor section 14 where the air is progressively compressed, thus providing pressurized air to the combustor(s) of the combustor section 16. The pressurized air is mixed with fuel and burned within the combustor(s) to produce combustion gases 34. The combustion gases 34 flow through the hot gas path 32 from the combustor section 16 into the turbine section 18, wherein energy (kinetic and/or thermal) is transferred from the combustion gases 34 to the rotor blades 30, causing the shaft 22 to rotate. The mechanical rotational energy may then be used to power the compressor section 14 and/or to generate electricity. The spent combustion gases 34 exiting the turbine section 18 (sometimes referred to as "flue gases" or "exhaust gases") may then be exhausted from the gas turbine 10 via the exhaust section 20.

Figure 2:
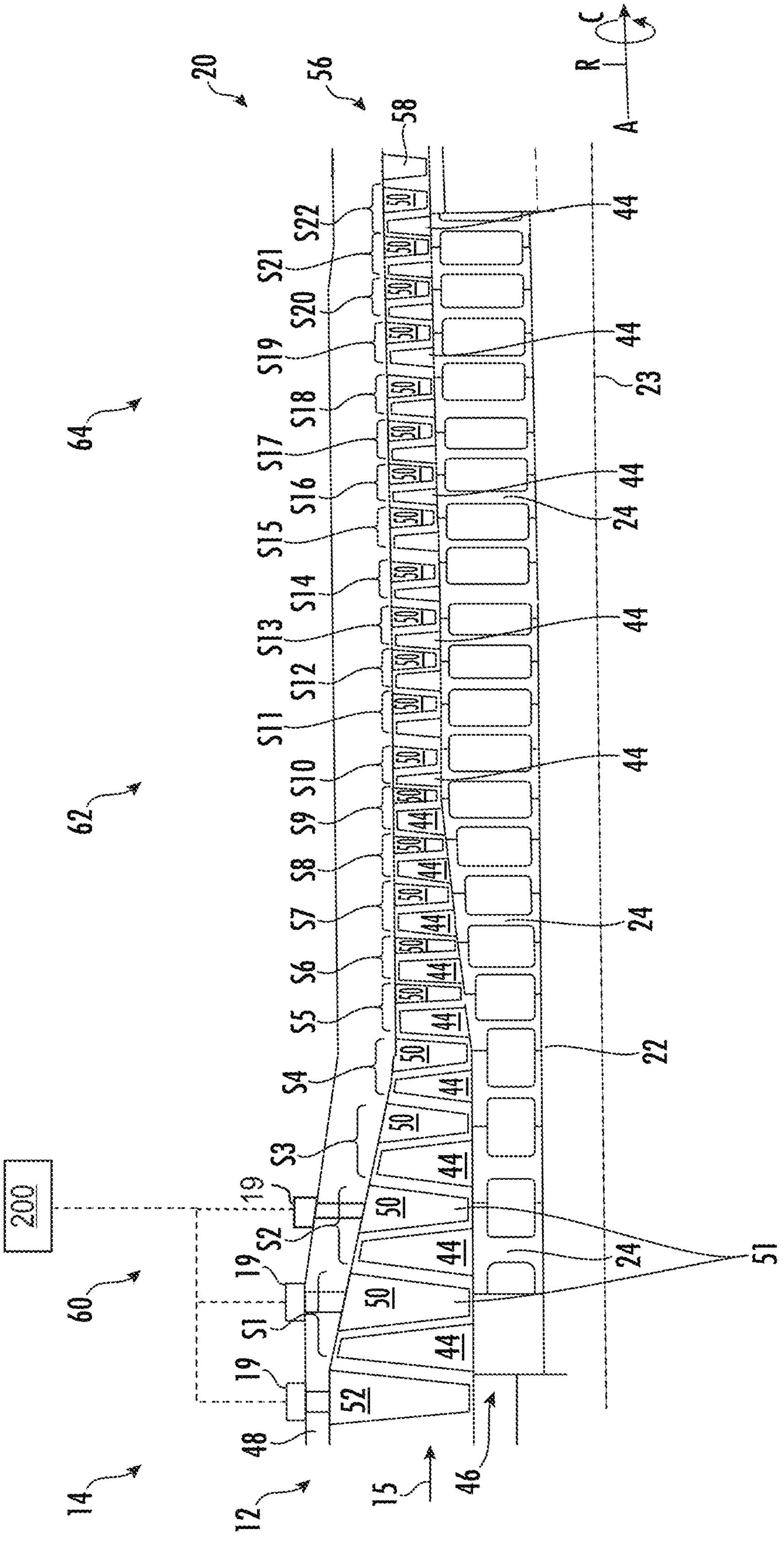
FIG. 2 illustrates a cross-sectional side view of a compressor section (e.g., of the turbomachine of FIG. 1), in accordance with embodiments of the present disclosure.

FIG. 2 illustrates a cross-sectional side view of an embodiment of the compressor section 14 of the gas turbine 10 of FIG. 1, which is shown as a multi-stage axial compressor section 14, in accordance with embodiments of the present disclosure. As shown in FIGS. 1 and 2, the gas turbine 10 may define a cylindrical coordinate system. The cylindrical coordinate system may define an axial direction A (e.g., downstream direction) parallel to and/or along an axial centerline 23 of the gas turbine 10, a radial direction R perpendicular to the axial centerline 23, and a circumferential direction C extending around the axial centerline 23.

In operation, air 15 may enter the compressor section 14 in the axial direction A through the inlet section 12 and may be pressurized in the multi-stage axial compressor section 14. The compressed air may then be mixed with fuel for combustion within the combustor section 16 to drive the turbine section 18, which rotates the shaft 22 in the circumferential direction C and, thus, the multi-stage axial compressor section 14. The rotation of the shaft 22 also causes one or more rotor blades 44 (e.g., compressor rotor blades) within the multi-stage axial compressor section 14 to draw in and pressurize the air received by the inlet section 12.

The multi-stage axial compressor section 14 may include a rotor assembly 46 having a plurality of rotor disks 24. Rotor blades 44 may extend radially outward from the rotor disks 24. The entire rotor assembly 46 (e.g., rotor disks 24 and rotor blades 44) may rotate in the circumferential direction C during operation of the gas turbine 10. The rotor assembly 46 may be surrounded by a compressor casing 48. The compressor casing may be static or stationary, such that the rotor assembly 46 rotates relative to the compressor casing 48. Stator vanes 50 (e.g., variable stator vanes and/or fixed stator vanes) may extend radially inward from the compressor casing 48.

As shown in FIG. 2, one or more stages of the stator vanes 50 may be variable stator vanes 51, such that an angle of the stator vane 50 may be selectively actuated (e.g., by a controller 200). For example, in the embodiments shown in FIG. 2, the first two stages of the compressor section 14 (e.g., S1 and S2) may include variable stator vanes 51. In many embodiments, as shown, the rotor blades 44 and stator vanes 50 may be arranged in stages in an alternating fashion, such that most stages of the rotor blades 44 are disposed between two stages of stator vanes 50 in the axial direction A.

In some embodiments, the compressor casing 48 of the compressor section 14 or the inlet section 12 may have one or more sets of inlet guide vanes 52 (IGVs) (e.g., variable IGV stator vanes). The inlet guide vanes 52 may be mounted to the compressor casing 48, may be spaced apart from one another in the circumferential direction C, and may be operable to control the amount of air 15 that enters the compressor section 14. Additionally, an outlet 56 of the compressor section 14 may have a set of outlet guide vanes 58 (OGVs). The OGVs 58 may be mounted to the compressor casing 48, may be spaced apart from one another in the circumferential direction C, and may be operable to control the amount of air 15 that exits the compressor section 14.

In exemplary embodiments, as shown in FIG. 2, the variable stator vanes 51 and the IGVs 52 may each be configured to vary its vane angle relative to the gas flow (e.g., air flow) by rotating the vane 51, 52 about an axis of rotation (e.g., about the radially oriented vane shaft). However, each variable stator vane 51 (including the IGVs 52) may be otherwise stationary relative to the rotor blades 44. In certain embodiments, the variable stator vanes 51 and the IGVs 52 may be coupled to an actuator 19 (e.g., electric drive, pneumatic drive, or hydraulic drive). The actuators 19 may be in operable communication (e.g., electrical communication) with a controller 200. The controller 200 may be operable to selectively vary the vane angle. In other embodiments, all of the stator vanes 50 may be fixed, such that the stator vanes 50 are configured to remain in a fixed angular position (e.g., the vane angle does not vary).

The compressor section 14 may include a plurality of rows or stages arranged in a serial flow order, such as between 2 to 30, 2 to 25, 2 to 22, 2 to 14, or 2 to 10 rows or stages, or any specific number or range therebetween. Each stage may include a plurality of rotor blades 44 (attached to rotor disks 24 and circumferentially spaced about the axial centerline 23) and a plurality of stator vanes 50 (attached to the compressor casing 48 and circumferentially spaced about the axial centerline 23). In each stage, the multi-stage axial compressor section 14 may include 2 to 1000, 5 to 500, or 10 to 100 of circumferentially arranged rotor blades 44, and 2 to 1000, 5 to 500, or 10 to 100 of circumferentially arranged stator vanes 50. In particular, the illustrated embodiment of the multi-stage axial compressor section 14 includes 22 stages (e.g., S1-S22).

It may be appreciated that each stage has a set of rotor blades 44 disposed at a first axial position and a set of stator vanes 50 disposed at a second axial position along the length of the compressor section 14. In other words, each stage has the rotor blades 44 and stator vanes 50 axially offset from one another, such that the compressor section 14 has an alternating arrangement of rotor blades 44 and stator vanes 50 one set after another along the length of the compressor section 14. Each set of rotor blades 44 extends (e.g., in a spaced arrangement) in the circumferential direction C about the shaft 22, and each set of stator vanes 50 extends (e.g., in a spaced arrangement) in the circumferential direction C within the compressor casing 48.

While the compressor section 14 may include greater or fewer stages than are illustrated, FIG. 2 illustrates an embodiment of the compressor section 14 having twenty two stages arranged in a serial flow order and identified as follows: first stage S1, second stage S2, third stage S3, fourth stage S4, fifth stage S5, sixth stage S6, seventh stage S7, eighth stage S8, ninth stage S9, tenth stage S10, eleventh stage S11, twelfth stage S12, thirteenth stage S13, fourteenth stage S14, fifteenth stage S15, sixteenth stage S16, seventeenth stage S17, eighteenth stage S18, nineteenth stage S19, twentieth stage S20, twenty-first stage S21, and twenty-second stage S22. The IGVs 52 are upstream (i.e., forward) of first stage S1, and the OGVs 58 are downstream (i.e., aft) of the twenty-second stage S22.

In certain embodiments, each stage may include rotor blades 44 and stator vanes 50 (e.g., fixed stator vanes 50 and/or variable stator vanes 51). As used herein, a rotor blade 44 disposed within one of the sections S1-S22 of the compressor section 14 may be referred to by whichever stage it is disposed within, e.g., "a first stage compressor rotor blade," "a second stage compressor rotor blade," "a third stage compressor rotor blade," etc. Similarly, a stator vane 50 disposed within one of the sections S1-S22 of the compressor section 14 may be referred to by whichever stage it is disposed within, e.g., "a third stage compressor stator vane," "a fourth stage compressor stator vane," "a fifth stage compressor stator vane," etc.

In use, the rotor blades 44 may rotate circumferentially about the axial centerline 23 within the compressor casing 48 and between the stator vanes 50. Rotation of the rotor blades 44 may result in air entering the inlet section 12. The air is then subsequently compressed as it traverses the various stages (e.g., first stage S1 to twenty-second stage S22) of the compressor section 14 and moves in the axial direction downstream of the multi-stage axial compressor section 14. The compressed air may then exit through the outlet 56 of the multi-stage axial compressor section 14. As discussed above, the outlet 56 may have a set of outlet guide vanes 58 (OGVs). The compressed air that exits the compressor section 14 may be directed to the combustor section 16 and mixed with fuel for combustion. Air from one or more stages of the compressor section 14 may also be directed to the turbine section 18 or elsewhere in the gas turbine 10 for cooling and/or sealing.

TABLES I through III below each contain coordinate data that describes a respective airfoil shape (or surface profile). In exemplary embodiment s, the airfoil shapes defined by each of TABLES I through III describe a stator vane 50 of the compressor section 14 and, in particular, stator vanes 50 of stage five, stage six, and stage seven, respectively.

The IGV 52, the stages (e.g., S1-S22) of rotor blades 44 and stator vanes 50, and the OGV 58 of the compressor section 14 may be grouped into one or more sections or portions of the compressor section 14 for reference purposes. For the purposes of the grouping, portions the compressor section 14 may be expressed in terms of a percentage, such as a percentage of the compressor section 14 from the inlet (e.g., 0% of the compressor section 14) to the outlet (e.g., 100% of the compressor section 14) in the axial or downstream direction. In this way, the compressor section 14 may include, in a serial flow order, an early stage 60, a mid stage 62, and a late stage 64. In particular, the early stage 60 may include from approximately 0% to approximately 25% of the compressor section 14 (e.g., from the IGV 52 to about the sixth stage S6). The mid stage 62 may include from approximately 25% to approximately 75% of the compressor section 14 (e.g., from about the seventh stage S7 to about the eighteenth stage S18). The late stage 64 may include from approximately 75% to approximately 100% of the compressor section 14 (e.g., from about the nineteenth stage S19 to the OGV 58).

Accordingly, the Cartesian coordinate data contained within each of TABLES I through III may correspond to an airfoil shape of an airfoil 100 disposed within an early stage 60 or mid stage 62 of the compressor section 14.

For example, in exemplary embodiments, the Cartesian coordinate data contained within TABLE I may correspond to an airfoil shape of an airfoil 100 disposed on a stator vane 50 within the fifth stage S5 of the compressor section 14. The Cartesian coordinate data contained within TABLE II may correspond to an airfoil shape of an airfoil 100 disposed on a stator vane 50 within the sixth stage S6 of the compressor section 14. The Cartesian coordinate data contained within TABLE III may correspond to an airfoil shape of an airfoil 100 disposed on a stator vane 50 within the seventh stage S7 of the compressor section 14.

However, in various other embodiments, each of TABLES I through III may contain Cartesian coordinate data of an airfoil shape of an airfoil 100 that may be disposed on a stator vane 50 in any stage S1-S22 of the compressor section 14. Accordingly, the airfoil shape defined by each of TABLES I through III should not be limited to any particular stage of the compressor section 14 unless specifically recited in the claims.

Figure 3:
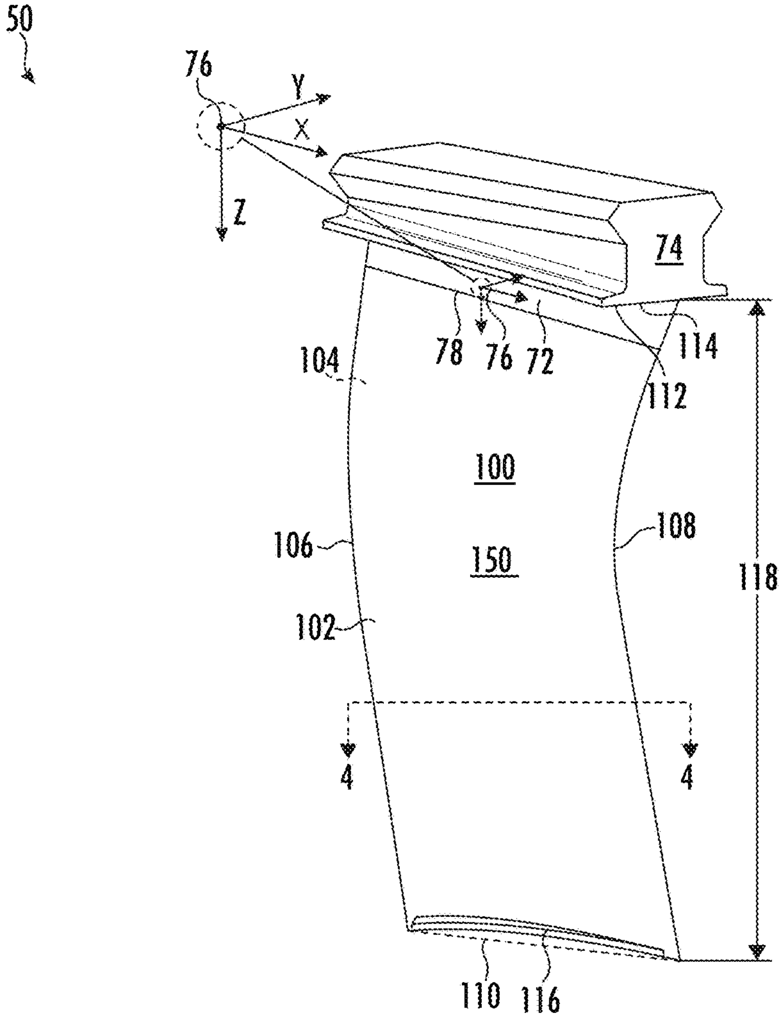
FIG. 3 illustrates a perspective view of a stator vane as may be used in the compressor section of FIG. 2, in accordance with embodiments of the present disclosure.

FIG. 3 illustrates a perspective view of a stator vane 50, which may be incorporated in any stage (e.g., S1 through S22) of the compressor section 14, in accordance with embodiments of the present disclosure.

As shown, the stator vane 50 includes an airfoil 100 defining an airfoil shape 150. The airfoil 100 includes a pressure-side surface or profile 102 and an opposing suction-side surface or profile 104. The pressure-side surface 102 and the suction-side surface 104 meet or intersect at a leading edge 106 and a trailing edge 108 of the airfoil 100. A chord line 110 extends between the leading edge 106 and the trailing edge 108 such that pressure and suction-side surfaces 102, 104 can be said to extend in chord or chordwise between the leading edge 106 and the trailing edge 108. The leading and trailing edges, 106 and 108 respectively, may be described as the dividing or intersecting lines between the suction-side surface 104 and the pressure-side surface 102. In other words, the suction-side surface 104 and the pressure-side surface 102 couple together with one another along the leading edge 106 and the trailing edge 108, thereby defining an airfoil shaped cross-section that gradually changes lengthwise (or "span-wise") along the airfoil 100.

In operation, the stator vanes 50 may be stationary components that do not move in the circumferential direction C. For example, the stator vanes 50 may be coupled to, and extend radially inward from, the compressor casing 48. Each set (or stage) of stator vanes 50 within the compressor section 14 may be disposed axially between two sets (or stages) of rotor blades 44, which rotate in the circumferential direction C. For example, the rotor blades 44 rotate about the turbomachine axial centerline 23 exerting a torque on a working fluid, such as air 15, thus increasing energy levels of the fluid as the working fluid traverses the various stages S1 through S22 of the multi-stage axial compressor section 14 on its way to the combustor section 16. The stator vanes 50 may be adjacent (e.g., upstream and/or downstream) to the one or more sets of the rotor blades 44. The stator vanes 50 slow the working fluid during rotation of the rotor blades 44, converting a circumferential component of movement of the working fluid flow into pressure. Accordingly, continuous rotation of the rotor blade 44 creates a continuous flow of compressed working fluid, suitable for combustion via the combustor section 16.

As shown in FIG. 3, the airfoil 100 includes a root or first end 112, which intersects with and extends radially inwardly from a base or platform 114 of the stator vane 50. The airfoil 100 terminates radially at a second end or radial tip 116 of the airfoil 100. In some embodiments (not shown), the stator vane 50 may include a tip shroud or tip platform extending from the radial tip 116 generally parallel to the base 114. The pressure-side and suction-side surfaces 102, 104 can be said to extend in span or in a span-wise direction 118 between the root 112 and/or the platform 114 and the radial tip 116 of the airfoil 100. In other words, each stator vane 50 includes an airfoil 100 having opposing pressure-side and suction-side surfaces 102, 104 that extend in chord or chordwise 110 between opposing leading and trailing edges 106, 108 and that extend in span or span-wise 118 between the root 112 and the radial tip 116 of the airfoil 100.

In particular configurations, the airfoil 100 may include a fillet 72 formed between the platform 114 and the airfoil 100 proximate to the root 112. The fillet 72 can include a weld or braze fillet, which can be formed via conventional MIG welding, TIG welding, brazing, etc., and can include a profile that can reduce fluid dynamic losses as a result of the presence of fillet 72. In particular embodiments, the platform 114, the airfoil 100 and the fillet 72 can be formed as a single component, such as by casting and/or machining and/or additive manufacturing (such as 3D printing) and/or any other suitable technique now known or later discovered and/or developed.

In various implementations, the stator vane 50 may include a mounting portion 74 (such as a dovetail joint), which is formed to connect and/or to secure the stator vane 50 to the compressor casing 48. For example, the mounting portion 74 may include a T-shaped structure, a hook, one or more lateral protrusions, one or more lateral slots, or any combination thereof. The mounting portion 74 (e.g., dovetail joint) may be configured to mount into the compressor casing 48 in an axial direction A, a radial direction R, and/or a circumferential direction C (e.g., into an axial slot or opening, a radial slot or opening, and/or a circumferential slot or opening).

An important term in this disclosure is "profile." The profile is the range of the variation between measured points on an airfoil surface and the ideal position listed in any one of TABLES I through III. The actual profile on a manufactured compressor stator vane will be different than those in TABLES I through III, and the design is robust to this variation meaning that mechanical and aerodynamic function are not impaired. As noted above, a + or −5% profile tolerance is used herein. The X, Y, and Z values are all non-dimensionalized relative to a scaling factor.

Figure 4:
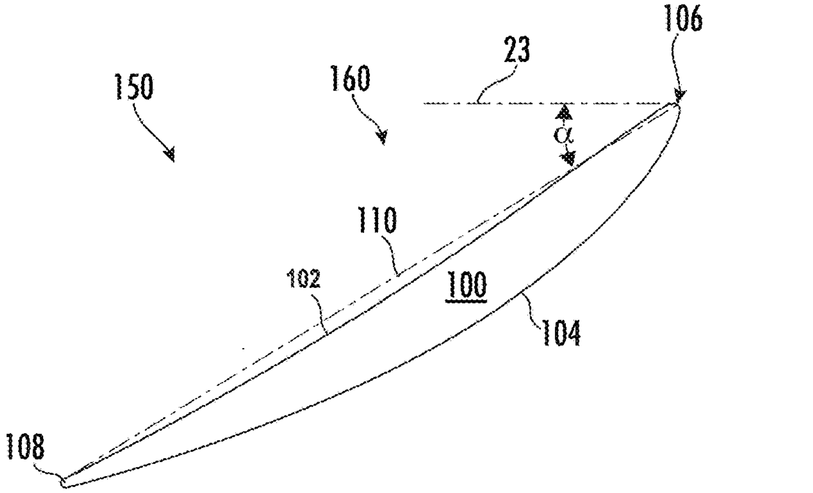
FIG. 4 illustrates an airfoil profile section of an airfoil from along the line 4-4 shown in FIG. 3, in accordance with embodiments of the present disclosure.

The airfoil 100 of the stator vane 50 has a nominal profile at any cross-section taken between the platform 114 or the root 112 and the radial tip 116, e.g., such as the cross section shown in FIG. 4. A "nominal profile" is the range of variation between measured points on an airfoil surface and the ideal position listed in TABLES I through III. The actual profile on a manufactured compressor blade may be different from those in TABLES I through III (e.g., due to manufacturing tolerances), and the design is robust to this variation, meaning that mechanical and aerodynamic function are not impaired.

The Cartesian coordinate values of X, Y, and Z provided in TABLES I through III are dimensionless values scalable by a scaling factor, as measured in any given unit of distance (e.g., inches). For example, the X, Y, and Z values in TABLES I through III are set forth in non-dimensionalized units, and thus a variety of units of dimensions may be used when the values are appropriately scaled by a scaling factor. As one example only, the Cartesian coordinate values of X, Y, and Z may be convertible to dimensional distances by multiplying the X, Y, and Z values by a scaling factor. The scaling factor may be substantially equal to 1, greater than 1, or less than 1. The scaling factor, used to convert the non-dimensional values to dimensional distances, may be a fraction (e.g., ½, ¼, etc.), decimal fraction (e.g., 0.5, 1.5, 10.25, etc.), integer (e.g., 1, 2, 10, 100, etc.) or a mixed number (e.g., 1½, 10¼, etc.). The scaling factor may be a dimensional distance in any suitable format (e.g., inches, feet, millimeters, centimeters, etc.). In various embodiments, the scaling factor may be between about 0.01 inches and about 10 inches, or such as between about 0.02 inches and about 5 inches, or such as between about 0.04 inches and about 2.5 inches, or such as between about 0.06 inches and about 1.5 inches.

In various embodiments, the X, Y, and Z values in TABLES I through III may be scaled as a function of the same scaling factor (e.g., constant or number) to provide a scaled-up or a scaled-down airfoil. In this way, TABLES I through III defines the relationships between the respective X, Y, and Z coordinate values without specifying the units of measure (e.g., dimensional units) for the various airfoil 100 embodiments. Accordingly, while different scaling factors may be applied to the respective X, Y, and Z coordinate values of TABLES I through III to define different embodiments of the airfoil 100, each embodiment of the airfoil 100 regardless of the particular scaling factor is considered to be defined by the respective X, Y, and Z coordinate values of a respective table. For example, the X, Y, and Z coordinate values of TABLES I through III may each define an embodiment of the airfoil 100 formed with a 1:1 inch scaling factor, or formed with a 1:2 inch scaling factor, or formed with a 1:1 cm scaling factor. It may be appreciated that any scaling factor may be used with the X, Y, and Z coordinate values of each respective table of TABLES I, II, or III, according to the design considerations of a particular embodiment.

A gas turbine hot gas path requires airfoils that meet system requirements of aerodynamic and mechanical blade loading and efficiency. To define the airfoil shape of each compressor stator vane airfoil, there is a unique set or loci of points in space that meet the stage requirements and that can be manufactured. This unique loci of points meet the requirements for stage efficiency and are arrived at by iteration between aerodynamic and mechanical loadings enabling the turbine to run in an efficient, safe and smooth manner. These points are unique and specific to the system.

The loci that define the compressor stator vane airfoil shape include a set of points with X, Y, and Z dimensions relative to a reference origin coordinate system. The Cartesian coordinate system of X, Y, and Z values given in TABLES I through III below define the airfoil shapes (which include the various airfoil profile sections) of airfoils belonging to three different compressor stator vanes at various locations along its respective height (or along the span-wise direction 118).

Each of TABLES I, II, and III lists data for an uncoated airfoil at cold or room temperature. As used herein, the phrase "substantially in accordance with Cartesian coordinate values of X, Y, and Z set forth in any of TABLES I through III" refers to the envelope/tolerance for the coordinates is about +/−5% in a direction normal to any airfoil surface location and/or about +/−5% of the chord 110 in a direction nominal to any airfoil surface location. In other words, the airfoil layout of each stator vane airfoil, as embodied by the disclosure, is robust to this range of variation without impairment of mechanical and aerodynamic functions.

A point data origin 76 is defined at the base 114 of the respective airfoil 100. For example, the point data origin 76 may be defined at the root 112 of the airfoil 100. For example, in some embodiments, the point data origin 76 may be defined at the root 112 of the airfoil 100 at the intersection of a stacking axis (e.g., a radially extending axis) and the compressed air flowpath (e.g., a flowpath of air along the surface of the airfoil). In the embodiments presented in TABLES I through III below, the point data origin 76 is defined at a transition or intersection line 78 defined between the fillet 72 and the airfoil 100. The point data origin 76 corresponds to the non-dimensional Z value equal to 0.

As described above, the Cartesian coordinate system has orthogonally related (e.g., mutually orthogonal) X, Y, and Z axes, and the X axis lies parallel to an axial centerline 23 of the shaft 22, i.e., the rotary axis, and a positive X coordinate value is axial toward an aft, i.e., exhaust, end of the gas turbine 10. The positive Y coordinate value extends in the direction from the pressure-side surface 102 towards the suction-side surface 104, and the positive Z coordinate value is radially outwardly from the base 114 toward the radial tip 116 (e.g., opposite the radial direction of the gas turbine 10). All the values in TABLES I through III are given at room temperature and do not include the fillet 72 or coatings (not shown).

By defining X and Y coordinate values at selected locations in a Z direction normal to the X, Y plane, an airfoil profile section 160 of the airfoil 100 of the stator vane 50 may be defined at each specified Z distance along the length of the airfoil 100. By connecting the X and Y values with smooth continuing arcs, each airfoil profile section of the airfoil 100 at each distance Z may be fixed. The complete airfoil shape 150 may be determined by smoothly connecting the adjacent profile sections to one another.

The values of TABLES I through III are generated and shown to three decimal places for determining the airfoil shape 150 of the airfoil 100. As the stator vane 50 heats up during operation of the gas turbine 10, surface stress and temperature will cause a change in the X, Y, and Z values. Accordingly, the values for the various airfoil profile sections given in TABLES I through III define the "nominal" airfoil profile, that is, the profile of an uncoated airfoil at ambient, non-operating or non-hot conditions (e.g., room temperature).

There are typical manufacturing tolerances as well as coatings which must be accounted for in the actual profile of the airfoil 100. Each cross-section is joined smoothly with the other cross-sections to form the complete airfoil shape. It will therefore be appreciated that +/− typical manufacturing tolerances, i.e., +/− values, including any coating thicknesses, are additive to the X and Y values given in TABLES I through III below. Accordingly, a distance of +/−5% in a direction normal to any surface location along the airfoil profile defines an airfoil profile envelope for this particular stator vane 50 airfoil design, i.e., a range of variation between measured points on the actual airfoil surface at nominal cold or room temperature and the ideal position of those points as given in each of TABLES I through III below at the same temperature. The data provided in each of TABLES I through III is scalable (i.e., by a uniform geometric scaling factor), and the geometry pertains to all aerodynamic scales, at, above and/or below 3000 RPM. The design of the airfoil 100 for stator vane 50 is robust to this range of variation without impairment of mechanical and aerodynamic functions.

The airfoil 100 may include various airfoil profile sections along the span-wise direction 118. Each of the airfoil profile sections may be "stacked" on top of one another other along the Z direction, such that when connected with smooth continuous arcs, the complete airfoil shape 150 may be ascertained. For example, each airfoil profile section corresponds to Cartesian coordinate values of X, Y, and Z for a common Cartesian coordinate value of Z in each of TABLES I through III. Furthermore, adjacent airfoil profile sections correspond to the Cartesian coordinate values of X, Y, and Z for adjacent Cartesian coordinate values of Z in each of TABLES I through III.

For example, FIG. 4 illustrates an airfoil profile section 160 of an airfoil 100 from along the line 4-4 shown in FIG. 3, which may be representative of an airfoil profile section of the airfoil 100 at any span-wise location, in accordance with embodiments of the present disclosure. As should be appreciated, the airfoil shape 150 of the airfoil 100 may change or vary at each span-wise location (or at each respective Z value). In this way, a distinct airfoil profile section 160 may be defined at each position along the span-wise direction 118 (or at each Z value) of the airfoil 100. The airfoil profile sections 160 at each span-wise location (e.g., at each Z value) of the airfoil 100 are connected together with smooth continuous lines, thereby defining the complete airfoil shape 150 of the airfoil 100.

A Cartesian coordinate system of X, Y, and Z values given in each of TABLES I through III below define respective suction side surfaces or profiles 104 and pressure side surfaces or profiles 102 of the respective airfoils 100 at various locations along the span-wise direction 118 of the respective airfoils 100. For example, in TABLE I, points 113 through 168 define the respective suction side surface 104 and pressure side surface 102 of a respective airfoil taken along the Z value coinciding with line 4-4 shown in FIG. 3.

By defining X and Y coordinate values at selected locations in a Z direction normal to the X-Y plane, an airfoil profile section 160 of the airfoil 100 may be obtained at each of the selected Z value location (e.g., by connecting each X and Y coordinate value at a given Z value to adjacent X and Y coordinate values of that same Z value with smooth continuing arcs). At each Z value or location, the suction side profile 104 may joined to the pressure-side profile or surface 102, as shown in FIG. 4, to define the airfoil profile section 160. The airfoil shape 150 of the airfoil 100 may be determined by smoothly connecting the adjacent (e.g., "stacked") airfoil profile sections 160 to one another with smooth continuous arcs.

The values in each of TABLES I through III below are computer-generated and shown to three decimal places. In certain embodiments, any values having less than three decimal places may be shown with trailing zeroes to obtain three decimal places. Furthermore, in some embodiments and in view of manufacturing constraints, actual values useful for forming the airfoil 100 may be considered valid to fewer than three decimal places for determining the airfoil shape 150 of the airfoil 100.

As will be appreciated, there are typical manufacturing tolerances which may be accounted for in the airfoil shape 150. Accordingly, the X, Y, and Z values given in each of TABLES I through III are for the airfoil shape 150 of a nominal airfoil. It will therefore be appreciated that plus or minus typical manufacturing tolerances are applicable to these X, Y, and Z values and that an airfoil 100 having a profile substantially in accordance with those values includes such tolerances.

As noted previously, the airfoil 100 may also be coated for protection against corrosion, erosion, wear, and oxidation after the airfoil 100 is manufactured, according to the values in any of TABLES I through III and within the tolerances explained above. For example, the coating region may include one or more corrosion resistant layers, erosion resistant layers, wear resistant layers, oxidation resistant or anti-oxidation layers, or any combination thereof. For example, in embodiments where the airfoil is measured in inches, an anti-corrosion coating may be provided with an average thickness of 0.008 inches (0.20 mm), or between 0.001 and 0.1 inches (between 0.025 and 2.5 mm), or between 0.0001 and 1 inches or more (between 0.0025 and 12.7 mm or more). For example, in certain embodiments, the coating may increase X and Y values of a suction side or a pressure side in any of TABLES I through III by no greater than approximately 3.5 mm along a first suction portion, a first pressure portion, or both. It is to be noted that additional anti-oxidation coatings may be provided, such as overcoats. The values provided in each of TABLES I through III exclude a coated region or coatings of the airfoil 100. In other words, these values correspond to the bare surface of the airfoil 100. The coated region may include one or more coating layers, surface treatments, or a combination thereof, over the bare surface of the airfoil 100.

TABLES I through III below contain Cartesian coordinate data of an airfoil shape 150 of an airfoil 100, which may be incorporated into the compressor section 14 of the gas turbine 10.

In exemplary embodiments, TABLE I below contains Cartesian coordinate data of an airfoil shape 150 of an airfoil 100 of a stator vane 50, which is disposed in the early stage 60 of the compressor section 14. Specifically, TABLE I below contains Cartesian coordinate data of an airfoil shape 150 of an airfoil 100 of a stator vane 50, which is disposed in the fifth stage S5 of the compressor section 14.

TABLE I

| | Pressure Side Surface | | | Suction Side Surface | | |
|---|---|---|---|---|---|---|
| N | X | Y | Z | X | Y | Z |
| 1 | −1.400 | −1.043 | −0.006 | 2.060 | 1.008 | −0.006 |
| 2 | −1.400 | −1.043 | −0.006 | 2.060 | 1.009 | −0.006 |
| 3 | −1.398 | −1.044 | −0.006 | 2.059 | 1.011 | −0.006 |
| 4 | −1.396 | −1.046 | −0.006 | 2.056 | 1.015 | −0.006 |
| 5 | −1.390 | −1.049 | −0.006 | 2.050 | 1.021 | −0.006 |
| 6 | −1.380 | −1.051 | −0.006 | 2.037 | 1.027 | −0.006 |
| 7 | −1.362 | −1.051 | −0.006 | 2.018 | 1.026 | −0.006 |
| 8 | −1.339 | −1.043 | −0.006 | 1.994 | 1.017 | −0.006 |
| 9 | −1.310 | −1.028 | −0.006 | 1.963 | 1.007 | −0.006 |
| 10 | −1.277 | −1.005 | −0.006 | 1.923 | 0.993 | −0.006 |
| 11 | −1.233 | −0.975 | −0.006 | 1.871 | 0.976 | −0.006 |
| 12 | −1.183 | −0.941 | −0.006 | 1.811 | 0.955 | −0.006 |
| 13 | −1.129 | −0.905 | −0.006 | 1.747 | 0.934 | −0.006 |
| 14 | −1.068 | −0.865 | −0.006 | 1.680 | 0.911 | −0.006 |
| 15 | −1.000 | −0.821 | −0.006 | 1.604 | 0.885 | −0.006 |
| 16 | −0.925 | −0.773 | −0.006 | 1.516 | 0.855 | −0.006 |
| 17 | −0.847 | −0.723 | −0.006 | 1.424 | 0.825 | −0.006 |
| 18 | −0.765 | −0.670 | −0.006 | 1.328 | 0.793 | −0.006 |
| 19 | −0.679 | −0.616 | −0.006 | 1.229 | 0.759 | −0.006 |
| 20 | −0.590 | −0.559 | −0.006 | 1.125 | 0.724 | −0.006 |
| 21 | −0.498 | −0.500 | −0.006 | 1.017 | 0.688 | −0.006 |
| 22 | −0.403 | −0.439 | −0.006 | 0.906 | 0.650 | −0.006 |
| 23 | −0.304 | −0.375 | −0.006 | 0.790 | 0.610 | −0.006 |
| 24 | −0.202 | −0.309 | −0.006 | 0.671 | 0.567 | −0.006 |
| 25 | −0.100 | −0.243 | −0.006 | 0.553 | 0.524 | −0.006 |
| 26 | 0.003 | −0.178 | −0.006 | 0.435 | 0.479 | −0.006 |

TABLE I-continued

| | Pressure Side Surface | | | Suction Side Surface | | |
|---|---|---|---|---|---|---|
| N | X | Y | Z | X | Y | Z |
| 27 | 0.105 | −0.112 | −0.006 | 0.317 | 0.433 | −0.006 |
| 28 | 0.208 | −0.048 | −0.006 | 0.200 | 0.385 | −0.006 |
| 29 | 0.311 | 0.017 | −0.006 | 0.084 | 0.335 | −0.006 |
| 30 | 0.414 | 0.081 | −0.006 | −0.031 | 0.283 | −0.006 |
| 31 | 0.518 | 0.145 | −0.006 | −0.144 | 0.228 | −0.006 |
| 32 | 0.622 | 0.208 | −0.006 | −0.257 | 0.171 | −0.006 |
| 33 | 0.727 | 0.270 | −0.006 | −0.367 | 0.110 | −0.006 |
| 34 | 0.832 | 0.331 | −0.006 | −0.476 | 0.045 | −0.006 |
| 35 | 0.937 | 0.391 | −0.006 | −0.581 | −0.025 | −0.006 |
| 36 | 1.040 | 0.449 | −0.006 | −0.680 | −0.096 | −0.006 |
| 37 | 1.139 | 0.504 | −0.006 | −0.773 | −0.169 | −0.006 |
| 38 | 1.235 | 0.556 | −0.006 | −0.859 | −0.243 | −0.006 |
| 39 | 1.328 | 0.605 | −0.006 | −0.938 | −0.319 | −0.006 |
| 40 | 1.418 | 0.653 | −0.006 | −1.011 | −0.395 | −0.006 |
| 41 | 1.504 | 0.697 | −0.006 | −1.077 | −0.471 | −0.006 |
| 42 | 1.587 | 0.740 | −0.006 | −1.138 | −0.546 | −0.006 |
| 43 | 1.666 | 0.780 | −0.006 | −1.193 | −0.621 | −0.006 |
| 44 | 1.735 | 0.815 | −0.006 | −1.241 | −0.690 | −0.006 |
| 45 | 1.797 | 0.845 | −0.006 | −1.283 | −0.753 | −0.006 |
| 46 | 1.855 | 0.874 | −0.006 | −1.318 | −0.810 | −0.006 |
| 47 | 1.910 | 0.901 | −0.006 | −1.350 | −0.865 | −0.006 |
| 48 | 1.957 | 0.924 | −0.006 | −1.377 | −0.912 | −0.006 |
| 49 | 1.993 | 0.942 | −0.006 | −1.397 | −0.949 | −0.006 |
| 50 | 2.023 | 0.956 | −0.006 | −1.411 | −0.980 | −0.006 |
| 51 | 2.044 | 0.967 | −0.006 | −1.415 | −1.005 | −0.006 |
| 52 | 2.058 | 0.979 | −0.006 | −1.413 | −1.023 | −0.006 |
| 53 | 2.062 | 0.992 | −0.006 | −1.408 | −1.033 | −0.006 |
| 54 | 2.062 | 1.000 | −0.006 | −1.405 | −1.039 | −0.006 |
| 55 | 2.061 | 1.005 | −0.006 | −1.402 | −1.041 | −0.006 |
| 56 | 2.061 | 1.007 | −0.006 | −1.401 | −1.042 | −0.006 |
| 57 | −1.416 | −1.048 | 0.312 | 2.064 | 1.003 | 0.312 |
| 58 | −1.416 | −1.049 | 0.312 | 2.064 | 1.004 | 0.312 |
| 59 | −1.414 | −1.050 | 0.312 | 2.063 | 1.006 | 0.312 |
| 60 | −1.412 | −1.051 | 0.312 | 2.060 | 1.011 | 0.312 |
| 61 | −1.406 | −1.054 | 0.312 | 2.054 | 1.017 | 0.312 |
| 62 | −1.396 | −1.056 | 0.312 | 2.041 | 1.023 | 0.312 |
| 63 | −1.378 | −1.055 | 0.312 | 2.022 | 1.021 | 0.312 |
| 64 | −1.354 | −1.048 | 0.312 | 1.998 | 1.013 | 0.312 |
| 65 | −1.326 | −1.031 | 0.312 | 1.966 | 1.002 | 0.312 |
| 66 | −1.293 | −1.008 | 0.312 | 1.926 | 0.989 | 0.312 |
| 67 | −1.249 | −0.978 | 0.312 | 1.874 | 0.971 | 0.312 |
| 68 | −1.199 | −0.943 | 0.312 | 1.814 | 0.951 | 0.312 |
| 69 | −1.145 | −0.907 | 0.312 | 1.750 | 0.929 | 0.312 |
| 70 | −1.084 | −0.866 | 0.312 | 1.682 | 0.906 | 0.312 |
| 71 | −1.016 | −0.822 | 0.312 | 1.606 | 0.881 | 0.312 |
| 72 | −0.941 | −0.774 | 0.312 | 1.518 | 0.851 | 0.312 |
| 73 | −0.862 | −0.723 | 0.312 | 1.426 | 0.821 | 0.312 |
| 74 | −0.779 | −0.671 | 0.312 | 1.330 | 0.788 | 0.312 |
| 75 | −0.694 | −0.616 | 0.312 | 1.230 | 0.755 | 0.312 |
| 76 | −0.604 | −0.559 | 0.312 | 1.126 | 0.720 | 0.312 |
| 77 | −0.512 | −0.500 | 0.312 | 1.018 | 0.683 | 0.312 |
| 78 | −0.415 | −0.439 | 0.312 | 0.906 | 0.645 | 0.312 |
| 79 | −0.316 | −0.376 | 0.312 | 0.790 | 0.605 | 0.312 |
| 80 | −0.213 | −0.310 | 0.312 | 0.671 | 0.562 | 0.312 |
| 81 | −0.110 | −0.245 | 0.312 | 0.552 | 0.518 | 0.312 |
| 82 | −0.007 | −0.180 | 0.312 | 0.433 | 0.474 | 0.312 |
| 83 | 0.097 | −0.115 | 0.312 | 0.315 | 0.427 | 0.312 |
| 84 | 0.200 | −0.050 | 0.312 | 0.198 | 0.379 | 0.312 |
| 85 | 0.304 | 0.014 | 0.312 | 0.082 | 0.329 | 0.312 |
| 86 | 0.409 | 0.078 | 0.312 | −0.034 | 0.277 | 0.312 |
| 87 | 0.513 | 0.141 | 0.312 | −0.148 | 0.222 | 0.312 |
| 88 | 0.618 | 0.203 | 0.312 | −0.261 | 0.164 | 0.312 |
| 89 | 0.723 | 0.265 | 0.312 | −0.371 | 0.103 | 0.312 |
| 90 | 0.829 | 0.326 | 0.312 | −0.480 | 0.038 | 0.312 |
| 91 | 0.935 | 0.386 | 0.312 | −0.586 | −0.031 | 0.312 |
| 92 | 1.038 | 0.444 | 0.312 | −0.686 | −0.103 | 0.312 |
| 93 | 1.138 | 0.499 | 0.312 | −0.779 | −0.176 | 0.312 |
| 94 | 1.235 | 0.551 | 0.312 | −0.865 | −0.250 | 0.312 |
| 95 | 1.328 | 0.601 | 0.312 | −0.945 | −0.326 | 0.312 |
| 96 | 1.418 | 0.648 | 0.312 | −1.018 | −0.401 | 0.312 |
| 97 | 1.505 | 0.693 | 0.312 | −1.086 | −0.477 | 0.312 |
| 98 | 1.588 | 0.735 | 0.312 | −1.147 | −0.553 | 0.312 |
| 99 | 1.668 | 0.775 | 0.312 | −1.203 | −0.627 | 0.312 |
| 100 | 1.737 | 0.810 | 0.312 | −1.252 | −0.696 | 0.312 |
| 101 | 1.799 | 0.841 | 0.312 | −1.294 | −0.759 | 0.312 |
| 102 | 1.858 | 0.869 | 0.312 | −1.330 | −0.816 | 0.312 |

TABLE I-continued

| | Pressure Side Surface | | | Suction Side Surface | | |
|---|---|---|---|---|---|---|
| N | X | Y | Z | X | Y | Z |
| 103 | 1.913 | 0.896 | 0.312 | −1.363 | −0.870 | 0.312 |
| 104 | 1.960 | 0.919 | 0.312 | −1.390 | −0.918 | 0.312 |
| 105 | 1.997 | 0.937 | 0.312 | −1.411 | −0.955 | 0.312 |
| 106 | 2.026 | 0.951 | 0.312 | −1.425 | −0.985 | 0.312 |
| 107 | 2.048 | 0.962 | 0.312 | −1.430 | −1.010 | 0.312 |
| 108 | 2.062 | 0.974 | 0.312 | −1.428 | −1.029 | 0.312 |
| 109 | 2.066 | 0.987 | 0.312 | −1.424 | −1.038 | 0.312 |
| 110 | 2.066 | 0.995 | 0.312 | −1.420 | −1.044 | 0.312 |
| 111 | 2.065 | 1.000 | 0.312 | −1.418 | −1.046 | 0.312 |
| 112 | 2.065 | 1.002 | 0.312 | −1.417 | −1.048 | 0.312 |
| 113 | −1.443 | −1.056 | 0.851 | 2.069 | 0.994 | 0.851 |
| 114 | −1.443 | −1.056 | 0.851 | 2.069 | 0.995 | 0.851 |
| 115 | −1.441 | −1.057 | 0.851 | 2.068 | 0.997 | 0.851 |
| 116 | −1.438 | −1.059 | 0.851 | 2.065 | 1.001 | 0.851 |
| 117 | −1.432 | −1.062 | 0.851 | 2.059 | 1.007 | 0.851 |
| 118 | −1.422 | −1.064 | 0.851 | 2.046 | 1.013 | 0.851 |
| 119 | −1.404 | −1.062 | 0.851 | 2.027 | 1.011 | 0.851 |
| 120 | −1.381 | −1.053 | 0.851 | 2.003 | 1.003 | 0.851 |
| 121 | −1.353 | −1.036 | 0.851 | 1.971 | 0.993 | 0.851 |
| 122 | −1.320 | −1.012 | 0.851 | 1.931 | 0.979 | 0.851 |
| 123 | −1.277 | −0.980 | 0.851 | 1.878 | 0.962 | 0.851 |
| 124 | −1.227 | −0.945 | 0.851 | 1.818 | 0.942 | 0.851 |
| 125 | −1.173 | −0.907 | 0.851 | 1.754 | 0.920 | 0.851 |
| 126 | −1.113 | −0.866 | 0.851 | 1.685 | 0.897 | 0.851 |
| 127 | −1.045 | −0.820 | 0.851 | 1.609 | 0.872 | 0.851 |
| 128 | −0.969 | −0.770 | 0.851 | 1.521 | 0.842 | 0.851 |
| 129 | −0.890 | −0.719 | 0.851 | 1.428 | 0.811 | 0.851 |
| 130 | −0.808 | −0.666 | 0.851 | 1.332 | 0.779 | 0.851 |
| 131 | −0.722 | −0.611 | 0.851 | 1.231 | 0.745 | 0.851 |
| 132 | −0.632 | −0.553 | 0.851 | 1.127 | 0.710 | 0.851 |
| 133 | −0.538 | −0.494 | 0.851 | 1.019 | 0.673 | 0.851 |
| 134 | −0.441 | −0.433 | 0.851 | 0.906 | 0.634 | 0.851 |
| 135 | −0.340 | −0.370 | 0.851 | 0.791 | 0.593 | 0.851 |
| 136 | −0.236 | −0.306 | 0.851 | 0.671 | 0.550 | 0.851 |
| 137 | −0.131 | −0.241 | 0.851 | 0.552 | 0.505 | 0.851 |
| 138 | −0.027 | −0.177 | 0.851 | 0.433 | 0.460 | 0.851 |
| 139 | 0.078 | −0.113 | 0.851 | 0.315 | 0.413 | 0.851 |
| 140 | 0.184 | −0.050 | 0.851 | 0.197 | 0.365 | 0.851 |
| 141 | 0.289 | 0.013 | 0.851 | 0.080 | 0.314 | 0.851 |
| 142 | 0.395 | 0.076 | 0.851 | −0.035 | 0.261 | 0.851 |
| 143 | 0.501 | 0.138 | 0.851 | −0.150 | 0.206 | 0.851 |
| 144 | 0.607 | 0.199 | 0.851 | −0.263 | 0.148 | 0.851 |
| 145 | 0.714 | 0.260 | 0.851 | −0.374 | 0.086 | 0.851 |
| 146 | 0.821 | 0.321 | 0.851 | −0.483 | 0.021 | 0.851 |
| 147 | 0.929 | 0.380 | 0.851 | −0.590 | −0.048 | 0.851 |
| 148 | 1.033 | 0.437 | 0.851 | −0.690 | −0.119 | 0.851 |
| 149 | 1.134 | 0.491 | 0.851 | −0.784 | −0.192 | 0.851 |
| 150 | 1.232 | 0.543 | 0.851 | −0.871 | −0.266 | 0.851 |
| 151 | 1.326 | 0.592 | 0.851 | −0.952 | −0.341 | 0.851 |
| 152 | 1.417 | 0.639 | 0.851 | −1.027 | −0.416 | 0.851 |
| 153 | 1.505 | 0.684 | 0.851 | −1.095 | −0.491 | 0.851 |
| 154 | 1.589 | 0.726 | 0.851 | −1.158 | −0.566 | 0.851 |
| 155 | 1.669 | 0.766 | 0.851 | −1.216 | −0.639 | 0.851 |
| 156 | 1.739 | 0.801 | 0.851 | −1.267 | −0.707 | 0.851 |
| 157 | 1.802 | 0.831 | 0.851 | −1.310 | −0.769 | 0.851 |
| 158 | 1.861 | 0.860 | 0.851 | −1.348 | −0.826 | 0.851 |
| 159 | 1.916 | 0.887 | 0.851 | −1.382 | −0.879 | 0.851 |
| 160 | 1.964 | 0.910 | 0.851 | −1.411 | −0.926 | 0.851 |
| 161 | 2.001 | 0.928 | 0.851 | −1.433 | −0.963 | 0.851 |
| 162 | 2.030 | 0.942 | 0.851 | −1.449 | −0.993 | 0.851 |
| 163 | 2.053 | 0.952 | 0.851 | −1.455 | −1.017 | 0.851 |
| 164 | 2.066 | 0.964 | 0.851 | −1.454 | −1.036 | 0.851 |
| 165 | 2.071 | 0.978 | 0.851 | −1.451 | −1.046 | 0.851 |
| 166 | 2.071 | 0.986 | 0.851 | −1.447 | −1.052 | 0.851 |
| 167 | 2.070 | 0.991 | 0.851 | −1.445 | −1.054 | 0.851 |
| 168 | 2.070 | 0.992 | 0.851 | −1.444 | −1.055 | 0.851 |
| 169 | −1.476 | −1.065 | 1.588 | 2.065 | 0.975 | 1.588 |
| 170 | −1.475 | −1.066 | 1.588 | 2.065 | 0.977 | 1.588 |
| 171 | −1.474 | −1.067 | 1.588 | 2.064 | 0.979 | 1.588 |
| 172 | −1.471 | −1.069 | 1.588 | 2.061 | 0.983 | 1.588 |
| 173 | −1.465 | −1.071 | 1.588 | 2.055 | 0.989 | 1.588 |
| 174 | −1.455 | −1.072 | 1.588 | 2.042 | 0.995 | 1.588 |
| 175 | −1.437 | −1.069 | 1.588 | 2.023 | 0.992 | 1.588 |
| 176 | −1.415 | −1.058 | 1.588 | 1.999 | 0.984 | 1.588 |
| 177 | −1.388 | −1.039 | 1.588 | 1.967 | 0.973 | 1.588 |
| 178 | −1.356 | −1.013 | 1.588 | 1.927 | 0.960 | 1.588 |

TABLE I-continued

| | Pressure Side Surface | | | Suction Side Surface | | |
|---|---|---|---|---|---|---|
| N | X | Y | Z | X | Y | Z |
| 179 | −1.314 | −0.980 | 1.588 | 1.874 | 0.942 | 1.588 |
| 180 | −1.265 | −0.942 | 1.588 | 1.814 | 0.922 | 1.588 |
| 181 | −1.213 | −0.902 | 1.588 | 1.750 | 0.900 | 1.588 |
| 182 | −1.153 | −0.858 | 1.588 | 1.682 | 0.877 | 1.588 |
| 183 | −1.087 | −0.809 | 1.588 | 1.606 | 0.851 | 1.588 |
| 184 | −1.013 | −0.756 | 1.588 | 1.518 | 0.821 | 1.588 |
| 185 | −0.935 | −0.702 | 1.588 | 1.425 | 0.789 | 1.588 |
| 186 | −0.854 | −0.647 | 1.588 | 1.329 | 0.756 | 1.588 |
| 187 | −0.768 | −0.590 | 1.588 | 1.229 | 0.721 | 1.588 |
| 188 | −0.678 | −0.531 | 1.588 | 1.125 | 0.685 | 1.588 |
| 189 | −0.585 | −0.471 | 1.588 | 1.017 | 0.647 | 1.588 |
| 190 | −0.487 | −0.409 | 1.588 | 0.906 | 0.607 | 1.588 |
| 191 | −0.386 | −0.346 | 1.588 | 0.790 | 0.565 | 1.588 |
| 192 | −0.280 | −0.282 | 1.588 | 0.671 | 0.520 | 1.588 |
| 193 | −0.175 | −0.218 | 1.588 | 0.553 | 0.475 | 1.588 |
| 194 | −0.068 | −0.155 | 1.588 | 0.435 | 0.428 | 1.588 |
| 195 | 0.038 | −0.092 | 1.588 | 0.317 | 0.380 | 1.588 |
| 196 | 0.145 | −0.031 | 1.588 | 0.200 | 0.330 | 1.588 |
| 197 | 0.253 | 0.030 | 1.588 | 0.084 | 0.278 | 1.588 |
| 198 | 0.361 | 0.091 | 1.588 | −0.031 | 0.224 | 1.588 |
| 199 | 0.469 | 0.150 | 1.588 | −0.145 | 0.168 | 1.588 |
| 200 | 0.577 | 0.209 | 1.588 | −0.257 | 0.109 | 1.588 |
| 201 | 0.686 | 0.268 | 1.588 | −0.368 | 0.047 | 1.588 |
| 202 | 0.796 | 0.325 | 1.588 | −0.477 | −0.019 | 1.588 |
| 203 | 0.905 | 0.382 | 1.588 | −0.584 | −0.087 | 1.588 |
| 204 | 1.012 | 0.437 | 1.588 | −0.685 | −0.158 | 1.588 |
| 205 | 1.115 | 0.489 | 1.588 | −0.779 | −0.229 | 1.588 |
| 206 | 1.214 | 0.538 | 1.588 | −0.868 | −0.301 | 1.588 |
| 207 | 1.310 | 0.586 | 1.588 | −0.951 | −0.374 | 1.588 |
| 208 | 1.403 | 0.631 | 1.588 | −1.028 | −0.447 | 1.588 |
| 209 | 1.492 | 0.674 | 1.588 | −1.099 | −0.519 | 1.588 |
| 210 | 1.577 | 0.715 | 1.588 | −1.165 | −0.591 | 1.588 |
| 211 | 1.659 | 0.754 | 1.588 | −1.226 | −0.661 | 1.588 |
| 212 | 1.729 | 0.787 | 1.588 | −1.280 | −0.727 | 1.588 |
| 213 | 1.793 | 0.817 | 1.588 | −1.327 | −0.787 | 1.588 |
| 214 | 1.853 | 0.845 | 1.588 | −1.367 | −0.841 | 1.588 |
| 215 | 1.909 | 0.871 | 1.588 | −1.404 | −0.893 | 1.588 |
| 216 | 1.957 | 0.894 | 1.588 | −1.436 | −0.938 | 1.588 |
| 217 | 1.995 | 0.911 | 1.588 | −1.459 | −0.973 | 1.588 |
| 218 | 2.025 | 0.925 | 1.588 | −1.477 | −1.002 | 1.588 |
| 219 | 2.047 | 0.935 | 1.588 | −1.486 | −1.026 | 1.588 |
| 220 | 2.062 | 0.946 | 1.588 | −1.486 | −1.045 | 1.588 |
| 221 | 2.067 | 0.959 | 1.588 | −1.483 | −1.055 | 1.588 |
| 222 | 2.067 | 0.967 | 1.588 | −1.480 | −1.061 | 1.588 |
| 223 | 2.066 | 0.972 | 1.588 | −1.478 | −1.064 | 1.588 |
| 224 | 2.066 | 0.974 | 1.588 | −1.477 | −1.065 | 1.588 |
| 225 | −1.489 | −1.069 | 1.993 | 2.060 | 0.965 | 1.993 |
| 226 | −1.488 | −1.069 | 1.993 | 2.060 | 0.966 | 1.993 |
| 227 | −1.487 | −1.070 | 1.993 | 2.059 | 0.968 | 1.993 |
| 228 | −1.484 | −1.072 | 1.993 | 2.056 | 0.972 | 1.993 |
| 229 | −1.478 | −1.074 | 1.993 | 2.050 | 0.978 | 1.993 |
| 230 | −1.468 | −1.075 | 1.993 | 2.036 | 0.984 | 1.993 |
| 231 | −1.450 | −1.071 | 1.993 | 2.018 | 0.981 | 1.993 |
| 232 | −1.428 | −1.060 | 1.993 | 1.994 | 0.973 | 1.993 |
| 233 | −1.402 | −1.040 | 1.993 | 1.962 | 0.962 | 1.993 |
| 234 | −1.370 | −1.014 | 1.993 | 1.922 | 0.948 | 1.993 |
| 235 | −1.328 | −0.980 | 1.993 | 1.870 | 0.931 | 1.993 |
| 236 | −1.280 | −0.941 | 1.993 | 1.809 | 0.910 | 1.993 |
| 237 | −1.228 | −0.901 | 1.993 | 1.745 | 0.888 | 1.993 |
| 238 | −1.169 | −0.856 | 1.993 | 1.677 | 0.865 | 1.993 |
| 239 | −1.103 | −0.806 | 1.993 | 1.601 | 0.839 | 1.993 |
| 240 | −1.029 | −0.753 | 1.993 | 1.513 | 0.808 | 1.993 |
| 241 | −0.952 | −0.698 | 1.993 | 1.421 | 0.777 | 1.993 |
| 242 | −0.870 | −0.642 | 1.993 | 1.326 | 0.743 | 1.993 |
| 243 | −0.785 | −0.585 | 1.993 | 1.226 | 0.708 | 1.993 |
| 244 | −0.696 | −0.526 | 1.993 | 1.122 | 0.672 | 1.993 |
| 245 | −0.602 | −0.465 | 1.993 | 1.014 | 0.633 | 1.993 |
| 246 | −0.505 | −0.403 | 1.993 | 0.903 | 0.593 | 1.993 |
| 247 | −0.403 | −0.340 | 1.993 | 0.788 | 0.551 | 1.993 |
| 248 | −0.297 | −0.276 | 1.993 | 0.669 | 0.506 | 1.993 |
| 249 | −0.191 | −0.212 | 1.993 | 0.550 | 0.460 | 1.993 |
| 250 | −0.085 | −0.149 | 1.993 | 0.433 | 0.413 | 1.993 |
| 251 | 0.022 | −0.087 | 1.993 | 0.315 | 0.365 | 1.993 |
| 252 | 0.130 | −0.026 | 1.993 | 0.199 | 0.315 | 1.993 |
| 253 | 0.238 | 0.034 | 1.993 | 0.083 | 0.263 | 1.993 |
| 254 | 0.346 | 0.094 | 1.993 | −0.032 | 0.209 | 1.993 |
| 255 | 0.455 | 0.153 | 1.993 | −0.146 | 0.152 | 1.993 |
| 256 | 0.564 | 0.211 | 1.993 | −0.258 | 0.093 | 1.993 |
| 257 | 0.673 | 0.269 | 1.993 | −0.369 | 0.032 | 1.993 |
| 258 | 0.783 | 0.326 | 1.993 | −0.478 | −0.033 | 1.993 |
| 259 | 0.893 | 0.382 | 1.993 | −0.585 | −0.102 | 1.993 |
| 260 | 1.000 | 0.435 | 1.993 | −0.686 | −0.172 | 1.993 |
| 261 | 1.104 | 0.487 | 1.993 | −0.781 | −0.243 | 1.993 |
| 262 | 1.204 | 0.535 | 1.993 | −0.870 | −0.314 | 1.993 |
| 263 | 1.300 | 0.582 | 1.993 | −0.953 | −0.386 | 1.993 |
| 264 | 1.393 | 0.626 | 1.993 | −1.030 | −0.458 | 1.993 |
| 265 | 1.483 | 0.669 | 1.993 | −1.102 | −0.530 | 1.993 |
| 266 | 1.569 | 0.709 | 1.993 | −1.169 | −0.600 | 1.993 |
| 267 | 1.651 | 0.747 | 1.993 | −1.232 | −0.670 | 1.993 |
| 268 | 1.722 | 0.780 | 1.993 | −1.286 | −0.734 | 1.993 |
| 269 | 1.786 | 0.810 | 1.993 | −1.334 | −0.793 | 1.993 |
| 270 | 1.846 | 0.837 | 1.993 | −1.375 | −0.847 | 1.993 |
| 271 | 1.902 | 0.863 | 1.993 | −1.413 | −0.898 | 1.993 |
| 272 | 1.951 | 0.885 | 1.993 | −1.445 | −0.943 | 1.993 |
| 273 | 1.988 | 0.902 | 1.993 | −1.469 | −0.977 | 1.993 |
| 274 | 2.018 | 0.915 | 1.993 | −1.488 | −1.006 | 1.993 |
| 275 | 2.041 | 0.925 | 1.993 | −1.497 | −1.029 | 1.993 |
| 276 | 2.056 | 0.936 | 1.993 | −1.499 | −1.048 | 1.993 |
| 277 | 2.062 | 0.949 | 1.993 | −1.496 | −1.058 | 1.993 |
| 278 | 2.062 | 0.957 | 1.993 | −1.493 | −1.064 | 1.993 |
| 279 | 2.061 | 0.962 | 1.993 | −1.491 | −1.067 | 1.993 |
| 280 | 2.061 | 0.964 | 1.993 | −1.490 | −1.068 | 1.993 |
| 281 | −1.500 | −1.073 | 2.494 | 2.059 | 0.954 | 2.494 |
| 282 | −1.499 | −1.074 | 2.494 | 2.059 | 0.955 | 2.494 |
| 283 | −1.498 | −1.075 | 2.494 | 2.058 | 0.957 | 2.494 |
| 284 | −1.495 | −1.077 | 2.494 | 2.055 | 0.961 | 2.494 |
| 285 | −1.489 | −1.079 | 2.494 | 2.049 | 0.967 | 2.494 |
| 286 | −1.479 | −1.079 | 2.494 | 2.035 | 0.972 | 2.494 |
| 287 | −1.461 | −1.075 | 2.494 | 2.017 | 0.969 | 2.494 |
| 288 | −1.439 | −1.063 | 2.494 | 1.992 | 0.961 | 2.494 |
| 289 | −1.413 | −1.042 | 2.494 | 1.960 | 0.950 | 2.494 |
| 290 | −1.381 | −1.016 | 2.494 | 1.920 | 0.937 | 2.494 |
| 291 | −1.339 | −0.982 | 2.494 | 1.868 | 0.919 | 2.494 |
| 292 | −1.291 | −0.944 | 2.494 | 1.808 | 0.899 | 2.494 |
| 293 | −1.239 | −0.903 | 2.494 | 1.743 | 0.877 | 2.494 |
| 294 | −1.180 | −0.859 | 2.494 | 1.675 | 0.854 | 2.494 |
| 295 | −1.113 | −0.810 | 2.494 | 1.599 | 0.829 | 2.494 |
| 296 | −1.039 | −0.757 | 2.494 | 1.511 | 0.799 | 2.494 |
| 297 | −0.962 | −0.702 | 2.494 | 1.419 | 0.767 | 2.494 |
| 298 | −0.880 | −0.646 | 2.494 | 1.323 | 0.734 | 2.494 |
| 299 | −0.794 | −0.589 | 2.494 | 1.223 | 0.700 | 2.494 |
| 300 | −0.704 | −0.530 | 2.494 | 1.119 | 0.663 | 2.494 |
| 301 | −0.611 | −0.470 | 2.494 | 1.011 | 0.625 | 2.494 |
| 302 | −0.513 | −0.408 | 2.494 | 0.899 | 0.585 | 2.494 |
| 303 | −0.411 | −0.345 | 2.494 | 0.784 | 0.543 | 2.494 |
| 304 | −0.305 | −0.281 | 2.494 | 0.665 | 0.499 | 2.494 |
| 305 | −0.199 | −0.218 | 2.494 | 0.546 | 0.454 | 2.494 |
| 306 | −0.092 | −0.155 | 2.494 | 0.428 | 0.407 | 2.494 |
| 307 | 0.015 | −0.093 | 2.494 | 0.310 | 0.359 | 2.494 |
| 308 | 0.123 | −0.032 | 2.494 | 0.193 | 0.309 | 2.494 |
| 309 | 0.231 | 0.028 | 2.494 | 0.077 | 0.257 | 2.494 |
| 310 | 0.340 | 0.087 | 2.494 | −0.038 | 0.203 | 2.494 |
| 311 | 0.449 | 0.146 | 2.494 | −0.151 | 0.147 | 2.494 |
| 312 | 0.558 | 0.204 | 2.494 | −0.264 | 0.088 | 2.494 |
| 313 | 0.668 | 0.262 | 2.494 | −0.375 | 0.026 | 2.494 |
| 314 | 0.778 | 0.318 | 2.494 | −0.484 | −0.039 | 2.494 |
| 315 | 0.889 | 0.374 | 2.494 | −0.591 | −0.108 | 2.494 |
| 316 | 0.996 | 0.427 | 2.494 | −0.692 | −0.177 | 2.494 |
| 317 | 1.099 | 0.478 | 2.494 | −0.787 | −0.248 | 2.494 |
| 318 | 1.200 | 0.527 | 2.494 | −0.876 | −0.320 | 2.494 |
| 319 | 1.296 | 0.573 | 2.494 | −0.959 | −0.392 | 2.494 |
| 320 | 1.390 | 0.618 | 2.494 | −1.037 | −0.464 | 2.494 |
| 321 | 1.479 | 0.660 | 2.494 | −1.110 | −0.535 | 2.494 |
| 322 | 1.565 | 0.700 | 2.494 | −1.177 | −0.606 | 2.494 |
| 323 | 1.648 | 0.738 | 2.494 | −1.239 | −0.675 | 2.494 |
| 324 | 1.719 | 0.771 | 2.494 | −1.294 | −0.739 | 2.494 |
| 325 | 1.783 | 0.800 | 2.494 | −1.342 | −0.799 | 2.494 |
| 326 | 1.843 | 0.827 | 2.494 | −1.384 | −0.852 | 2.494 |
| 327 | 1.900 | 0.852 | 2.494 | −1.422 | −0.903 | 2.494 |
| 328 | 1.948 | 0.874 | 2.494 | −1.454 | −0.948 | 2.494 |
| 329 | 1.986 | 0.891 | 2.494 | −1.478 | −0.982 | 2.494 |
| 330 | 2.016 | 0.905 | 2.494 | −1.497 | −1.011 | 2.494 |

TABLE I-continued

| | Pressure Side Surface | | | Suction Side Surface | | |
|---|---|---|---|---|---|---|
| N | X | Y | Z | X | Y | Z |
| 331 | 2.039 | 0.915 | 2.494 | −1.507 | −1.034 | 2.494 |
| 332 | 2.054 | 0.925 | 2.494 | −1.509 | −1.053 | 2.494 |
| 333 | 2.060 | 0.938 | 2.494 | −1.507 | −1.063 | 2.494 |
| 334 | 2.061 | 0.946 | 2.494 | −1.504 | −1.069 | 2.494 |
| 335 | 2.060 | 0.951 | 2.494 | −1.502 | −1.072 | 2.494 |
| 336 | 2.060 | 0.953 | 2.494 | −1.501 | −1.073 | 2.494 |
| 337 | −1.507 | −1.080 | 2.994 | 2.062 | 0.946 | 2.994 |
| 338 | −1.507 | −1.081 | 2.994 | 2.061 | 0.947 | 2.994 |
| 339 | −1.505 | −1.082 | 2.994 | 2.060 | 0.949 | 2.994 |
| 340 | −1.503 | −1.084 | 2.994 | 2.058 | 0.953 | 2.994 |
| 341 | −1.496 | −1.086 | 2.994 | 2.051 | 0.959 | 2.994 |
| 342 | −1.486 | −1.086 | 2.994 | 2.038 | 0.964 | 2.994 |
| 343 | −1.468 | −1.081 | 2.994 | 2.019 | 0.960 | 2.994 |
| 344 | −1.447 | −1.069 | 2.994 | 1.995 | 0.952 | 2.994 |
| 345 | −1.421 | −1.048 | 2.994 | 1.963 | 0.942 | 2.994 |
| 346 | −1.389 | −1.022 | 2.994 | 1.922 | 0.929 | 2.994 |
| 347 | −1.347 | −0.989 | 2.994 | 1.870 | 0.912 | 2.994 |
| 348 | −1.298 | −0.950 | 2.994 | 1.809 | 0.892 | 2.994 |
| 349 | −1.245 | −0.910 | 2.994 | 1.744 | 0.871 | 2.994 |
| 350 | −1.185 | −0.866 | 2.994 | 1.676 | 0.849 | 2.994 |
| 351 | −1.119 | −0.817 | 2.994 | 1.599 | 0.823 | 2.994 |
| 352 | −1.044 | −0.765 | 2.994 | 1.511 | 0.794 | 2.994 |
| 353 | −0.966 | −0.711 | 2.994 | 1.418 | 0.763 | 2.994 |
| 354 | −0.884 | −0.655 | 2.994 | 1.321 | 0.731 | 2.994 |
| 355 | −0.798 | −0.598 | 2.994 | 1.221 | 0.697 | 2.994 |
| 356 | −0.707 | −0.540 | 2.994 | 1.116 | 0.662 | 2.994 |
| 357 | −0.613 | −0.480 | 2.994 | 1.008 | 0.624 | 2.994 |
| 358 | −0.515 | −0.419 | 2.994 | 0.895 | 0.585 | 2.994 |
| 359 | −0.412 | −0.357 | 2.994 | 0.779 | 0.544 | 2.994 |
| 360 | −0.306 | −0.293 | 2.994 | 0.660 | 0.500 | 2.994 |
| 361 | −0.200 | −0.229 | 2.994 | 0.540 | 0.455 | 2.994 |
| 362 | −0.092 | −0.167 | 2.994 | 0.422 | 0.409 | 2.994 |
| 363 | 0.015 | −0.105 | 2.994 | 0.304 | 0.361 | 2.994 |
| 364 | 0.123 | −0.044 | 2.994 | 0.186 | 0.311 | 2.994 |
| 365 | 0.231 | 0.016 | 2.994 | 0.070 | 0.259 | 2.994 |
| 366 | 0.340 | 0.076 | 2.994 | −0.045 | 0.205 | 2.994 |
| 367 | 0.449 | 0.135 | 2.994 | −0.160 | 0.149 | 2.994 |
| 368 | 0.559 | 0.193 | 2.994 | −0.272 | 0.090 | 2.994 |
| 369 | 0.669 | 0.251 | 2.994 | −0.383 | 0.027 | 2.994 |
| 370 | 0.779 | 0.308 | 2.994 | −0.493 | −0.038 | 2.994 |
| 371 | 0.889 | 0.364 | 2.994 | −0.600 | −0.108 | 2.994 |
| 372 | 0.997 | 0.417 | 2.994 | −0.701 | −0.178 | 2.994 |
| 373 | 1.101 | 0.468 | 2.994 | −0.796 | −0.250 | 2.994 |
| 374 | 1.201 | 0.517 | 2.994 | −0.885 | −0.322 | 2.994 |
| 375 | 1.298 | 0.564 | 2.994 | −0.968 | −0.394 | 2.994 |
| 376 | 1.391 | 0.608 | 2.994 | −1.045 | −0.467 | 2.994 |
| 377 | 1.481 | 0.651 | 2.994 | −1.117 | −0.539 | 2.994 |
| 378 | 1.567 | 0.691 | 2.994 | −1.184 | −0.610 | 2.994 |
| 379 | 1.649 | 0.729 | 2.994 | −1.247 | −0.680 | 2.994 |
| 380 | 1.721 | 0.762 | 2.994 | −1.301 | −0.745 | 2.994 |
| 381 | 1.785 | 0.791 | 2.994 | −1.349 | −0.804 | 2.994 |
| 382 | 1.845 | 0.819 | 2.994 | −1.391 | −0.858 | 2.994 |
| 383 | 1.902 | 0.844 | 2.994 | −1.428 | −0.909 | 2.994 |
| 384 | 1.951 | 0.866 | 2.994 | −1.460 | −0.954 | 2.994 |
| 385 | 1.988 | 0.883 | 2.994 | −1.484 | −0.989 | 2.994 |
| 386 | 2.018 | 0.897 | 2.994 | −1.503 | −1.018 | 2.994 |
| 387 | 2.041 | 0.907 | 2.994 | −1.514 | −1.041 | 2.994 |
| 388 | 2.057 | 0.917 | 2.994 | −1.517 | −1.060 | 2.994 |
| 389 | 2.063 | 0.929 | 2.994 | −1.514 | −1.070 | 2.994 |
| 390 | 2.064 | 0.938 | 2.994 | −1.511 | −1.076 | 2.994 |
| 391 | 2.063 | 0.942 | 2.994 | −1.509 | −1.079 | 2.994 |
| 392 | 2.062 | 0.944 | 2.994 | −1.508 | −1.080 | 2.994 |
| 393 | −1.521 | −1.099 | 3.861 | 2.072 | 0.937 | 3.861 |
| 394 | −1.520 | −1.100 | 3.861 | 2.071 | 0.938 | 3.861 |
| 395 | −1.519 | −1.101 | 3.861 | 2.070 | 0.940 | 3.861 |
| 396 | −1.516 | −1.102 | 3.861 | 2.068 | 0.944 | 3.861 |
| 397 | −1.510 | −1.104 | 3.861 | 2.061 | 0.950 | 3.861 |
| 398 | −1.499 | −1.104 | 3.861 | 2.047 | 0.955 | 3.861 |
| 399 | −1.482 | −1.099 | 3.861 | 2.029 | 0.951 | 3.861 |
| 400 | −1.461 | −1.085 | 3.861 | 2.004 | 0.944 | 3.861 |
| 401 | −1.435 | −1.065 | 3.861 | 1.971 | 0.933 | 3.861 |
| 402 | −1.402 | −1.039 | 3.861 | 1.931 | 0.921 | 3.861 |
| 403 | −1.360 | −1.005 | 3.861 | 1.877 | 0.904 | 3.861 |
| 404 | −1.311 | −0.967 | 3.861 | 1.816 | 0.885 | 3.861 |
| 405 | −1.257 | −0.927 | 3.861 | 1.751 | 0.865 | 3.861 |
| 406 | −1.197 | −0.883 | 3.861 | 1.681 | 0.843 | 3.861 |

TABLE I-continued

| | Pressure Side Surface | | | Suction Side Surface | | |
|---|---|---|---|---|---|---|
| N | X | Y | Z | X | Y | Z |
| 407 | −1.129 | −0.834 | 3.861 | 1.604 | 0.819 | 3.861 |
| 408 | −1.054 | −0.782 | 3.861 | 1.514 | 0.791 | 3.861 |
| 409 | −0.975 | −0.728 | 3.861 | 1.420 | 0.761 | 3.861 |
| 410 | −0.892 | −0.673 | 3.861 | 1.322 | 0.730 | 3.861 |
| 411 | −0.805 | −0.616 | 3.861 | 1.221 | 0.698 | 3.861 |
| 412 | −0.714 | −0.558 | 3.861 | 1.115 | 0.663 | 3.861 |
| 413 | −0.618 | −0.499 | 3.861 | 1.005 | 0.627 | 3.861 |
| 414 | −0.519 | −0.438 | 3.861 | 0.892 | 0.588 | 3.861 |
| 415 | −0.416 | −0.376 | 3.861 | 0.775 | 0.547 | 3.861 |
| 416 | −0.309 | −0.312 | 3.861 | 0.654 | 0.504 | 3.861 |
| 417 | −0.201 | −0.249 | 3.861 | 0.534 | 0.459 | 3.861 |
| 418 | −0.093 | −0.186 | 3.861 | 0.414 | 0.413 | 3.861 |
| 419 | 0.015 | −0.124 | 3.861 | 0.295 | 0.365 | 3.861 |
| 420 | 0.124 | −0.063 | 3.861 | 0.177 | 0.315 | 3.861 |
| 421 | 0.233 | −0.002 | 3.861 | 0.060 | 0.262 | 3.861 |
| 422 | 0.342 | 0.058 | 3.861 | −0.056 | 0.207 | 3.861 |
| 423 | 0.452 | 0.117 | 3.861 | −0.171 | 0.150 | 3.861 |
| 424 | 0.562 | 0.176 | 3.861 | −0.284 | 0.089 | 3.861 |
| 425 | 0.672 | 0.234 | 3.861 | −0.396 | 0.026 | 3.861 |
| 426 | 0.783 | 0.291 | 3.861 | −0.505 | −0.041 | 3.861 |
| 427 | 0.894 | 0.348 | 3.861 | −0.612 | −0.112 | 3.861 |
| 428 | 1.002 | 0.402 | 3.861 | −0.713 | −0.184 | 3.861 |
| 429 | 1.106 | 0.454 | 3.861 | −0.808 | −0.257 | 3.861 |
| 430 | 1.207 | 0.503 | 3.861 | −0.897 | −0.331 | 3.861 |
| 431 | 1.304 | 0.551 | 3.861 | −0.980 | −0.405 | 3.861 |
| 432 | 1.398 | 0.595 | 3.861 | −1.057 | −0.479 | 3.861 |
| 433 | 1.488 | 0.638 | 3.861 | −1.129 | −0.552 | 3.861 |
| 434 | 1.574 | 0.679 | 3.861 | −1.196 | −0.624 | 3.861 |
| 435 | 1.657 | 0.717 | 3.861 | −1.258 | −0.694 | 3.861 |
| 436 | 1.729 | 0.751 | 3.861 | −1.313 | −0.760 | 3.861 |
| 437 | 1.793 | 0.780 | 3.861 | −1.361 | −0.821 | 3.861 |
| 438 | 1.854 | 0.808 | 3.861 | −1.402 | −0.875 | 3.861 |
| 439 | 1.910 | 0.834 | 3.861 | −1.440 | −0.927 | 3.861 |
| 440 | 1.960 | 0.856 | 3.861 | −1.472 | −0.973 | 3.861 |
| 441 | 1.997 | 0.874 | 3.861 | −1.496 | −1.008 | 3.861 |
| 442 | 2.028 | 0.887 | 3.861 | −1.515 | −1.037 | 3.861 |
| 443 | 2.050 | 0.898 | 3.861 | −1.526 | −1.059 | 3.861 |
| 444 | 2.066 | 0.907 | 3.861 | −1.530 | −1.078 | 3.861 |
| 445 | 2.073 | 0.920 | 3.861 | −1.528 | −1.089 | 3.861 |
| 446 | 2.074 | 0.928 | 3.861 | −1.525 | −1.095 | 3.861 |
| 447 | 2.073 | 0.933 | 3.861 | −1.523 | −1.097 | 3.861 |
| 448 | 2.072 | 0.935 | 3.861 | −1.522 | −1.099 | 3.861 |
| 449 | −1.527 | −1.108 | 4.279 | 2.071 | 0.931 | 4.279 |
| 450 | −1.527 | −1.109 | 4.279 | 2.071 | 0.933 | 4.279 |
| 451 | −1.526 | −1.110 | 4.279 | 2.070 | 0.935 | 4.279 |
| 452 | −1.523 | −1.111 | 4.279 | 2.067 | 0.939 | 4.279 |
| 453 | −1.516 | −1.113 | 4.279 | 2.061 | 0.945 | 4.279 |
| 454 | −1.506 | −1.113 | 4.279 | 2.047 | 0.950 | 4.279 |
| 455 | −1.488 | −1.107 | 4.279 | 2.028 | 0.946 | 4.279 |
| 456 | −1.467 | −1.093 | 4.279 | 2.004 | 0.938 | 4.279 |
| 457 | −1.442 | −1.071 | 4.279 | 1.971 | 0.928 | 4.279 |
| 458 | −1.410 | −1.045 | 4.279 | 1.930 | 0.916 | 4.279 |
| 459 | −1.368 | −1.011 | 4.279 | 1.877 | 0.899 | 4.279 |
| 460 | −1.319 | −0.972 | 4.279 | 1.815 | 0.880 | 4.279 |
| 461 | −1.266 | −0.931 | 4.279 | 1.750 | 0.860 | 4.279 |
| 462 | −1.206 | −0.886 | 4.279 | 1.681 | 0.838 | 4.279 |
| 463 | −1.139 | −0.837 | 4.279 | 1.603 | 0.814 | 4.279 |
| 464 | −1.064 | −0.783 | 4.279 | 1.513 | 0.786 | 4.279 |
| 465 | −0.985 | −0.729 | 4.279 | 1.419 | 0.756 | 4.279 |
| 466 | −0.903 | −0.673 | 4.279 | 1.321 | 0.725 | 4.279 |
| 467 | −0.816 | −0.616 | 4.279 | 1.220 | 0.692 | 4.279 |
| 468 | −0.725 | −0.557 | 4.279 | 1.114 | 0.657 | 4.279 |
| 469 | −0.629 | −0.497 | 4.279 | 1.004 | 0.621 | 4.279 |
| 470 | −0.530 | −0.436 | 4.279 | 0.891 | 0.582 | 4.279 |
| 471 | −0.427 | −0.373 | 4.279 | 0.774 | 0.541 | 4.279 |
| 472 | −0.319 | −0.310 | 4.279 | 0.653 | 0.497 | 4.279 |
| 473 | −0.211 | −0.246 | 4.279 | 0.533 | 0.452 | 4.279 |
| 474 | −0.103 | −0.184 | 4.279 | 0.413 | 0.405 | 4.279 |
| 475 | 0.006 | −0.122 | 4.279 | 0.295 | 0.356 | 4.279 |
| 476 | 0.115 | −0.061 | 4.279 | 0.177 | 0.305 | 4.279 |
| 477 | 0.224 | −0.001 | 4.279 | 0.060 | 0.252 | 4.279 |
| 478 | 0.334 | 0.059 | 4.279 | −0.056 | 0.197 | 4.279 |
| 479 | 0.444 | 0.118 | 4.279 | −0.171 | 0.139 | 4.279 |
| 480 | 0.555 | 0.176 | 4.279 | −0.284 | 0.078 | 4.279 |
| 481 | 0.665 | 0.234 | 4.279 | −0.395 | 0.014 | 4.279 |
| 482 | 0.777 | 0.291 | 4.279 | −0.504 | −0.054 | 4.279 |

TABLE I-continued

| | Pressure Side Surface | | | Suction Side Surface | | |
|---|---|---|---|---|---|---|
| N | X | Y | Z | X | Y | Z |
| 483 | 0.888 | 0.347 | 4.279 | −0.611 | −0.125 | 4.279 |
| 484 | 0.997 | 0.401 | 4.279 | −0.712 | −0.197 | 4.279 |
| 485 | 1.101 | 0.452 | 4.279 | −0.807 | −0.270 | 4.279 |
| 486 | 1.203 | 0.501 | 4.279 | −0.896 | −0.344 | 4.279 |
| 487 | 1.300 | 0.548 | 4.279 | −0.979 | −0.418 | 4.279 |
| 488 | 1.394 | 0.592 | 4.279 | −1.057 | −0.491 | 4.279 |
| 489 | 1.485 | 0.635 | 4.279 | −1.130 | −0.564 | 4.279 |
| 490 | 1.572 | 0.675 | 4.279 | −1.197 | −0.636 | 4.279 |
| 491 | 1.655 | 0.714 | 4.279 | −1.260 | −0.706 | 4.279 |
| 492 | 1.727 | 0.747 | 4.279 | −1.315 | −0.771 | 4.279 |
| 493 | 1.791 | 0.776 | 4.279 | −1.363 | −0.831 | 4.279 |
| 494 | 1.852 | 0.804 | 4.279 | −1.405 | −0.886 | 4.279 |
| 495 | 1.909 | 0.829 | 4.279 | −1.443 | −0.937 | 4.279 |
| 496 | 1.958 | 0.852 | 4.279 | −1.476 | −0.982 | 4.279 |
| 497 | 1.996 | 0.869 | 4.279 | −1.500 | −1.018 | 4.279 |
| 498 | 2.027 | 0.883 | 4.279 | −1.519 | −1.046 | 4.279 |
| 499 | 2.049 | 0.893 | 4.279 | −1.532 | −1.068 | 4.279 |
| 500 | 2.065 | 0.902 | 4.279 | −1.536 | −1.087 | 4.279 |
| 501 | 2.072 | 0.915 | 4.279 | −1.534 | −1.097 | 4.279 |
| 502 | 2.073 | 0.923 | 4.279 | −1.531 | −1.104 | 4.279 |
| 503 | 2.072 | 0.928 | 4.279 | −1.529 | −1.106 | 4.279 |
| 504 | 2.072 | 0.930 | 4.279 | −1.528 | −1.107 | 4.279 |
| 505 | −1.534 | −1.119 | 4.919 | 2.061 | 0.921 | 4.919 |
| 506 | −1.533 | −1.120 | 4.919 | 2.061 | 0.922 | 4.919 |
| 507 | −1.532 | −1.121 | 4.919 | 2.060 | 0.924 | 4.919 |
| 508 | −1.529 | −1.122 | 4.919 | 2.057 | 0.928 | 4.919 |
| 509 | −1.523 | −1.124 | 4.919 | 2.051 | 0.934 | 4.919 |
| 510 | −1.512 | −1.123 | 4.919 | 2.037 | 0.939 | 4.919 |
| 511 | −1.495 | −1.117 | 4.919 | 2.018 | 0.935 | 4.919 |
| 512 | −1.475 | −1.102 | 4.919 | 1.994 | 0.927 | 4.919 |
| 513 | −1.450 | −1.079 | 4.919 | 1.961 | 0.917 | 4.919 |
| 514 | −1.419 | −1.052 | 4.919 | 1.921 | 0.904 | 4.919 |
| 515 | −1.378 | −1.016 | 4.919 | 1.868 | 0.887 | 4.919 |
| 516 | −1.330 | −0.976 | 4.919 | 1.807 | 0.868 | 4.919 |
| 517 | −1.279 | −0.934 | 4.919 | 1.742 | 0.847 | 4.919 |
| 518 | −1.220 | −0.887 | 4.919 | 1.673 | 0.825 | 4.919 |
| 519 | −1.154 | −0.836 | 4.919 | 1.595 | 0.800 | 4.919 |
| 520 | −1.081 | −0.781 | 4.919 | 1.506 | 0.772 | 4.919 |
| 521 | −1.003 | −0.724 | 4.919 | 1.413 | 0.741 | 4.919 |
| 522 | −0.922 | −0.666 | 4.919 | 1.316 | 0.709 | 4.919 |
| 523 | −0.836 | −0.607 | 4.919 | 1.214 | 0.676 | 4.919 |
| 524 | −0.746 | −0.547 | 4.919 | 1.109 | 0.640 | 4.919 |
| 525 | −0.651 | −0.486 | 4.919 | 1.000 | 0.603 | 4.919 |
| 526 | −0.553 | −0.424 | 4.919 | 0.888 | 0.563 | 4.919 |
| 527 | −0.450 | −0.361 | 4.919 | 0.771 | 0.521 | 4.919 |
| 528 | −0.342 | −0.296 | 4.919 | 0.651 | 0.476 | 4.919 |
| 529 | −0.235 | −0.233 | 4.919 | 0.532 | 0.430 | 4.919 |
| 530 | −0.126 | −0.170 | 4.919 | 0.413 | 0.382 | 4.919 |
| 531 | −0.017 | −0.109 | 4.919 | 0.295 | 0.333 | 4.919 |
| 532 | 0.092 | −0.049 | 4.919 | 0.178 | 0.281 | 4.919 |
| 533 | 0.202 | 0.011 | 4.919 | 0.062 | 0.227 | 4.919 |
| 534 | 0.312 | 0.070 | 4.919 | −0.053 | 0.171 | 4.919 |
| 535 | 0.423 | 0.128 | 4.919 | −0.167 | 0.112 | 4.919 |
| 536 | 0.534 | 0.185 | 4.919 | −0.279 | 0.050 | 4.919 |
| 537 | 0.646 | 0.241 | 4.919 | −0.389 | −0.014 | 4.919 |
| 538 | 0.758 | 0.297 | 4.919 | −0.498 | −0.082 | 4.919 |
| 539 | 0.870 | 0.352 | 4.919 | −0.604 | −0.153 | 4.919 |
| 540 | 0.979 | 0.404 | 4.919 | −0.705 | −0.225 | 4.919 |
| 541 | 1.085 | 0.454 | 4.919 | −0.800 | −0.297 | 4.919 |
| 542 | 1.187 | 0.501 | 4.919 | −0.889 | −0.370 | 4.919 |
| 543 | 1.285 | 0.547 | 4.919 | −0.973 | −0.442 | 4.919 |
| 544 | 1.380 | 0.590 | 4.919 | −1.052 | −0.515 | 4.919 |
| 545 | 1.471 | 0.632 | 4.919 | −1.125 | −0.586 | 4.919 |
| 546 | 1.558 | 0.671 | 4.919 | −1.194 | −0.656 | 4.919 |
| 547 | 1.642 | 0.709 | 4.919 | −1.257 | −0.725 | 4.919 |
| 548 | 1.714 | 0.741 | 4.919 | −1.314 | −0.789 | 4.919 |
| 549 | 1.779 | 0.769 | 4.919 | −1.363 | −0.848 | 4.919 |
| 550 | 1.840 | 0.796 | 4.919 | −1.406 | −0.901 | 4.919 |
| 551 | 1.898 | 0.821 | 4.919 | −1.446 | −0.952 | 4.919 |
| 552 | 1.947 | 0.843 | 4.919 | −1.479 | −0.996 | 4.919 |
| 553 | 1.985 | 0.859 | 4.919 | −1.504 | −1.030 | 4.919 |
| 554 | 2.016 | 0.873 | 4.919 | −1.524 | −1.058 | 4.919 |
| 555 | 2.039 | 0.883 | 4.919 | −1.538 | −1.080 | 4.919 |
| 556 | 2.055 | 0.892 | 4.919 | −1.542 | −1.098 | 4.919 |
| 557 | 2.062 | 0.904 | 4.919 | −1.541 | −1.109 | 4.919 |
| 558 | 2.063 | 0.913 | 4.919 | −1.538 | −1.115 | 4.919 |

TABLE I-continued

| | Pressure Side Surface | | | Suction Side Surface | | |
|---|---|---|---|---|---|---|
| N | X | Y | Z | X | Y | Z |
| 559 | 2.062 | 0.918 | 4.919 | −1.536 | −1.118 | 4.919 |
| 560 | 2.062 | 0.920 | 4.919 | −1.535 | −1.119 | 4.919 |
| 561 | −1.529 | −1.128 | 5.620 | 2.050 | 0.906 | 5.620 |
| 562 | −1.528 | −1.128 | 5.620 | 2.050 | 0.908 | 5.620 |
| 563 | −1.527 | −1.129 | 5.620 | 2.049 | 0.910 | 5.620 |
| 564 | −1.524 | −1.131 | 5.620 | 2.046 | 0.914 | 5.620 |
| 565 | −1.517 | −1.132 | 5.620 | 2.040 | 0.920 | 5.620 |
| 566 | −1.507 | −1.132 | 5.620 | 2.026 | 0.924 | 5.620 |
| 567 | −1.490 | −1.124 | 5.620 | 2.008 | 0.920 | 5.620 |
| 568 | −1.470 | −1.109 | 5.620 | 1.983 | 0.912 | 5.620 |
| 569 | −1.446 | −1.086 | 5.620 | 1.951 | 0.902 | 5.620 |
| 570 | −1.415 | −1.058 | 5.620 | 1.910 | 0.889 | 5.620 |
| 571 | −1.375 | −1.022 | 5.620 | 1.858 | 0.873 | 5.620 |
| 572 | −1.329 | −0.981 | 5.620 | 1.797 | 0.854 | 5.620 |
| 573 | −1.278 | −0.938 | 5.620 | 1.732 | 0.833 | 5.620 |
| 574 | −1.221 | −0.890 | 5.620 | 1.663 | 0.811 | 5.620 |
| 575 | −1.156 | −0.838 | 5.620 | 1.587 | 0.787 | 5.620 |
| 576 | −1.084 | −0.782 | 5.620 | 1.498 | 0.758 | 5.620 |
| 577 | −1.007 | −0.724 | 5.620 | 1.405 | 0.728 | 5.620 |
| 578 | −0.927 | −0.665 | 5.620 | 1.308 | 0.696 | 5.620 |
| 579 | −0.842 | −0.605 | 5.620 | 1.207 | 0.663 | 5.620 |
| 580 | −0.753 | −0.544 | 5.620 | 1.103 | 0.627 | 5.620 |
| 581 | −0.660 | −0.482 | 5.620 | 0.994 | 0.590 | 5.620 |
| 582 | −0.562 | −0.419 | 5.620 | 0.882 | 0.550 | 5.620 |
| 583 | −0.460 | −0.356 | 5.620 | 0.767 | 0.508 | 5.620 |
| 584 | −0.353 | −0.291 | 5.620 | 0.648 | 0.463 | 5.620 |
| 585 | −0.246 | −0.228 | 5.620 | 0.529 | 0.416 | 5.620 |
| 586 | −0.138 | −0.165 | 5.620 | 0.411 | 0.368 | 5.620 |
| 587 | −0.029 | −0.104 | 5.620 | 0.294 | 0.318 | 5.620 |
| 588 | 0.080 | −0.044 | 5.620 | 0.178 | 0.266 | 5.620 |
| 589 | 0.190 | 0.015 | 5.620 | 0.063 | 0.212 | 5.620 |
| 590 | 0.300 | 0.073 | 5.620 | −0.051 | 0.155 | 5.620 |
| 591 | 0.411 | 0.130 | 5.620 | −0.164 | 0.096 | 5.620 |
| 592 | 0.522 | 0.187 | 5.620 | −0.275 | 0.034 | 5.620 |
| 593 | 0.633 | 0.242 | 5.620 | −0.385 | −0.031 | 5.620 |
| 594 | 0.745 | 0.297 | 5.620 | −0.493 | −0.099 | 5.620 |
| 595 | 0.858 | 0.351 | 5.620 | −0.598 | −0.170 | 5.620 |
| 596 | 0.967 | 0.402 | 5.620 | −0.698 | −0.242 | 5.620 |
| 597 | 1.072 | 0.451 | 5.620 | −0.793 | −0.314 | 5.620 |
| 598 | 1.174 | 0.497 | 5.620 | −0.882 | −0.387 | 5.620 |
| 599 | 1.273 | 0.542 | 5.620 | −0.965 | −0.459 | 5.620 |
| 600 | 1.368 | 0.584 | 5.620 | −1.044 | −0.530 | 5.620 |
| 601 | 1.459 | 0.625 | 5.620 | −1.117 | −0.601 | 5.620 |
| 602 | 1.546 | 0.663 | 5.620 | −1.186 | −0.670 | 5.620 |
| 603 | 1.630 | 0.700 | 5.620 | −1.250 | −0.738 | 5.620 |
| 604 | 1.702 | 0.731 | 5.620 | −1.306 | −0.801 | 5.620 |
| 605 | 1.767 | 0.759 | 5.620 | −1.356 | −0.859 | 5.620 |
| 606 | 1.828 | 0.785 | 5.620 | −1.399 | −0.912 | 5.620 |
| 607 | 1.886 | 0.809 | 5.620 | −1.439 | −0.962 | 5.620 |
| 608 | 1.936 | 0.830 | 5.620 | −1.473 | −1.006 | 5.620 |
| 609 | 1.974 | 0.846 | 5.620 | −1.498 | −1.040 | 5.620 |
| 610 | 2.004 | 0.859 | 5.620 | −1.518 | −1.067 | 5.620 |
| 611 | 2.027 | 0.869 | 5.620 | −1.532 | −1.088 | 5.620 |
| 612 | 2.044 | 0.878 | 5.620 | −1.537 | −1.107 | 5.620 |
| 613 | 2.051 | 0.890 | 5.620 | −1.535 | −1.117 | 5.620 |
| 614 | 2.052 | 0.898 | 5.620 | −1.533 | −1.123 | 5.620 |
| 615 | 2.051 | 0.903 | 5.620 | −1.531 | −1.126 | 5.620 |
| 616 | 2.051 | 0.905 | 5.620 | −1.529 | −1.127 | 5.620 |
| 617 | −1.497 | −1.126 | 6.398 | 2.017 | 0.882 | 6.398 |
| 618 | −1.496 | −1.126 | 6.398 | 2.016 | 0.884 | 6.398 |
| 619 | −1.495 | −1.127 | 6.398 | 2.015 | 0.886 | 6.398 |
| 620 | −1.492 | −1.129 | 6.398 | 2.013 | 0.890 | 6.398 |
| 621 | −1.485 | −1.130 | 6.398 | 2.006 | 0.895 | 6.398 |
| 622 | −1.475 | −1.130 | 6.398 | 1.993 | 0.900 | 6.398 |
| 623 | −1.458 | −1.123 | 6.398 | 1.974 | 0.896 | 6.398 |
| 624 | −1.439 | −1.107 | 6.398 | 1.950 | 0.889 | 6.398 |
| 625 | −1.416 | −1.085 | 6.398 | 1.918 | 0.879 | 6.398 |
| 626 | −1.386 | −1.057 | 6.398 | 1.878 | 0.867 | 6.398 |
| 627 | −1.347 | −1.021 | 6.398 | 1.826 | 0.851 | 6.398 |
| 628 | −1.301 | −0.980 | 6.398 | 1.767 | 0.833 | 6.398 |
| 629 | −1.252 | −0.937 | 6.398 | 1.703 | 0.813 | 6.398 |
| 630 | −1.196 | −0.889 | 6.398 | 1.635 | 0.792 | 6.398 |
| 631 | −1.133 | −0.838 | 6.398 | 1.559 | 0.769 | 6.398 |
| 632 | −1.062 | −0.782 | 6.398 | 1.471 | 0.742 | 6.398 |
| 633 | −0.988 | −0.725 | 6.398 | 1.379 | 0.713 | 6.398 |
| 634 | −0.909 | −0.666 | 6.398 | 1.284 | 0.682 | 6.398 |

TABLE I-continued

| | Pressure Side Surface | | | Suction Side Surface | | |
|---|---|---|---|---|---|---|
| N | X | Y | Z | X | Y | Z |
| 635 | −0.826 | −0.606 | 6.398 | 1.185 | 0.650 | 6.398 |
| 636 | −0.739 | −0.546 | 6.398 | 1.081 | 0.616 | 6.398 |
| 637 | −0.647 | −0.485 | 6.398 | 0.975 | 0.579 | 6.398 |
| 638 | −0.551 | −0.423 | 6.398 | 0.864 | 0.540 | 6.398 |
| 639 | −0.451 | −0.360 | 6.398 | 0.750 | 0.499 | 6.398 |
| 640 | −0.346 | −0.296 | 6.398 | 0.633 | 0.455 | 6.398 |
| 641 | −0.241 | −0.234 | 6.398 | 0.517 | 0.409 | 6.398 |
| 642 | −0.135 | −0.172 | 6.398 | 0.401 | 0.361 | 6.398 |
| 643 | −0.028 | −0.112 | 6.398 | 0.286 | 0.311 | 6.398 |
| 644 | 0.079 | −0.053 | 6.398 | 0.171 | 0.260 | 6.398 |
| 645 | 0.187 | 0.006 | 6.398 | 0.058 | 0.205 | 6.398 |
| 646 | 0.295 | 0.063 | 6.398 | −0.053 | 0.149 | 6.398 |
| 647 | 0.404 | 0.119 | 6.398 | −0.164 | 0.090 | 6.398 |
| 648 | 0.513 | 0.175 | 6.398 | −0.273 | 0.028 | 6.398 |
| 649 | 0.623 | 0.230 | 6.398 | −0.380 | −0.037 | 6.398 |
| 650 | 0.733 | 0.284 | 6.398 | −0.486 | −0.105 | 6.398 |
| 651 | 0.843 | 0.337 | 6.398 | −0.589 | −0.176 | 6.398 |
| 652 | 0.950 | 0.388 | 6.398 | −0.686 | −0.248 | 6.398 |
| 653 | 1.054 | 0.436 | 6.398 | −0.779 | −0.320 | 6.398 |
| 654 | 1.154 | 0.482 | 6.398 | −0.865 | −0.392 | 6.398 |
| 655 | 1.251 | 0.526 | 6.398 | −0.947 | −0.464 | 6.398 |
| 656 | 1.344 | 0.567 | 6.398 | −1.024 | −0.535 | 6.398 |
| 657 | 1.434 | 0.607 | 6.398 | −1.096 | −0.604 | 6.398 |
| 658 | 1.520 | 0.644 | 6.398 | −1.163 | −0.673 | 6.398 |
| 659 | 1.603 | 0.680 | 6.398 | −1.225 | −0.741 | 6.398 |
| 660 | 1.674 | 0.710 | 6.398 | −1.280 | −0.804 | 6.398 |
| 661 | 1.738 | 0.738 | 6.398 | −1.329 | −0.861 | 6.398 |
| 662 | 1.798 | 0.763 | 6.398 | −1.371 | −0.913 | 6.398 |
| 663 | 1.854 | 0.787 | 6.398 | −1.410 | −0.962 | 6.398 |
| 664 | 1.903 | 0.808 | 6.398 | −1.443 | −1.005 | 6.398 |
| 665 | 1.941 | 0.824 | 6.398 | −1.467 | −1.039 | 6.398 |
| 666 | 1.971 | 0.836 | 6.398 | −1.487 | −1.066 | 6.398 |
| 667 | 1.994 | 0.846 | 6.398 | −1.500 | −1.087 | 6.398 |
| 668 | 2.010 | 0.854 | 6.398 | −1.505 | −1.105 | 6.398 |
| 669 | 2.017 | 0.866 | 6.398 | −1.503 | −1.116 | 6.398 |
| 670 | 2.018 | 0.874 | 6.398 | −1.501 | −1.122 | 6.398 |
| 671 | 2.017 | 0.879 | 6.398 | −1.498 | −1.124 | 6.398 |
| 672 | 2.017 | 0.881 | 6.398 | −1.497 | −1.125 | 6.398 |
| 673 | −1.458 | −1.118 | 7.152 | 1.964 | 0.853 | 7.152 |
| 674 | −1.457 | −1.119 | 7.152 | 1.963 | 0.854 | 7.152 |
| 675 | −1.456 | −1.120 | 7.152 | 1.963 | 0.856 | 7.152 |
| 676 | −1.453 | −1.121 | 7.152 | 1.960 | 0.860 | 7.152 |
| 677 | −1.447 | −1.123 | 7.152 | 1.954 | 0.865 | 7.152 |
| 678 | −1.437 | −1.122 | 7.152 | 1.941 | 0.870 | 7.152 |
| 679 | −1.420 | −1.115 | 7.152 | 1.923 | 0.866 | 7.152 |
| 680 | −1.402 | −1.100 | 7.152 | 1.899 | 0.859 | 7.152 |
| 681 | −1.379 | −1.078 | 7.152 | 1.868 | 0.850 | 7.152 |
| 682 | −1.351 | −1.050 | 7.152 | 1.829 | 0.838 | 7.152 |
| 683 | −1.313 | −1.014 | 7.152 | 1.778 | 0.823 | 7.152 |
| 684 | −1.270 | −0.972 | 7.152 | 1.720 | 0.805 | 7.152 |
| 685 | −1.223 | −0.929 | 7.152 | 1.657 | 0.786 | 7.152 |
| 686 | −1.169 | −0.882 | 7.152 | 1.591 | 0.766 | 7.152 |
| 687 | −1.109 | −0.830 | 7.152 | 1.517 | 0.744 | 7.152 |
| 688 | −1.041 | −0.774 | 7.152 | 1.431 | 0.717 | 7.152 |
| 689 | −0.969 | −0.717 | 7.152 | 1.342 | 0.689 | 7.152 |
| 690 | −0.893 | −0.658 | 7.152 | 1.248 | 0.660 | 7.152 |
| 69 | −0.813 | −0.599 | 7.152 | 1.151 | 0.628 | 7.152 |
| 692 | −0.728 | −0.539 | 7.152 | 1.051 | 0.594 | 7.152 |
| 693 | −0.639 | −0.478 | 7.152 | 0.947 | 0.559 | 7.152 |
| 694 | −0.546 | −0.417 | 7.152 | 0.839 | 0.520 | 7.152 |
| 695 | −0.449 | −0.355 | 7.152 | 0.728 | 0.480 | 7.152 |
| 696 | −0.347 | −0.292 | 7.152 | 0.614 | 0.436 | 7.152 |
| 697 | −0.244 | −0.230 | 7.152 | 0.500 | 0.390 | 7.152 |
| 698 | −0.141 | −0.170 | 7.152 | 0.388 | 0.343 | 7.152 |
| 699 | −0.037 | −0.111 | 7.152 | 0.276 | 0.294 | 7.152 |
| 700 | 0.068 | −0.052 | 7.152 | 0.165 | 0.242 | 7.152 |
| 701 | 0.173 | 0.005 | 7.152 | 0.055 | 0.189 | 7.152 |
| 702 | 0.279 | 0.061 | 7.152 | −0.054 | 0.133 | 7.152 |
| 703 | 0.385 | 0.116 | 7.152 | −0.161 | 0.074 | 7.152 |
| 704 | 0.492 | 0.170 | 7.152 | −0.267 | 0.012 | 7.152 |
| 705 | 0.599 | 0.223 | 7.152 | −0.371 | −0.052 | 7.152 |
| 706 | 0.706 | 0.276 | 7.152 | −0.474 | −0.119 | 7.152 |
| 707 | 0.814 | 0.327 | 7.152 | −0.574 | −0.189 | 7.152 |
| 708 | 0.919 | 0.377 | 7.152 | −0.668 | −0.260 | 7.152 |
| 709 | 1.021 | 0.424 | 7.152 | −0.758 | −0.331 | 7.152 |
| 710 | 1.119 | 0.468 | 7.152 | −0.842 | −0.402 | 7.152 |

TABLE I-continued

| | Pressure Side Surface | | | Suction Side Surface | | |
|---|---|---|---|---|---|---|
| N | X | Y | Z | X | Y | Z |
| 711 | 1.213 | 0.510 | 7.152 | −0.922 | −0.472 | 7.152 |
| 712 | 1.305 | 0.551 | 7.152 | −0.996 | −0.542 | 7.152 |
| 713 | 1.392 | 0.589 | 7.152 | −1.066 | −0.610 | 7.152 |
| 714 | 1.477 | 0.625 | 7.152 | −1.131 | −0.677 | 7.152 |
| 715 | 1.558 | 0.659 | 7.152 | −1.192 | −0.743 | 7.152 |
| 716 | 1.628 | 0.688 | 7.152 | −1.246 | −0.804 | 7.152 |
| 717 | 1.690 | 0.714 | 7.152 | −1.294 | −0.860 | 7.152 |
| 718 | 1.749 | 0.738 | 7.152 | −1.335 | −0.911 | 7.152 |
| 719 | 1.805 | 0.761 | 7.152 | −1.373 | −0.959 | 7.152 |
| 720 | 1.853 | 0.781 | 7.152 | −1.406 | −1.001 | 7.152 |
| 721 | 1.890 | 0.796 | 7.152 | −1.430 | −1.033 | 7.152 |
| 722 | 1.919 | 0.808 | 7.152 | −1.449 | −1.059 | 7.152 |
| 723 | 1.941 | 0.817 | 7.152 | −1.462 | −1.080 | 7.152 |
| 724 | 1.957 | 0.825 | 7.152 | −1.466 | −1.098 | 7.152 |
| 725 | 1.964 | 0.837 | 7.152 | −1.464 | −1.108 | 7.152 |
| 726 | 1.965 | 0.845 | 7.152 | −1.461 | −1.114 | 7.152 |
| 727 | 1.965 | 0.850 | 7.152 | −1.459 | −1.117 | 7.152 |
| 728 | 1.964 | 0.852 | 7.152 | −1.458 | −1.118 | 7.152 |
| 729 | −1.414 | −1.109 | 7.964 | 1.911 | 0.823 | 7.964 |
| 730 | −1.413 | −1.109 | 7.964 | 1.911 | 0.824 | 7.964 |
| 731 | −1.412 | −1.110 | 7.964 | 1.910 | 0.826 | 7.964 |
| 732 | −1.409 | −1.111 | 7.964 | 1.907 | 0.830 | 7.964 |
| 733 | −1.403 | −1.113 | 7.964 | 1.902 | 0.835 | 7.964 |
| 734 | −1.393 | −1.112 | 7.964 | 1.889 | 0.840 | 7.964 |
| 735 | −1.377 | −1.106 | 7.964 | 1.871 | 0.836 | 7.964 |
| 736 | −1.359 | −1.091 | 7.964 | 1.848 | 0.829 | 7.964 |
| 737 | −1.338 | −1.068 | 7.964 | 1.818 | 0.820 | 7.964 |
| 738 | −1.311 | −1.040 | 7.964 | 1.780 | 0.808 | 7.964 |
| 739 | −1.276 | −1.003 | 7.964 | 1.731 | 0.794 | 7.964 |
| 740 | −1.235 | −0.962 | 7.964 | 1.674 | 0.776 | 7.964 |
| 74 | −1.191 | −0.918 | 7.964 | 1.613 | 0.758 | 7.964 |
| 742 | −1.140 | −0.869 | 7.964 | 1.549 | 0.738 | 7.964 |
| 743 | −1.083 | −0.817 | 7.964 | 1.476 | 0.716 | 7.964 |
| 744 | −1.019 | −0.760 | 7.964 | 1.393 | 0.689 | 7.964 |
| 745 | −0.950 | −0.702 | 7.964 | 1.306 | 0.662 | 7.964 |
| 746 | −0.878 | −0.643 | 7.964 | 1.216 | 0.632 | 7.964 |
| 747 | −0.801 | −0.583 | 7.964 | 1.121 | 0.601 | 7.964 |
| 748 | −0.720 | −0.523 | 7.964 | 1.024 | 0.568 | 7.964 |
| 749 | −0.635 | −0.461 | 7.964 | 0.923 | 0.532 | 7.964 |
| 750 | −0.545 | −0.399 | 7.964 | 0.818 | 0.494 | 7.964 |
| 751 | −0.451 | −0.337 | 7.964 | 0.711 | 0.453 | 7.964 |
| 752 | −0.352 | −0.274 | 7.964 | 0.600 | 0.410 | 7.964 |
| 753 | −0.253 | −0.213 | 7.964 | 0.490 | 0.364 | 7.964 |
| 754 | −0.152 | −0.154 | 7.964 | 0.380 | 0.317 | 7.964 |
| 755 | −0.051 | −0.095 | 7.964 | 0.272 | 0.268 | 7.964 |
| 756 | 0.051 | −0.038 | 7.964 | 0.164 | 0.217 | 7.964 |
| 757 | 0.154 | 0.017 | 7.964 | 0.058 | 0.164 | 7.964 |
| 758 | 0.257 | 0.072 | 7.964 | −0.047 | 0.108 | 7.964 |
| 759 | 0.361 | 0.125 | 7.964 | −0.151 | 0.050 | 7.964 |
| 760 | 0.465 | 0.178 | 7.964 | −0.254 | −0.010 | 7.964 |
| 761 | 0.570 | 0.229 | 7.964 | −0.355 | −0.074 | 7.964 |
| 762 | 0.675 | 0.280 | 7.964 | −0.454 | −0.140 | 7.964 |
| 763 | 0.781 | 0.329 | 7.964 | −0.551 | −0.208 | 7.964 |
| 764 | 0.884 | 0.376 | 7.964 | −0.643 | −0.277 | 7.964 |
| 765 | 0.983 | 0.420 | 7.964 | −0.730 | −0.346 | 7.964 |
| 766 | 1.080 | 0.462 | 7.964 | −0.812 | −0.415 | 7.964 |
| 767 | 1.173 | 0.502 | 7.964 | −0.889 | −0.484 | 7.964 |
| 768 | 1.262 | 0.540 | 7.964 | −0.962 | −0.551 | 7.964 |
| 769 | 1.349 | 0.576 | 7.964 | −1.030 | −0.618 | 7.964 |
| 770 | 1.432 | 0.610 | 7.964 | −1.094 | −0.683 | 7.964 |
| 771 | 1.511 | 0.642 | 7.964 | −1.154 | −0.746 | 7.964 |
| 772 | 1.580 | 0.669 | 7.964 | −1.207 | −0.805 | 7.964 |
| 773 | 1.641 | 0.693 | 7.964 | −1.254 | −0.859 | 7.964 |
| 774 | 1.700 | 0.716 | 7.964 | −1.295 | −0.908 | 7.964 |
| 775 | 1.754 | 0.737 | 7.964 | −1.332 | −0.954 | 7.964 |
| 776 | 1.801 | 0.755 | 7.964 | −1.364 | −0.995 | 7.964 |
| 777 | 1.837 | 0.769 | 7.964 | −1.388 | −1.026 | 7.964 |
| 778 | 1.867 | 0.780 | 7.964 | −1.408 | −1.052 | 7.964 |
| 779 | 1.888 | 0.789 | 7.964 | −1.420 | −1.072 | 7.964 |
| 780 | 1.904 | 0.796 | 7.964 | −1.423 | −1.089 | 7.964 |
| 781 | 1.911 | 0.808 | 7.964 | −1.420 | −1.099 | 7.964 |
| 782 | 1.912 | 0.815 | 7.964 | −1.417 | −1.104 | 7.964 |
| 783 | 1.912 | 0.820 | 7.964 | −1.415 | −1.107 | 7.964 |
| 784 | 1.911 | 0.822 | 7.964 | −1.414 | −1.108 | 7.964 |
| 785 | −1.391 | −1.100 | 8.325 | 1.891 | 0.813 | 8.325 |
| 786 | −1.391 | −1.101 | 8.325 | 1.891 | 0.814 | 8.325 |

TABLE I-continued

| | Pressure Side Surface | | | Suction Side Surface | | |
|---|---|---|---|---|---|---|
| N | X | Y | Z | X | Y | Z |
| 787 | −1.390 | −1.102 | 8.325 | 1.890 | 0.816 | 8.325 |
| 788 | −1.387 | −1.103 | 8.325 | 1.888 | 0.820 | 8.325 |
| 789 | −1.381 | −1.105 | 8.325 | 1.882 | 0.825 | 8.325 |
| 790 | −1.371 | −1.104 | 8.325 | 1.869 | 0.829 | 8.325 |
| 791 | −1.355 | −1.098 | 8.325 | 1.852 | 0.825 | 8.325 |
| 792 | −1.337 | −1.083 | 8.325 | 1.829 | 0.818 | 8.325 |
| 793 | −1.317 | −1.060 | 8.325 | 1.799 | 0.809 | 8.325 |
| 794 | −1.291 | −1.032 | 8.325 | 1.762 | 0.798 | 8.325 |
| 795 | −1.257 | −0.995 | 8.325 | 1.713 | 0.783 | 8.325 |
| 796 | −1.217 | −0.953 | 8.325 | 1.657 | 0.766 | 8.325 |
| 797 | −1.174 | −0.909 | 8.325 | 1.597 | 0.747 | 8.325 |
| 798 | −1.125 | −0.860 | 8.325 | 1.533 | 0.727 | 8.325 |
| 799 | −1.069 | −0.807 | 8.325 | 1.462 | 0.705 | 8.325 |
| 800 | −1.007 | −0.749 | 8.325 | 1.380 | 0.679 | 8.325 |
| 801 | −0.940 | −0.691 | 8.325 | 1.295 | 0.651 | 8.325 |
| 802 | −0.869 | −0.631 | 8.325 | 1.205 | 0.621 | 8.325 |
| 803 | −0.795 | −0.571 | 8.325 | 1.112 | 0.590 | 8.325 |
| 804 | −0.715 | −0.510 | 8.325 | 1.016 | 0.556 | 8.325 |
| 805 | −0.632 | −0.448 | 8.325 | 0.917 | 0.521 | 8.325 |
| 806 | −0.544 | −0.385 | 8.325 | 0.814 | 0.483 | 8.325 |
| 807 | −0.451 | −0.323 | 8.325 | 0.708 | 0.442 | 8.325 |
| 808 | −0.354 | −0.260 | 8.325 | 0.599 | 0.398 | 8.325 |
| 809 | −0.256 | −0.199 | 8.325 | 0.490 | 0.353 | 8.325 |
| 810 | −0.157 | −0.139 | 8.325 | 0.382 | 0.306 | 8.325 |
| 811 | −0.057 | −0.081 | 8.325 | 0.275 | 0.257 | 8.325 |
| 812 | 0.044 | −0.025 | 8.325 | 0.170 | 0.206 | 8.325 |
| 813 | 0.146 | 0.030 | 8.325 | 0.065 | 0.152 | 8.325 |
| 814 | 0.248 | 0.084 | 8.325 | −0.039 | 0.097 | 8.325 |
| 815 | 0.351 | 0.136 | 8.325 | −0.142 | 0.039 | 8.325 |
| 816 | 0.454 | 0.188 | 8.325 | −0.243 | −0.021 | 8.325 |
| 817 | 0.559 | 0.238 | 8.325 | −0.342 | −0.083 | 8.325 |
| 818 | 0.663 | 0.287 | 8.325 | −0.440 | −0.148 | 8.325 |
| 819 | 0.768 | 0.335 | 8.325 | −0.536 | −0.216 | 8.325 |
| 820 | 0.870 | 0.381 | 8.325 | −0.627 | −0.284 | 8.325 |
| 821 | 0.969 | 0.424 | 8.325 | −0.713 | −0.352 | 8.325 |
| 822 | 1.065 | 0.465 | 8.325 | −0.795 | −0.420 | 8.325 |
| 823 | 1.157 | 0.503 | 8.325 | −0.871 | −0.487 | 8.325 |
| 824 | 1.246 | 0.540 | 8.325 | −0.943 | −0.553 | 8.325 |
| 825 | 1.332 | 0.574 | 8.325 | −1.011 | −0.618 | 8.325 |
| 826 | 1.415 | 0.607 | 8.325 | −1.075 | −0.682 | 8.325 |
| 827 | 1.494 | 0.638 | 8.325 | −1.134 | −0.745 | 8.325 |
| 828 | 1.562 | 0.664 | 8.325 | −1.187 | −0.803 | 8.325 |
| 829 | 1.623 | 0.687 | 8.325 | −1.233 | −0.856 | 8.325 |
| 830 | 1.681 | 0.709 | 8.325 | −1.274 | −0.904 | 8.325 |
| 831 | 1.735 | 0.729 | 8.325 | −1.311 | −0.949 | 8.325 |
| 832 | 1.782 | 0.747 | 8.325 | −1.343 | −0.989 | 8.325 |
| 833 | 1.818 | 0.760 | 8.325 | −1.367 | −1.020 | 8.325 |
| 834 | 1.847 | 0.771 | 8.325 | −1.387 | −1.044 | 8.325 |
| 835 | 1.868 | 0.779 | 8.325 | −1.399 | −1.064 | 8.325 |
| 836 | 1.884 | 0.786 | 8.325 | −1.401 | −1.082 | 8.325 |
| 837 | 1.891 | 0.798 | 8.325 | −1.399 | −1.091 | 8.325 |
| 838 | 1.892 | 0.805 | 8.325 | −1.395 | −1.097 | 8.325 |
| 839 | 1.892 | 0.810 | 8.325 | −1.393 | −1.099 | 8.325 |
| 840 | 1.892 | 0.812 | 8.325 | −1.392 | −1.100 | 8.325 |

In exemplary embodiments, TABLE II below contains Cartesian coordinate data of an airfoil shape 150 of an airfoil 100 of another stator vane 50, which is disposed in the early stage 60 of the compressor section 14. Specifically, TABLE II below contains Cartesian coordinate data of an airfoil shape 150 of an airfoil 100 of a stator vane 50, which is disposed in the sixth stage S6 of the compressor section 14.

TABLE II

| | Pressure Side Surface | | | Suction Side Surface | | |
|---|---|---|---|---|---|---|
| N | X | Y | Z | X | Y | Z |
| 1 | −1.359 | −1.032 | 0.931 | 1.994 | 0.980 | 0.931 |
| 2 | −1.359 | −1.032 | 0.931 | 1.994 | 0.981 | 0.931 |
| 3 | −1.357 | −1.033 | 0.931 | 1.993 | 0.983 | 0.931 |
| 4 | −1.355 | −1.035 | 0.931 | 1.990 | 0.987 | 0.931 |

TABLE II-continued

| | Pressure Side Surface | | | Suction Side Surface | | |
|---|---|---|---|---|---|---|
| N | X | Y | Z | X | Y | Z |
| 5 | −1.349 | −1.037 | 0.931 | 1.984 | 0.993 | 0.931 |
| 6 | −1.339 | −1.039 | 0.931 | 1.971 | 0.999 | 0.931 |
| 7 | −1.322 | −1.037 | 0.931 | 1.953 | 0.997 | 0.931 |
| 8 | −1.300 | −1.028 | 0.931 | 1.930 | 0.990 | 0.931 |
| 9 | −1.273 | −1.012 | 0.931 | 1.899 | 0.979 | 0.931 |
| 10 | −1.241 | −0.989 | 0.931 | 1.860 | 0.966 | 0.931 |
| 11 | −1.200 | −0.958 | 0.931 | 1.810 | 0.949 | 0.931 |
| 12 | −1.152 | −0.924 | 0.931 | 1.751 | 0.930 | 0.931 |
| 13 | −1.100 | −0.887 | 0.931 | 1.689 | 0.909 | 0.931 |
| 14 | −1.042 | −0.846 | 0.931 | 1.623 | 0.886 | 0.931 |
| 15 | −0.977 | −0.802 | 0.931 | 1.550 | 0.861 | 0.931 |
| 16 | −0.906 | −0.753 | 0.931 | 1.464 | 0.832 | 0.931 |
| 17 | −0.830 | −0.703 | 0.931 | 1.375 | 0.802 | 0.931 |
| 18 | −0.752 | −0.650 | 0.931 | 1.282 | 0.770 | 0.931 |
| 19 | −0.670 | −0.595 | 0.931 | 1.185 | 0.737 | 0.931 |
| 20 | −0.585 | −0.538 | 0.931 | 1.084 | 0.703 | 0.931 |
| 21 | −0.496 | −0.479 | 0.931 | 0.980 | 0.667 | 0.931 |
| 22 | −0.405 | −0.418 | 0.931 | 0.872 | 0.629 | 0.931 |
| 23 | −0.310 | −0.355 | 0.931 | 0.760 | 0.589 | 0.931 |
| 24 | −0.211 | −0.289 | 0.931 | 0.644 | 0.548 | 0.931 |
| 25 | −0.112 | −0.224 | 0.931 | 0.529 | 0.505 | 0.931 |
| 26 | −0.013 | −0.160 | 0.931 | 0.414 | 0.461 | 0.931 |
| 27 | 0.086 | −0.096 | 0.931 | 0.300 | 0.416 | 0.931 |
| 28 | 0.186 | −0.033 | 0.931 | 0.186 | 0.369 | 0.931 |
| 29 | 0.287 | 0.029 | 0.931 | 0.073 | 0.321 | 0.931 |
| 30 | 0.388 | 0.091 | 0.931 | −0.039 | 0.269 | 0.931 |
| 31 | 0.489 | 0.152 | 0.931 | −0.149 | 0.216 | 0.931 |
| 32 | 0.591 | 0.212 | 0.931 | −0.258 | 0.159 | 0.931 |
| 33 | 0.693 | 0.271 | 0.931 | −0.365 | 0.099 | 0.931 |
| 34 | 0.795 | 0.330 | 0.931 | −0.470 | 0.035 | 0.931 |
| 35 | 0.898 | 0.388 | 0.931 | −0.573 | −0.033 | 0.931 |
| 36 | 0.998 | 0.443 | 0.931 | −0.669 | −0.103 | 0.931 |
| 37 | 1.095 | 0.496 | 0.931 | −0.758 | −0.174 | 0.931 |
| 38 | 1.189 | 0.546 | 0.931 | −0.842 | −0.247 | 0.931 |
| 39 | 1.280 | 0.594 | 0.931 | −0.918 | −0.321 | 0.931 |
| 40 | 1.367 | 0.639 | 0.931 | −0.989 | −0.395 | 0.931 |
| 41 | 1.451 | 0.682 | 0.931 | −1.053 | −0.470 | 0.931 |
| 42 | 1.532 | 0.723 | 0.931 | −1.111 | −0.544 | 0.931 |
| 43 | 1.610 | 0.762 | 0.931 | −1.164 | −0.617 | 0.931 |
| 44 | 1.677 | 0.795 | 0.931 | −1.210 | −0.685 | 0.931 |
| 45 | 1.737 | 0.824 | 0.931 | −1.249 | −0.747 | 0.931 |
| 46 | 1.794 | 0.852 | 0.931 | −1.282 | −0.804 | 0.931 |
| 47 | 1.847 | 0.878 | 0.931 | −1.312 | −0.858 | 0.931 |
| 48 | 1.893 | 0.900 | 0.931 | −1.337 | −0.905 | 0.931 |
| 49 | 1.929 | 0.917 | 0.931 | −1.355 | −0.941 | 0.931 |
| 50 | 1.957 | 0.930 | 0.931 | −1.369 | −0.971 | 0.931 |
| 51 | 1.978 | 0.940 | 0.931 | −1.374 | −0.995 | 0.931 |
| 52 | 1.992 | 0.952 | 0.931 | −1.371 | −1.013 | 0.931 |
| 53 | 1.996 | 0.965 | 0.931 | −1.367 | −1.023 | 0.931 |
| 54 | 1.996 | 0.973 | 0.931 | −1.363 | −1.028 | 0.931 |
| 55 | 1.995 | 0.977 | 0.931 | −1.361 | −1.030 | 0.931 |
| 56 | 1.995 | 0.979 | 0.931 | −1.360 | −1.031 | 0.931 |
| 57 | −1.387 | −1.049 | 1.246 | 2.012 | 0.987 | 1.246 |
| 58 | −1.386 | −1.050 | 1.246 | 2.012 | 0.988 | 1.246 |
| 59 | −1.385 | −1.051 | 1.246 | 2.011 | 0.990 | 1.246 |
| 60 | −1.382 | −1.052 | 1.246 | 2.008 | 0.994 | 1.246 |
| 61 | −1.376 | −1.054 | 1.246 | 2.002 | 1.000 | 1.246 |
| 62 | −1.367 | −1.056 | 1.246 | 1.989 | 1.006 | 1.246 |
| 63 | −1.349 | −1.053 | 1.246 | 1.971 | 1.004 | 1.246 |
| 64 | −1.327 | −1.044 | 1.246 | 1.947 | 0.996 | 1.246 |
| 65 | −1.300 | −1.027 | 1.246 | 1.916 | 0.985 | 1.246 |
| 66 | −1.268 | −1.003 | 1.246 | 1.877 | 0.972 | 1.246 |
| 67 | −1.226 | −0.972 | 1.246 | 1.826 | 0.955 | 1.246 |
| 68 | −1.178 | −0.937 | 1.246 | 1.767 | 0.935 | 1.246 |
| 69 | −1.126 | −0.900 | 1.246 | 1.704 | 0.914 | 1.246 |
| 70 | −1.067 | −0.858 | 1.246 | 1.637 | 0.891 | 1.246 |
| 71 | −1.002 | −0.813 | 1.246 | 1.563 | 0.866 | 1.246 |
| 72 | −0.929 | −0.763 | 1.246 | 1.477 | 0.836 | 1.246 |
| 73 | −0.853 | −0.712 | 1.246 | 1.386 | 0.806 | 1.246 |
| 74 | −0.774 | −0.658 | 1.246 | 1.292 | 0.773 | 1.246 |
| 75 | −0.691 | −0.603 | 1.246 | 1.194 | 0.740 | 1.246 |
| 76 | −0.605 | −0.545 | 1.246 | 1.093 | 0.704 | 1.246 |
| 77 | −0.515 | −0.485 | 1.246 | 0.987 | 0.668 | 1.246 |
| 78 | −0.422 | −0.423 | 1.246 | 0.878 | 0.629 | 1.246 |
| 79 | −0.326 | −0.359 | 1.246 | 0.764 | 0.589 | 1.246 |
| 80 | −0.226 | −0.293 | 1.246 | 0.648 | 0.546 | 1.246 |

TABLE II-continued

| | Pressure Side Surface | | | Suction Side Surface | | |
|---|---|---|---|---|---|---|
| N | X | Y | Z | X | Y | Z |
| 81 | −0.126 | −0.227 | 1.246 | 0.531 | 0.503 | 1.246 |
| 82 | −0.025 | −0.163 | 1.246 | 0.415 | 0.458 | 1.246 |
| 83 | 0.076 | −0.098 | 1.246 | 0.300 | 0.412 | 1.246 |
| 84 | 0.177 | −0.035 | 1.246 | 0.185 | 0.364 | 1.246 |
| 85 | 0.279 | 0.028 | 1.246 | 0.071 | 0.314 | 1.246 |
| 86 | 0.382 | 0.090 | 1.246 | −0.041 | 0.262 | 1.246 |
| 87 | 0.485 | 0.152 | 1.246 | −0.153 | 0.207 | 1.246 |
| 88 | 0.588 | 0.212 | 1.246 | −0.263 | 0.150 | 1.246 |
| 89 | 0.692 | 0.272 | 1.246 | −0.371 | 0.088 | 1.246 |
| 90 | 0.796 | 0.331 | 1.246 | −0.477 | 0.023 | 1.246 |
| 91 | 0.900 | 0.389 | 1.246 | −0.580 | −0.045 | 1.246 |
| 92 | 1.002 | 0.445 | 1.246 | −0.677 | −0.116 | 1.246 |
| 93 | 1.100 | 0.498 | 1.246 | −0.768 | −0.188 | 1.246 |
| 94 | 1.195 | 0.549 | 1.246 | −0.853 | −0.262 | 1.246 |
| 95 | 1.287 | 0.597 | 1.246 | −0.931 | −0.336 | 1.246 |
| 96 | 1.376 | 0.643 | 1.246 | −1.003 | −0.410 | 1.246 |
| 97 | 1.461 | 0.686 | 1.246 | −1.068 | −0.485 | 1.246 |
| 98 | 1.543 | 0.728 | 1.246 | −1.128 | −0.559 | 1.246 |
| 99 | 1.622 | 0.767 | 1.246 | −1.182 | −0.632 | 1.246 |
| 100 | 1.690 | 0.800 | 1.246 | −1.229 | −0.701 | 1.246 |
| 101 | 1.751 | 0.830 | 1.246 | −1.270 | −0.763 | 1.246 |
| 102 | 1.808 | 0.858 | 1.246 | −1.304 | −0.820 | 1.246 |
| 103 | 1.862 | 0.884 | 1.246 | −1.335 | −0.874 | 1.246 |
| 104 | 1.909 | 0.906 | 1.246 | −1.361 | −0.921 | 1.246 |
| 105 | 1.945 | 0.923 | 1.246 | −1.381 | −0.957 | 1.246 |
| 106 | 1.974 | 0.937 | 1.246 | −1.395 | −0.987 | 1.246 |
| 107 | 1.996 | 0.947 | 1.246 | −1.400 | −1.012 | 1.246 |
| 108 | 2.009 | 0.958 | 1.246 | −1.399 | −1.030 | 1.246 |
| 109 | 2.014 | 0.971 | 1.246 | −1.395 | −1.040 | 1.246 |
| 110 | 2.014 | 0.979 | 1.246 | −1.391 | −1.045 | 1.246 |
| 111 | 2.013 | 0.984 | 1.246 | −1.389 | −1.047 | 1.246 |
| 112 | 2.013 | 0.986 | 1.246 | −1.388 | −1.049 | 1.246 |
| 113 | −1.431 | −1.077 | 1.814 | 2.033 | 0.996 | 1.814 |
| 114 | −1.431 | −1.078 | 1.814 | 2.033 | 0.997 | 1.814 |
| 115 | −1.429 | −1.078 | 1.814 | 2.032 | 0.999 | 1.814 |
| 116 | −1.427 | −1.080 | 1.814 | 2.029 | 1.003 | 1.814 |
| 117 | −1.421 | −1.082 | 1.814 | 2.023 | 1.009 | 1.814 |
| 118 | −1.410 | −1.083 | 1.814 | 2.009 | 1.014 | 1.814 |
| 119 | −1.393 | −1.080 | 1.814 | 1.991 | 1.012 | 1.814 |
| 120 | −1.370 | −1.070 | 1.814 | 1.967 | 1.004 | 1.814 |
| 121 | −1.344 | −1.052 | 1.814 | 1.935 | 0.993 | 1.814 |
| 122 | −1.311 | −1.027 | 1.814 | 1.895 | 0.979 | 1.814 |
| 123 | −1.269 | −0.995 | 1.814 | 1.843 | 0.962 | 1.814 |
| 124 | −1.220 | −0.959 | 1.814 | 1.784 | 0.941 | 1.814 |
| 125 | −1.168 | −0.920 | 1.814 | 1.720 | 0.920 | 1.814 |
| 126 | −1.108 | −0.877 | 1.814 | 1.652 | 0.896 | 1.814 |
| 127 | −1.042 | −0.830 | 1.814 | 1.577 | 0.871 | 1.814 |
| 128 | −0.968 | −0.780 | 1.814 | 1.489 | 0.840 | 1.814 |
| 129 | −0.891 | −0.727 | 1.814 | 1.398 | 0.809 | 1.814 |
| 130 | −0.811 | −0.672 | 1.814 | 1.302 | 0.776 | 1.814 |
| 131 | −0.726 | −0.615 | 1.814 | 1.203 | 0.741 | 1.814 |
| 132 | −0.638 | −0.556 | 1.814 | 1.099 | 0.705 | 1.814 |
| 133 | −0.547 | −0.495 | 1.814 | 0.992 | 0.668 | 1.814 |
| 134 | −0.452 | −0.432 | 1.814 | 0.881 | 0.628 | 1.814 |
| 135 | −0.354 | −0.367 | 1.814 | 0.767 | 0.586 | 1.814 |
| 136 | −0.252 | −0.300 | 1.814 | 0.648 | 0.543 | 1.814 |
| 137 | −0.150 | −0.234 | 1.814 | 0.530 | 0.498 | 1.814 |
| 138 | −0.047 | −0.168 | 1.814 | 0.413 | 0.452 | 1.814 |
| 139 | 0.056 | −0.103 | 1.814 | 0.296 | 0.404 | 1.814 |
| 140 | 0.160 | −0.039 | 1.814 | 0.180 | 0.355 | 1.814 |
| 141 | 0.264 | 0.025 | 1.814 | 0.064 | 0.303 | 1.814 |
| 142 | 0.369 | 0.088 | 1.814 | −0.050 | 0.249 | 1.814 |
| 143 | 0.474 | 0.149 | 1.814 | −0.163 | 0.193 | 1.814 |
| 144 | 0.579 | 0.211 | 1.814 | −0.274 | 0.133 | 1.814 |
| 145 | 0.685 | 0.271 | 1.814 | −0.384 | 0.070 | 1.814 |
| 146 | 0.792 | 0.331 | 1.814 | −0.491 | 0.004 | 1.814 |
| 147 | 0.898 | 0.390 | 1.814 | −0.596 | −0.066 | 1.814 |
| 148 | 1.002 | 0.446 | 1.814 | −0.694 | −0.138 | 1.814 |
| 149 | 1.102 | 0.500 | 1.814 | −0.787 | −0.211 | 1.814 |
| 150 | 1.199 | 0.551 | 1.814 | −0.873 | −0.286 | 1.814 |
| 151 | 1.293 | 0.600 | 1.814 | −0.952 | −0.360 | 1.814 |
| 152 | 1.383 | 0.647 | 1.814 | −1.026 | −0.436 | 1.814 |
| 153 | 1.471 | 0.691 | 1.814 | −1.094 | −0.511 | 1.814 |
| 154 | 1.554 | 0.733 | 1.814 | −1.156 | −0.585 | 1.814 |
| 155 | 1.634 | 0.772 | 1.814 | −1.212 | −0.658 | 1.814 |
| 156 | 1.704 | 0.806 | 1.814 | −1.261 | −0.727 | 1.814 |

TABLE II-continued

| | Pressure Side Surface | | | Suction Side Surface | | |
|---|---|---|---|---|---|---|
| N | X | Y | Z | X | Y | Z |
| 157 | 1.766 | 0.837 | 1.814 | −1.303 | −0.790 | 1.814 |
| 158 | 1.824 | 0.865 | 1.814 | −1.340 | −0.846 | 1.814 |
| 159 | 1.879 | 0.891 | 1.814 | −1.372 | −0.900 | 1.814 |
| 160 | 1.927 | 0.914 | 1.814 | −1.400 | −0.948 | 1.814 |
| 161 | 1.964 | 0.931 | 1.814 | −1.420 | −0.984 | 1.814 |
| 162 | 1.993 | 0.945 | 1.814 | −1.436 | −1.014 | 1.814 |
| 163 | 2.015 | 0.956 | 1.814 | −1.443 | −1.038 | 1.814 |
| 164 | 2.030 | 0.967 | 1.814 | −1.442 | −1.057 | 1.814 |
| 165 | 2.035 | 0.980 | 1.814 | −1.439 | −1.067 | 1.814 |
| 166 | 2.035 | 0.988 | 1.814 | −1.436 | −1.073 | 1.814 |
| 167 | 2.034 | 0.993 | 1.814 | −1.433 | −1.075 | 1.814 |
| 168 | 2.033 | 0.995 | 1.814 | −1.432 | −1.076 | 1.814 |
| 169 | −1.468 | −1.101 | 2.416 | 2.052 | 1.003 | 2.416 |
| 170 | −1.467 | −1.101 | 2.416 | 2.051 | 1.004 | 2.416 |
| 171 | −1.466 | −1.102 | 2.416 | 2.050 | 1.006 | 2.416 |
| 172 | −1.463 | −1.104 | 2.416 | 2.048 | 1.011 | 2.416 |
| 173 | −1.457 | −1.106 | 2.416 | 2.042 | 1.016 | 2.416 |
| 174 | −1.446 | −1.107 | 2.416 | 2.028 | 1.022 | 2.416 |
| 175 | −1.428 | −1.103 | 2.416 | 2.009 | 1.018 | 2.416 |
| 176 | −1.406 | −1.091 | 2.416 | 1.985 | 1.010 | 2.416 |
| 177 | −1.379 | −1.072 | 2.416 | 1.952 | 0.999 | 2.416 |
| 178 | −1.347 | −1.047 | 2.416 | 1.912 | 0.986 | 2.416 |
| 179 | −1.304 | −1.014 | 2.416 | 1.860 | 0.968 | 2.416 |
| 180 | −1.255 | −0.976 | 2.416 | 1.799 | 0.947 | 2.416 |
| 181 | −1.202 | −0.937 | 2.416 | 1.734 | 0.925 | 2.416 |
| 182 | −1.142 | −0.893 | 2.416 | 1.666 | 0.902 | 2.416 |
| 183 | −1.075 | −0.845 | 2.416 | 1.589 | 0.875 | 2.416 |
| 184 | −1.001 | −0.793 | 2.416 | 1.501 | 0.845 | 2.416 |
| 185 | −0.922 | −0.739 | 2.416 | 1.408 | 0.813 | 2.416 |
| 186 | −0.841 | −0.683 | 2.416 | 1.311 | 0.779 | 2.416 |
| 187 | −0.755 | −0.625 | 2.416 | 1.211 | 0.744 | 2.416 |
| 188 | −0.666 | −0.565 | 2.416 | 1.106 | 0.707 | 2.416 |
| 189 | −0.573 | −0.504 | 2.416 | 0.997 | 0.668 | 2.416 |
| 190 | −0.477 | −0.440 | 2.416 | 0.885 | 0.628 | 2.416 |
| 191 | −0.377 | −0.374 | 2.416 | 0.769 | 0.585 | 2.416 |
| 192 | −0.273 | −0.306 | 2.416 | 0.649 | 0.541 | 2.416 |
| 193 | −0.169 | −0.239 | 2.416 | 0.530 | 0.495 | 2.416 |
| 194 | −0.064 | −0.173 | 2.416 | 0.411 | 0.447 | 2.416 |
| 195 | 0.041 | −0.107 | 2.416 | 0.293 | 0.399 | 2.416 |
| 196 | 0.147 | −0.043 | 2.416 | 0.175 | 0.348 | 2.416 |
| 197 | 0.253 | 0.022 | 2.416 | 0.059 | 0.295 | 2.416 |
| 198 | 0.359 | 0.085 | 2.416 | −0.057 | 0.240 | 2.416 |
| 199 | 0.466 | 0.147 | 2.416 | −0.171 | 0.182 | 2.416 |
| 200 | 0.573 | 0.209 | 2.416 | −0.283 | 0.121 | 2.416 |
| 201 | 0.681 | 0.270 | 2.416 | −0.394 | 0.057 | 2.416 |
| 202 | 0.789 | 0.330 | 2.416 | −0.502 | −0.011 | 2.416 |
| 203 | 0.898 | 0.390 | 2.416 | −0.608 | −0.083 | 2.416 |
| 204 | 1.003 | 0.447 | 2.416 | −0.708 | −0.156 | 2.416 |
| 205 | 1.105 | 0.501 | 2.416 | −0.802 | −0.230 | 2.416 |
| 206 | 1.204 | 0.553 | 2.416 | −0.889 | −0.305 | 2.416 |
| 207 | 1.299 | 0.603 | 2.416 | −0.970 | −0.381 | 2.416 |
| 208 | 1.391 | 0.650 | 2.416 | −1.045 | −0.456 | 2.416 |
| 209 | 1.480 | 0.694 | 2.416 | −1.114 | −0.532 | 2.416 |
| 210 | 1.565 | 0.737 | 2.416 | −1.178 | −0.607 | 2.416 |
| 211 | 1.646 | 0.777 | 2.416 | −1.236 | −0.680 | 2.416 |
| 212 | 1.717 | 0.812 | 2.416 | −1.286 | −0.749 | 2.416 |
| 213 | 1.780 | 0.842 | 2.416 | −1.330 | −0.812 | 2.416 |
| 214 | 1.839 | 0.871 | 2.416 | −1.368 | −0.869 | 2.416 |
| 215 | 1.895 | 0.898 | 2.416 | −1.402 | −0.923 | 2.416 |
| 216 | 1.944 | 0.921 | 2.416 | −1.431 | −0.970 | 2.416 |
| 217 | 1.981 | 0.938 | 2.416 | −1.453 | −1.007 | 2.416 |
| 218 | 2.011 | 0.953 | 2.416 | −1.469 | −1.037 | 2.416 |
| 219 | 2.033 | 0.963 | 2.416 | −1.477 | −1.061 | 2.416 |
| 220 | 2.048 | 0.974 | 2.416 | −1.478 | −1.080 | 2.416 |
| 221 | 2.054 | 0.987 | 2.416 | −1.475 | −1.090 | 2.416 |
| 222 | 2.054 | 0.995 | 2.416 | −1.472 | −1.096 | 2.416 |
| 223 | 2.053 | 1.000 | 2.416 | −1.470 | −1.099 | 2.416 |
| 224 | 2.052 | 1.002 | 2.416 | −1.468 | −1.100 | 2.416 |
| 225 | −1.490 | −1.117 | 3.093 | 2.058 | 1.006 | 3.093 |
| 226 | −1.489 | −1.117 | 3.093 | 2.058 | 1.007 | 3.093 |
| 227 | −1.488 | −1.118 | 3.093 | 2.057 | 1.009 | 3.093 |
| 228 | −1.485 | −1.120 | 3.093 | 2.054 | 1.013 | 3.093 |
| 229 | −1.479 | −1.122 | 3.093 | 2.048 | 1.019 | 3.093 |
| 230 | −1.468 | −1.122 | 3.093 | 2.034 | 1.024 | 3.093 |
| 231 | −1.450 | −1.117 | 3.093 | 2.015 | 1.020 | 3.093 |
| 232 | −1.428 | −1.105 | 3.093 | 1.991 | 1.012 | 3.093 |

TABLE II-continued

| | Pressure Side Surface | | | Suction Side Surface | | |
|---|---|---|---|---|---|---|
| N | X | Y | Z | X | Y | Z |
| 233 | −1.402 | −1.085 | 3.093 | 1.958 | 1.001 | 3.093 |
| 234 | −1.369 | −1.059 | 3.093 | 1.917 | 0.987 | 3.093 |
| 235 | −1.327 | −1.026 | 3.093 | 1.865 | 0.969 | 3.093 |
| 236 | −1.277 | −0.988 | 3.093 | 1.804 | 0.948 | 3.093 |
| 237 | −1.224 | −0.947 | 3.093 | 1.739 | 0.926 | 3.093 |
| 238 | −1.164 | −0.903 | 3.093 | 1.670 | 0.902 | 3.093 |
| 239 | −1.097 | −0.854 | 3.093 | 1.593 | 0.876 | 3.093 |
| 240 | −1.022 | −0.801 | 3.093 | 1.503 | 0.845 | 3.093 |
| 241 | −0.944 | −0.746 | 3.093 | 1.410 | 0.813 | 3.093 |
| 242 | −0.861 | −0.689 | 3.093 | 1.313 | 0.779 | 3.093 |
| 243 | −0.775 | −0.631 | 3.093 | 1.212 | 0.743 | 3.093 |
| 244 | −0.686 | −0.570 | 3.093 | 1.107 | 0.706 | 3.093 |
| 245 | −0.592 | −0.508 | 3.093 | 0.997 | 0.667 | 3.093 |
| 246 | −0.495 | −0.444 | 3.093 | 0.884 | 0.626 | 3.093 |
| 247 | −0.394 | −0.378 | 3.093 | 0.768 | 0.583 | 3.093 |
| 248 | −0.289 | −0.310 | 3.093 | 0.647 | 0.537 | 3.093 |
| 249 | −0.183 | −0.243 | 3.093 | 0.527 | 0.490 | 3.093 |
| 250 | −0.078 | −0.176 | 3.093 | 0.408 | 0.442 | 3.093 |
| 251 | 0.028 | −0.110 | 3.093 | 0.289 | 0.392 | 3.093 |
| 252 | 0.135 | −0.045 | 3.093 | 0.171 | 0.340 | 3.093 |
| 253 | 0.242 | 0.019 | 3.093 | 0.054 | 0.286 | 3.093 |
| 254 | 0.350 | 0.083 | 3.093 | −0.061 | 0.230 | 3.093 |
| 255 | 0.458 | 0.145 | 3.093 | −0.176 | 0.171 | 3.093 |
| 256 | 0.566 | 0.207 | 3.093 | −0.289 | 0.109 | 3.093 |
| 257 | 0.675 | 0.268 | 3.093 | −0.399 | 0.044 | 3.093 |
| 258 | 0.784 | 0.329 | 3.093 | −0.508 | −0.025 | 3.093 |
| 259 | 0.894 | 0.389 | 3.093 | −0.615 | −0.098 | 3.093 |
| 260 | 1.000 | 0.446 | 3.093 | −0.715 | −0.172 | 3.093 |
| 261 | 1.103 | 0.501 | 3.093 | −0.809 | −0.246 | 3.093 |
| 262 | 1.203 | 0.553 | 3.093 | −0.897 | −0.322 | 3.093 |
| 263 | 1.299 | 0.603 | 3.093 | −0.979 | −0.398 | 3.093 |
| 264 | 1.392 | 0.650 | 3.093 | −1.054 | −0.474 | 3.093 |
| 265 | 1.481 | 0.695 | 3.093 | −1.125 | −0.549 | 3.093 |
| 266 | 1.566 | 0.738 | 3.093 | −1.189 | −0.624 | 3.093 |
| 267 | 1.649 | 0.778 | 3.093 | −1.248 | −0.697 | 3.093 |
| 268 | 1.720 | 0.813 | 3.093 | −1.300 | −0.766 | 3.093 |
| 269 | 1.783 | 0.844 | 3.093 | −1.345 | −0.829 | 3.093 |
| 270 | 1.843 | 0.873 | 3.093 | −1.384 | −0.885 | 3.093 |
| 271 | 1.900 | 0.900 | 3.093 | −1.419 | −0.939 | 3.093 |
| 272 | 1.948 | 0.923 | 3.093 | −1.449 | −0.986 | 3.093 |
| 273 | 1.986 | 0.941 | 3.093 | −1.471 | −1.023 | 3.093 |
| 274 | 2.016 | 0.955 | 3.093 | −1.488 | −1.053 | 3.093 |
| 275 | 2.039 | 0.966 | 3.093 | −1.498 | −1.077 | 3.093 |
| 276 | 2.054 | 0.976 | 3.093 | −1.500 | −1.096 | 3.093 |
| 277 | 2.060 | 0.990 | 3.093 | −1.497 | −1.106 | 3.093 |
| 278 | 2.060 | 0.998 | 3.093 | −1.494 | −1.112 | 3.093 |
| 279 | 2.060 | 1.003 | 3.093 | −1.492 | −1.115 | 3.093 |
| 280 | 2.059 | 1.005 | 3.093 | −1.491 | −1.116 | 3.093 |
| 281 | −1.496 | −1.127 | 3.769 | 2.054 | 0.999 | 3.769 |
| 282 | −1.496 | −1.127 | 3.769 | 2.053 | 1.000 | 3.769 |
| 283 | −1.494 | −1.128 | 3.769 | 2.052 | 1.002 | 3.769 |
| 284 | −1.492 | −1.130 | 3.769 | 2.049 | 1.006 | 3.769 |
| 285 | −1.485 | −1.132 | 3.769 | 2.043 | 1.012 | 3.769 |
| 286 | −1.475 | −1.132 | 3.769 | 2.029 | 1.016 | 3.769 |
| 287 | −1.457 | −1.127 | 3.769 | 2.010 | 1.012 | 3.769 |
| 288 | −1.435 | −1.114 | 3.769 | 1.986 | 1.004 | 3.769 |
| 289 | −1.409 | −1.093 | 3.769 | 1.953 | 0.993 | 3.769 |
| 290 | −1.377 | −1.067 | 3.769 | 1.913 | 0.979 | 3.769 |
| 291 | −1.335 | −1.033 | 3.769 | 1.860 | 0.961 | 3.769 |
| 292 | −1.285 | −0.995 | 3.769 | 1.799 | 0.941 | 3.769 |
| 293 | −1.232 | −0.954 | 3.769 | 1.734 | 0.918 | 3.769 |
| 294 | −1.173 | −0.909 | 3.769 | 1.665 | 0.895 | 3.769 |
| 295 | −1.105 | −0.860 | 3.769 | 1.588 | 0.868 | 3.769 |
| 296 | −1.031 | −0.806 | 3.769 | 1.499 | 0.837 | 3.769 |
| 297 | −0.953 | −0.751 | 3.769 | 1.406 | 0.805 | 3.769 |
| 298 | −0.870 | −0.694 | 3.769 | 1.308 | 0.771 | 3.769 |
| 299 | −0.784 | −0.635 | 3.769 | 1.207 | 0.736 | 3.769 |
| 300 | −0.695 | −0.575 | 3.769 | 1.102 | 0.698 | 3.769 |
| 301 | −0.601 | −0.513 | 3.769 | 0.993 | 0.659 | 3.769 |
| 302 | −0.503 | −0.449 | 3.769 | 0.880 | 0.618 | 3.769 |
| 303 | −0.402 | −0.383 | 3.769 | 0.764 | 0.574 | 3.769 |
| 304 | −0.297 | −0.315 | 3.769 | 0.644 | 0.528 | 3.769 |
| 305 | −0.191 | −0.248 | 3.769 | 0.524 | 0.481 | 3.769 |
| 306 | −0.085 | −0.182 | 3.769 | 0.405 | 0.432 | 3.769 |
| 307 | 0.021 | −0.117 | 3.769 | 0.287 | 0.382 | 3.769 |
| 308 | 0.128 | −0.052 | 3.769 | 0.169 | 0.330 | 3.769 |

TABLE II-continued

| | Pressure Side Surface | | | Suction Side Surface | | |
|---|---|---|---|---|---|---|
| N | X | Y | Z | X | Y | Z |
| 309 | 0.235 | 0.012 | 3.769 | 0.053 | 0.275 | 3.769 |
| 310 | 0.343 | 0.075 | 3.769 | −0.063 | 0.218 | 3.769 |
| 311 | 0.451 | 0.138 | 3.769 | −0.177 | 0.158 | 3.769 |
| 312 | 0.560 | 0.200 | 3.769 | −0.289 | 0.096 | 3.769 |
| 313 | 0.669 | 0.261 | 3.769 | −0.400 | 0.030 | 3.769 |
| 314 | 0.778 | 0.321 | 3.769 | −0.508 | −0.040 | 3.769 |
| 315 | 0.888 | 0.381 | 3.769 | −0.614 | −0.113 | 3.769 |
| 316 | 0.995 | 0.438 | 3.769 | −0.714 | −0.187 | 3.769 |
| 317 | 1.098 | 0.493 | 3.769 | −0.808 | −0.262 | 3.769 |
| 318 | 1.197 | 0.545 | 3.769 | −0.895 | −0.337 | 3.769 |
| 319 | 1.293 | 0.595 | 3.769 | −0.977 | −0.413 | 3.769 |
| 320 | 1.386 | 0.642 | 3.769 | −1.053 | −0.489 | 3.769 |
| 321 | 1.475 | 0.687 | 3.769 | −1.124 | −0.564 | 3.769 |
| 322 | 1.561 | 0.730 | 3.769 | −1.189 | −0.638 | 3.769 |
| 323 | 1.643 | 0.771 | 3.769 | −1.249 | −0.711 | 3.769 |
| 324 | 1.714 | 0.806 | 3.769 | −1.301 | −0.779 | 3.769 |
| 325 | 1.778 | 0.837 | 3.769 | −1.346 | −0.841 | 3.769 |
| 326 | 1.838 | 0.866 | 3.769 | −1.386 | −0.897 | 3.769 |
| 327 | 1.894 | 0.893 | 3.769 | −1.422 | −0.951 | 3.769 |
| 328 | 1.943 | 0.916 | 3.769 | −1.452 | −0.998 | 3.769 |
| 329 | 1.981 | 0.934 | 3.769 | −1.475 | −1.034 | 3.769 |
| 330 | 2.011 | 0.949 | 3.769 | −1.492 | −1.063 | 3.769 |
| 331 | 2.033 | 0.959 | 3.769 | −1.503 | −1.087 | 3.769 |
| 332 | 2.049 | 0.969 | 3.769 | −1.506 | −1.106 | 3.769 |
| 333 | 2.055 | 0.982 | 3.769 | −1.504 | −1.116 | 3.769 |
| 334 | 2.056 | 0.991 | 3.769 | −1.500 | −1.122 | 3.769 |
| 335 | 2.055 | 0.996 | 3.769 | −1.498 | −1.125 | 3.769 |
| 336 | 2.054 | 0.998 | 3.769 | −1.497 | −1.126 | 3.769 |
| 337 | −1.477 | −1.131 | 4.572 | 2.027 | 0.978 | 4.572 |
| 338 | −1.476 | −1.132 | 4.572 | 2.026 | 0.979 | 4.572 |
| 339 | −1.475 | −1.133 | 4.572 | 2.025 | 0.981 | 4.572 |
| 340 | −1.472 | −1.134 | 4.572 | 2.022 | 0.985 | 4.572 |
| 341 | −1.465 | −1.136 | 4.572 | 2.016 | 0.991 | 4.572 |
| 342 | −1.455 | −1.136 | 4.572 | 2.002 | 0.995 | 4.572 |
| 343 | −1.438 | −1.130 | 4.572 | 1.984 | 0.991 | 4.572 |
| 344 | −1.417 | −1.116 | 4.572 | 1.960 | 0.983 | 4.572 |
| 345 | −1.392 | −1.095 | 4.572 | 1.928 | 0.972 | 4.572 |
| 346 | −1.361 | −1.068 | 4.572 | 1.888 | 0.958 | 4.572 |
| 347 | −1.320 | −1.034 | 4.572 | 1.836 | 0.940 | 4.572 |
| 348 | −1.272 | −0.994 | 4.572 | 1.776 | 0.919 | 4.572 |
| 349 | −1.221 | −0.953 | 4.572 | 1.712 | 0.897 | 4.572 |
| 350 | −1.163 | −0.907 | 4.572 | 1.644 | 0.874 | 4.572 |
| 351 | −1.097 | −0.857 | 4.572 | 1.568 | 0.847 | 4.572 |
| 352 | −1.025 | −0.802 | 4.572 | 1.480 | 0.817 | 4.572 |
| 353 | −0.948 | −0.746 | 4.572 | 1.388 | 0.784 | 4.572 |
| 354 | −0.868 | −0.689 | 4.572 | 1.292 | 0.751 | 4.572 |
| 355 | −0.784 | −0.630 | 4.572 | 1.193 | 0.715 | 4.572 |
| 356 | −0.695 | −0.569 | 4.572 | 1.089 | 0.678 | 4.572 |
| 357 | −0.603 | −0.507 | 4.572 | 0.982 | 0.638 | 4.572 |
| 358 | −0.507 | −0.443 | 4.572 | 0.871 | 0.597 | 4.572 |
| 359 | −0.407 | −0.378 | 4.572 | 0.756 | 0.553 | 4.572 |
| 360 | −0.303 | −0.311 | 4.572 | 0.638 | 0.507 | 4.572 |
| 361 | −0.199 | −0.245 | 4.572 | 0.521 | 0.459 | 4.572 |
| 362 | −0.094 | −0.180 | 4.572 | 0.404 | 0.410 | 4.572 |
| 363 | 0.012 | −0.116 | 4.572 | 0.287 | 0.359 | 4.572 |
| 364 | 0.118 | −0.052 | 4.572 | 0.172 | 0.306 | 4.572 |
| 365 | 0.224 | 0.011 | 4.572 | 0.058 | 0.251 | 4.572 |
| 366 | 0.331 | 0.073 | 4.572 | −0.056 | 0.194 | 4.572 |
| 367 | 0.438 | 0.134 | 4.572 | −0.167 | 0.134 | 4.572 |
| 368 | 0.546 | 0.195 | 4.572 | −0.278 | 0.071 | 4.572 |
| 369 | 0.654 | 0.254 | 4.572 | −0.386 | 0.005 | 4.572 |
| 370 | 0.763 | 0.313 | 4.572 | −0.492 | −0.064 | 4.572 |
| 371 | 0.872 | 0.372 | 4.572 | −0.596 | −0.137 | 4.572 |
| 372 | 0.977 | 0.428 | 4.572 | −0.694 | −0.210 | 4.572 |
| 373 | 1.079 | 0.481 | 4.572 | −0.787 | −0.285 | 4.572 |
| 374 | 1.178 | 0.533 | 4.572 | −0.873 | −0.359 | 4.572 |
| 375 | 1.273 | 0.581 | 4.572 | −0.954 | −0.434 | 4.572 |
| 376 | 1.365 | 0.628 | 4.572 | −1.029 | −0.508 | 4.572 |
| 377 | 1.454 | 0.672 | 4.572 | −1.099 | −0.582 | 4.572 |
| 378 | 1.539 | 0.714 | 4.572 | −1.164 | −0.654 | 4.572 |
| 379 | 1.620 | 0.754 | 4.572 | −1.224 | −0.726 | 4.572 |
| 380 | 1.690 | 0.788 | 4.572 | −1.276 | −0.792 | 4.572 |
| 381 | 1.753 | 0.819 | 4.572 | −1.322 | −0.853 | 4.572 |
| 382 | 1.813 | 0.847 | 4.572 | −1.362 | −0.908 | 4.572 |
| 383 | 1.868 | 0.874 | 4.572 | −1.398 | −0.960 | 4.572 |
| 384 | 1.917 | 0.897 | 4.572 | −1.429 | −1.005 | 4.572 |

TABLE II-continued

| | Pressure Side Surface | | | Suction Side Surface | | |
|---|---|---|---|---|---|---|
| N | X | Y | Z | X | Y | Z |
| 385 | 1.954 | 0.915 | 4.572 | −1.452 | −1.041 | 4.572 |
| 386 | 1.984 | 0.929 | 4.572 | −1.470 | −1.069 | 4.572 |
| 387 | 2.006 | 0.940 | 4.572 | −1.482 | −1.092 | 4.572 |
| 388 | 2.022 | 0.949 | 4.572 | −1.485 | −1.111 | 4.572 |
| 389 | 2.028 | 0.962 | 4.572 | −1.483 | −1.121 | 4.572 |
| 390 | 2.029 | 0.970 | 4.572 | −1.481 | −1.127 | 4.572 |
| 391 | 2.028 | 0.975 | 4.572 | −1.478 | −1.130 | 4.572 |
| 392 | 2.027 | 0.977 | 4.572 | −1.477 | −1.131 | 4.572 |
| 393 | −1.444 | −1.127 | 5.280 | 1.985 | 0.953 | 5.280 |
| 394 | −1.443 | −1.127 | 5.280 | 1.984 | 0.954 | 5.280 |
| 395 | −1.442 | −1.128 | 5.280 | 1.983 | 0.956 | 5.280 |
| 396 | −1.439 | −1.130 | 5.280 | 1.980 | 0.960 | 5.280 |
| 397 | −1.433 | −1.131 | 5.280 | 1.974 | 0.966 | 5.280 |
| 398 | −1.423 | −1.130 | 5.280 | 1.960 | 0.970 | 5.280 |
| 399 | −1.406 | −1.124 | 5.280 | 1.942 | 0.965 | 5.280 |
| 400 | −1.386 | −1.109 | 5.280 | 1.919 | 0.957 | 5.280 |
| 401 | −1.362 | −1.088 | 5.280 | 1.888 | 0.946 | 5.280 |
| 402 | −1.332 | −1.061 | 5.280 | 1.848 | 0.932 | 5.280 |
| 403 | −1.293 | −1.026 | 5.280 | 1.798 | 0.915 | 5.280 |
| 404 | −1.247 | −0.986 | 5.280 | 1.739 | 0.894 | 5.280 |
| 405 | −1.198 | −0.944 | 5.280 | 1.677 | 0.872 | 5.280 |
| 406 | −1.142 | −0.898 | 5.280 | 1.610 | 0.849 | 5.280 |
| 407 | −1.079 | −0.847 | 5.280 | 1.536 | 0.822 | 5.280 |
| 408 | −1.009 | −0.792 | 5.280 | 1.450 | 0.792 | 5.280 |
| 409 | −0.936 | −0.735 | 5.280 | 1.360 | 0.760 | 5.280 |
| 410 | −0.858 | −0.677 | 5.280 | 1.267 | 0.726 | 5.280 |
| 411 | −0.776 | −0.618 | 5.280 | 1.170 | 0.691 | 5.280 |
| 412 | −0.690 | −0.557 | 5.280 | 1.069 | 0.653 | 5.280 |
| 413 | −0.600 | −0.495 | 5.280 | 0.964 | 0.614 | 5.280 |
| 414 | −0.507 | −0.432 | 5.280 | 0.856 | 0.573 | 5.280 |
| 415 | −0.409 | −0.368 | 5.280 | 0.744 | 0.529 | 5.280 |
| 416 | −0.307 | −0.302 | 5.280 | 0.629 | 0.483 | 5.280 |
| 417 | −0.204 | −0.238 | 5.280 | 0.514 | 0.435 | 5.280 |
| 418 | −0.101 | −0.174 | 5.280 | 0.400 | 0.386 | 5.280 |
| 419 | 0.003 | −0.111 | 5.280 | 0.287 | 0.335 | 5.280 |
| 420 | 0.107 | −0.049 | 5.280 | 0.174 | 0.282 | 5.280 |
| 421 | 0.212 | 0.012 | 5.280 | 0.063 | 0.227 | 5.280 |
| 422 | 0.317 | 0.072 | 5.280 | −0.048 | 0.170 | 5.280 |
| 423 | 0.422 | 0.132 | 5.280 | −0.157 | 0.110 | 5.280 |
| 424 | 0.528 | 0.191 | 5.280 | −0.264 | 0.048 | 5.280 |
| 425 | 0.635 | 0.249 | 5.280 | −0.370 | −0.018 | 5.280 |
| 426 | 0.741 | 0.306 | 5.280 | −0.473 | −0.086 | 5.280 |
| 427 | 0.848 | 0.363 | 5.280 | −0.575 | −0.158 | 5.280 |
| 428 | 0.952 | 0.418 | 5.280 | −0.670 | −0.230 | 5.280 |
| 429 | 1.053 | 0.470 | 5.280 | −0.761 | −0.303 | 5.280 |
| 430 | 1.150 | 0.519 | 5.280 | −0.845 | −0.376 | 5.280 |
| 431 | 1.244 | 0.567 | 5.280 | −0.924 | −0.449 | 5.280 |
| 432 | 1.334 | 0.612 | 5.280 | −0.998 | −0.522 | 5.280 |
| 433 | 1.421 | 0.655 | 5.280 | −1.067 | −0.593 | 5.280 |
| 434 | 1.504 | 0.696 | 5.280 | −1.131 | −0.664 | 5.280 |
| 435 | 1.584 | 0.735 | 5.280 | −1.190 | −0.733 | 5.280 |
| 436 | 1.653 | 0.768 | 5.280 | −1.242 | −0.798 | 5.280 |
| 437 | 1.715 | 0.798 | 5.280 | −1.288 | −0.857 | 5.280 |
| 438 | 1.774 | 0.826 | 5.280 | −1.327 | −0.910 | 5.280 |
| 439 | 1.828 | 0.852 | 5.280 | −1.364 | −0.960 | 5.280 |
| 440 | 1.876 | 0.874 | 5.280 | −1.394 | −1.004 | 5.280 |
| 441 | 1.912 | 0.892 | 5.280 | −1.418 | −1.039 | 5.280 |
| 442 | 1.942 | 0.905 | 5.280 | −1.436 | −1.066 | 5.280 |
| 443 | 1.964 | 0.916 | 5.280 | −1.448 | −1.088 | 5.280 |
| 444 | 1.979 | 0.925 | 5.280 | −1.452 | −1.106 | 5.280 |
| 445 | 1.986 | 0.937 | 5.280 | −1.450 | −1.116 | 5.280 |
| 446 | 1.986 | 0.945 | 5.280 | −1.448 | −1.122 | 5.280 |
| 447 | 1.986 | 0.950 | 5.280 | −1.446 | −1.125 | 5.280 |
| 448 | 1.985 | 0.952 | 5.280 | −1.445 | −1.126 | 5.280 |
| 449 | −1.405 | −1.116 | 5.799 | 1.944 | 0.925 | 5.799 |
| 450 | −1.405 | −1.116 | 5.799 | 1.944 | 0.926 | 5.799 |
| 451 | −1.403 | −1.117 | 5.799 | 1.943 | 0.928 | 5.799 |
| 452 | −1.400 | −1.119 | 5.799 | 1.940 | 0.932 | 5.799 |
| 453 | −1.394 | −1.120 | 5.799 | 1.934 | 0.937 | 5.799 |
| 454 | −1.384 | −1.119 | 5.799 | 1.921 | 0.941 | 5.799 |
| 455 | −1.368 | −1.112 | 5.799 | 1.903 | 0.936 | 5.799 |
| 456 | −1.349 | −1.098 | 5.799 | 1.880 | 0.928 | 5.799 |
| 457 | −1.326 | −1.076 | 5.799 | 1.850 | 0.918 | 5.799 |
| 458 | −1.297 | −1.049 | 5.799 | 1.812 | 0.904 | 5.799 |
| 459 | −1.259 | −1.015 | 5.799 | 1.762 | 0.887 | 5.799 |
| 460 | −1.215 | −0.975 | 5.799 | 1.705 | 0.866 | 5.799 |

TABLE II-continued

| | Pressure Side Surface | | | Suction Side Surface | | |
|---|---|---|---|---|---|---|
| N | X | Y | Z | X | Y | Z |
| 461 | −1.168 | −0.933 | 5.799 | 1.644 | 0.845 | 5.799 |
| 462 | −1.114 | −0.887 | 5.799 | 1.579 | 0.822 | 5.799 |
| 463 | −1.053 | −0.836 | 5.799 | 1.506 | 0.796 | 5.799 |
| 464 | −0.986 | −0.781 | 5.799 | 1.423 | 0.766 | 5.799 |
| 465 | −0.914 | −0.725 | 5.799 | 1.335 | 0.734 | 5.799 |
| 466 | −0.839 | −0.667 | 5.799 | 1.244 | 0.701 | 5.799 |
| 467 | −0.759 | −0.608 | 5.799 | 1.149 | 0.666 | 5.799 |
| 468 | −0.676 | −0.548 | 5.799 | 1.050 | 0.629 | 5.799 |
| 469 | −0.588 | −0.487 | 5.799 | 0.948 | 0.591 | 5.799 |
| 470 | −0.496 | −0.425 | 5.799 | 0.842 | 0.550 | 5.799 |
| 471 | −0.401 | −0.362 | 5.799 | 0.733 | 0.507 | 5.799 |
| 472 | −0.301 | −0.298 | 5.799 | 0.621 | 0.461 | 5.799 |
| 473 | −0.201 | −0.235 | 5.799 | 0.509 | 0.414 | 5.799 |
| 474 | −0.100 | −0.172 | 5.799 | 0.397 | 0.365 | 5.799 |
| 475 | 0.002 | −0.111 | 5.799 | 0.287 | 0.315 | 5.799 |
| 476 | 0.104 | −0.051 | 5.799 | 0.177 | 0.263 | 5.799 |
| 477 | 0.207 | 0.009 | 5.799 | 0.069 | 0.208 | 5.799 |
| 478 | 0.310 | 0.067 | 5.799 | −0.039 | 0.152 | 5.799 |
| 479 | 0.413 | 0.125 | 5.799 | −0.145 | 0.093 | 5.799 |
| 480 | 0.517 | 0.183 | 5.799 | −0.250 | 0.031 | 5.799 |
| 481 | 0.622 | 0.239 | 5.799 | −0.353 | −0.033 | 5.799 |
| 482 | 0.726 | 0.295 | 5.799 | −0.454 | −0.100 | 5.799 |
| 483 | 0.831 | 0.350 | 5.799 | −0.553 | −0.170 | 5.799 |
| 484 | 0.933 | 0.403 | 5.799 | −0.646 | −0.242 | 5.799 |
| 485 | 1.032 | 0.454 | 5.799 | −0.734 | −0.313 | 5.799 |
| 486 | 1.127 | 0.502 | 5.799 | −0.817 | −0.385 | 5.799 |
| 487 | 1.219 | 0.548 | 5.799 | −0.894 | −0.456 | 5.799 |
| 488 | 1.307 | 0.592 | 5.799 | −0.966 | −0.527 | 5.799 |
| 489 | 1.392 | 0.634 | 5.799 | −1.034 | −0.597 | 5.799 |
| 490 | 1.474 | 0.674 | 5.799 | −1.096 | −0.666 | 5.799 |
| 491 | 1.552 | 0.712 | 5.799 | −1.155 | −0.733 | 5.799 |
| 492 | 1.620 | 0.745 | 5.799 | −1.206 | −0.796 | 5.799 |
| 493 | 1.681 | 0.774 | 5.799 | −1.251 | −0.853 | 5.799 |
| 494 | 1.738 | 0.801 | 5.799 | −1.290 | −0.905 | 5.799 |
| 495 | 1.791 | 0.826 | 5.799 | −1.325 | −0.954 | 5.799 |
| 496 | 1.838 | 0.848 | 5.799 | −1.356 | −0.997 | 5.799 |
| 497 | 1.874 | 0.865 | 5.799 | −1.379 | −1.030 | 5.799 |
| 498 | 1.902 | 0.878 | 5.799 | −1.397 | −1.057 | 5.799 |
| 499 | 1.924 | 0.888 | 5.799 | −1.409 | −1.078 | 5.799 |
| 500 | 1.939 | 0.897 | 5.799 | −1.413 | −1.096 | 5.799 |
| 501 | 1.946 | 0.909 | 5.799 | −1.412 | −1.106 | 5.799 |
| 502 | 1.946 | 0.917 | 5.799 | −1.409 | −1.112 | 5.799 |
| 503 | 1.946 | 0.922 | 5.799 | −1.407 | −1.114 | 5.799 |
| 504 | 1.945 | 0.924 | 5.799 | −1.406 | −1.115 | 5.799 |
| 505 | −1.373 | −1.106 | 6.139 | 1.916 | 0.903 | 6.139 |
| 506 | −1.372 | −1.106 | 6.139 | 1.915 | 0.904 | 6.139 |
| 507 | −1.371 | −1.107 | 6.139 | 1.914 | 0.906 | 6.139 |
| 508 | −1.368 | −1.109 | 6.139 | 1.911 | 0.910 | 6.139 |
| 509 | −1.362 | −1.110 | 6.139 | 1.905 | 0.915 | 6.139 |
| 510 | −1.352 | −1.109 | 6.139 | 1.892 | 0.918 | 6.139 |
| 511 | −1.336 | −1.102 | 6.139 | 1.875 | 0.914 | 6.139 |
| 512 | −1.318 | −1.088 | 6.139 | 1.852 | 0.906 | 6.139 |
| 513 | −1.296 | −1.066 | 6.139 | 1.822 | 0.895 | 6.139 |
| 514 | −1.268 | −1.039 | 6.139 | 1.785 | 0.882 | 6.139 |
| 515 | −1.231 | −1.005 | 6.139 | 1.736 | 0.865 | 6.139 |
| 516 | −1.188 | −0.965 | 6.139 | 1.680 | 0.845 | 6.139 |
| 517 | −1.142 | −0.923 | 6.139 | 1.620 | 0.824 | 6.139 |
| 518 | −1.090 | −0.877 | 6.139 | 1.556 | 0.801 | 6.139 |
| 519 | −1.030 | −0.827 | 6.139 | 1.485 | 0.776 | 6.139 |
| 520 | −0.965 | −0.772 | 6.139 | 1.403 | 0.746 | 6.139 |
| 521 | −0.895 | −0.716 | 6.139 | 1.317 | 0.715 | 6.139 |
| 522 | −0.821 | −0.659 | 6.139 | 1.227 | 0.682 | 6.139 |
| 523 | −0.743 | −0.601 | 6.139 | 1.134 | 0.648 | 6.139 |
| 524 | −0.661 | −0.542 | 6.139 | 1.037 | 0.611 | 6.139 |
| 525 | −0.576 | −0.481 | 6.139 | 0.937 | 0.573 | 6.139 |
| 526 | −0.486 | −0.420 | 6.139 | 0.833 | 0.533 | 6.139 |
| 527 | −0.392 | −0.358 | 6.139 | 0.726 | 0.490 | 6.139 |
| 528 | −0.294 | −0.295 | 6.139 | 0.616 | 0.445 | 6.139 |
| 529 | −0.195 | −0.232 | 6.139 | 0.506 | 0.399 | 6.139 |
| 530 | −0.096 | −0.171 | 6.139 | 0.397 | 0.350 | 6.139 |
| 531 | 0.004 | −0.111 | 6.139 | 0.288 | 0.301 | 6.139 |
| 532 | 0.105 | −0.052 | 6.139 | 0.181 | 0.249 | 6.139 |
| 533 | 0.206 | 0.006 | 6.139 | 0.074 | 0.196 | 6.139 |
| 534 | 0.307 | 0.063 | 6.139 | −0.031 | 0.140 | 6.139 |
| 535 | 0.409 | 0.120 | 6.139 | −0.135 | 0.082 | 6.139 |
| 536 | 0.511 | 0.176 | 6.139 | −0.238 | 0.021 | 6.139 |

TABLE II-continued

| | Pressure Side Surface | | | Suction Side Surface | | |
|---|---|---|---|---|---|---|
| N | X | Y | Z | X | Y | Z |
| 537 | 0.614 | 0.231 | 6.139 | −0.339 | −0.042 | 6.139 |
| 538 | 0.717 | 0.286 | 6.139 | −0.438 | −0.109 | 6.139 |
| 539 | 0.820 | 0.340 | 6.139 | −0.535 | −0.178 | 6.139 |
| 540 | 0.921 | 0.392 | 6.139 | −0.627 | −0.248 | 6.139 |
| 541 | 1.017 | 0.441 | 6.139 | −0.713 | −0.318 | 6.139 |
| 542 | 1.111 | 0.489 | 6.139 | −0.794 | −0.389 | 6.139 |
| 543 | 1.202 | 0.534 | 6.139 | −0.870 | −0.459 | 6.139 |
| 544 | 1.289 | 0.577 | 6.139 | −0.941 | −0.529 | 6.139 |
| 545 | 1.372 | 0.618 | 6.139 | −1.007 | −0.597 | 6.139 |
| 546 | 1.453 | 0.657 | 6.139 | −1.069 | −0.665 | 6.139 |
| 547 | 1.530 | 0.694 | 6.139 | −1.126 | −0.731 | 6.139 |
| 548 | 1.596 | 0.726 | 6.139 | −1.177 | −0.792 | 6.139 |
| 549 | 1.656 | 0.754 | 6.139 | −1.221 | −0.849 | 6.139 |
| 550 | 1.712 | 0.781 | 6.139 | −1.259 | −0.899 | 6.139 |
| 551 | 1.765 | 0.806 | 6.139 | −1.294 | −0.947 | 6.139 |
| 552 | 1.811 | 0.828 | 6.139 | −1.324 | −0.990 | 6.139 |
| 553 | 1.846 | 0.844 | 6.139 | −1.347 | −1.022 | 6.139 |
| 554 | 1.874 | 0.857 | 6.139 | −1.365 | −1.049 | 6.139 |
| 555 | 1.895 | 0.867 | 6.139 | −1.377 | −1.069 | 6.139 |
| 556 | 1.910 | 0.876 | 6.139 | −1.381 | −1.086 | 6.139 |
| 557 | 1.917 | 0.888 | 6.139 | −1.379 | −1.096 | 6.139 |
| 558 | 1.917 | 0.895 | 6.139 | −1.377 | −1.102 | 6.139 |
| 559 | 1.917 | 0.900 | 6.139 | −1.375 | −1.104 | 6.139 |
| 560 | 1.916 | 0.902 | 6.139 | −1.373 | −1.105 | 6.139 |
| 561 | −1.309 | −1.086 | 6.713 | 1.862 | 0.865 | 6.713 |
| 562 | −1.309 | −1.086 | 6.713 | 1.862 | 0.866 | 6.713 |
| 563 | −1.307 | −1.087 | 6.713 | 1.861 | 0.867 | 6.713 |
| 564 | −1.305 | −1.088 | 6.713 | 1.858 | 0.871 | 6.713 |
| 565 | −1.299 | −1.089 | 6.713 | 1.853 | 0.876 | 6.713 |
| 566 | −1.290 | −1.088 | 6.713 | 1.840 | 0.880 | 6.713 |
| 567 | −1.274 | −1.081 | 6.713 | 1.823 | 0.875 | 6.713 |
| 568 | −1.257 | −1.067 | 6.713 | 1.802 | 0.867 | 6.713 |
| 569 | −1.236 | −1.045 | 6.713 | 1.773 | 0.857 | 6.713 |
| 570 | −1.210 | −1.018 | 6.713 | 1.736 | 0.844 | 6.713 |
| 571 | −1.176 | −0.983 | 6.713 | 1.689 | 0.827 | 6.713 |
| 572 | −1.135 | −0.944 | 6.713 | 1.635 | 0.808 | 6.713 |
| 573 | −1.092 | −0.902 | 6.713 | 1.577 | 0.787 | 6.713 |
| 574 | −1.042 | −0.856 | 6.713 | 1.516 | 0.765 | 6.713 |
| 575 | −0.987 | −0.806 | 6.713 | 1.447 | 0.740 | 6.713 |
| 576 | −0.924 | −0.752 | 6.713 | 1.368 | 0.711 | 6.713 |
| 577 | −0.858 | −0.697 | 6.713 | 1.285 | 0.681 | 6.713 |
| 578 | −0.787 | −0.640 | 6.713 | 1.199 | 0.649 | 6.713 |
| 579 | −0.712 | −0.583 | 6.713 | 1.109 | 0.615 | 6.713 |
| 580 | −0.634 | −0.525 | 6.713 | 1.015 | 0.580 | 6.713 |
| 581 | −0.551 | −0.466 | 6.713 | 0.918 | 0.543 | 6.713 |
| 582 | −0.465 | −0.406 | 6.713 | 0.818 | 0.503 | 6.713 |
| 583 | −0.374 | −0.346 | 6.713 | 0.715 | 0.462 | 6.713 |
| 584 | −0.279 | −0.284 | 6.713 | 0.609 | 0.418 | 6.713 |
| 585 | −0.184 | −0.224 | 6.713 | 0.503 | 0.372 | 6.713 |
| 586 | −0.088 | −0.165 | 6.713 | 0.398 | 0.325 | 6.713 |
| 587 | 0.009 | −0.107 | 6.713 | 0.293 | 0.277 | 6.713 |
| 588 | 0.106 | −0.050 | 6.713 | 0.189 | 0.226 | 6.713 |
| 589 | 0.204 | 0.006 | 6.713 | 0.087 | 0.174 | 6.713 |
| 590 | 0.302 | 0.061 | 6.713 | −0.015 | 0.120 | 6.713 |
| 591 | 0.401 | 0.116 | 6.713 | −0.115 | 0.063 | 6.713 |
| 592 | 0.500 | 0.169 | 6.713 | −0.214 | 0.004 | 6.713 |
| 593 | 0.600 | 0.222 | 6.713 | −0.311 | −0.058 | 6.713 |
| 594 | 0.700 | 0.274 | 6.713 | −0.406 | −0.123 | 6.713 |
| 595 | 0.800 | 0.326 | 6.713 | −0.500 | −0.191 | 6.713 |
| 596 | 0.897 | 0.375 | 6.713 | −0.588 | −0.258 | 6.713 |
| 597 | 0.992 | 0.423 | 6.713 | −0.671 | −0.327 | 6.713 |
| 598 | 1.082 | 0.468 | 6.713 | −0.749 | −0.395 | 6.713 |
| 599 | 1.170 | 0.511 | 6.713 | −0.823 | −0.462 | 6.713 |
| 600 | 1.255 | 0.552 | 6.713 | −0.891 | −0.529 | 6.713 |
| 601 | 1.336 | 0.591 | 6.713 | −0.956 | −0.595 | 6.713 |
| 602 | 1.414 | 0.629 | 6.713 | −1.015 | −0.661 | 6.713 |
| 603 | 1.488 | 0.664 | 6.713 | −1.071 | −0.724 | 6.713 |
| 604 | 1.553 | 0.695 | 6.713 | −1.120 | −0.783 | 6.713 |
| 605 | 1.611 | 0.722 | 6.713 | −1.163 | −0.838 | 6.713 |
| 606 | 1.665 | 0.748 | 6.713 | −1.200 | −0.887 | 6.713 |
| 607 | 1.716 | 0.772 | 6.713 | −1.234 | −0.933 | 6.713 |
| 608 | 1.761 | 0.792 | 6.713 | −1.263 | −0.974 | 6.713 |
| 609 | 1.795 | 0.808 | 6.713 | −1.285 | −1.005 | 6.713 |
| 610 | 1.822 | 0.821 | 6.713 | −1.302 | −1.031 | 6.713 |
| 611 | 1.843 | 0.830 | 6.713 | −1.314 | −1.050 | 6.713 |
| 612 | 1.857 | 0.839 | 6.713 | −1.318 | −1.067 | 6.713 |

TABLE II-continued

| | Pressure Side Surface | | | Suction Side Surface | | |
|---|---|---|---|---|---|---|
| N | X | Y | Z | X | Y | Z |
| 613 | 1.864 | 0.850 | 6.713 | −1.316 | −1.076 | 6.713 |
| 614 | 1.864 | 0.857 | 6.713 | −1.313 | −1.082 | 6.713 |
| 615 | 1.863 | 0.862 | 6.713 | −1.311 | −1.084 | 6.713 |
| 616 | 1.863 | 0.864 | 6.713 | −1.310 | −1.085 | 6.713 |
| 617 | −1.264 | −1.070 | 7.084 | 1.820 | 0.838 | 7.084 |
| 618 | −1.264 | −1.070 | 7.084 | 1.820 | 0.839 | 7.084 |
| 619 | −1.263 | −1.071 | 7.084 | 1.819 | 0.841 | 7.084 |
| 620 | −1.260 | −1.072 | 7.084 | 1.816 | 0.844 | 7.084 |
| 621 | −1.254 | −1.073 | 7.084 | 1.811 | 0.849 | 7.084 |
| 622 | −1.245 | −1.072 | 7.084 | 1.798 | 0.852 | 7.084 |
| 623 | −1.230 | −1.065 | 7.084 | 1.782 | 0.848 | 7.084 |
| 624 | −1.214 | −1.050 | 7.084 | 1.761 | 0.840 | 7.084 |
| 625 | −1.194 | −1.029 | 7.084 | 1.733 | 0.830 | 7.084 |
| 626 | −1.169 | −1.002 | 7.084 | 1.698 | 0.818 | 7.084 |
| 627 | −1.137 | −0.967 | 7.084 | 1.652 | 0.801 | 7.084 |
| 628 | −1.098 | −0.928 | 7.084 | 1.599 | 0.782 | 7.084 |
| 629 | −1.057 | −0.886 | 7.084 | 1.543 | 0.762 | 7.084 |
| 630 | −1.010 | −0.840 | 7.084 | 1.483 | 0.740 | 7.084 |
| 631 | −0.956 | −0.790 | 7.084 | 1.416 | 0.715 | 7.084 |
| 632 | −0.896 | −0.736 | 7.084 | 1.339 | 0.687 | 7.084 |
| 633 | −0.832 | −0.681 | 7.084 | 1.258 | 0.657 | 7.084 |
| 634 | −0.764 | −0.625 | 7.084 | 1.174 | 0.626 | 7.084 |
| 635 | −0.692 | −0.569 | 7.084 | 1.087 | 0.593 | 7.084 |
| 636 | −0.616 | −0.512 | 7.084 | 0.996 | 0.558 | 7.084 |
| 637 | −0.536 | −0.454 | 7.084 | 0.902 | 0.522 | 7.084 |
| 638 | −0.452 | −0.395 | 7.084 | 0.804 | 0.483 | 7.084 |
| 639 | −0.363 | −0.335 | 7.084 | 0.704 | 0.442 | 7.084 |
| 640 | −0.271 | −0.275 | 7.084 | 0.601 | 0.399 | 7.084 |
| 641 | −0.179 | −0.216 | 7.084 | 0.498 | 0.354 | 7.084 |
| 642 | −0.085 | −0.159 | 7.084 | 0.395 | 0.308 | 7.084 |
| 643 | 0.009 | −0.102 | 7.084 | 0.294 | 0.260 | 7.084 |
| 644 | 0.104 | −0.046 | 7.084 | 0.193 | 0.211 | 7.084 |
| 645 | 0.200 | 0.008 | 7.084 | 0.093 | 0.160 | 7.084 |
| 646 | 0.296 | 0.062 | 7.084 | −0.006 | 0.106 | 7.084 |
| 647 | 0.392 | 0.114 | 7.084 | −0.103 | 0.051 | 7.084 |
| 648 | 0.489 | 0.166 | 7.084 | −0.199 | −0.008 | 7.084 |
| 649 | 0.586 | 0.217 | 7.084 | −0.293 | −0.068 | 7.084 |
| 650 | 0.684 | 0.268 | 7.084 | −0.386 | −0.132 | 7.084 |
| 651 | 0.782 | 0.318 | 7.084 | −0.477 | −0.198 | 7.084 |
| 652 | 0.877 | 0.365 | 7.084 | −0.562 | −0.264 | 7.084 |
| 653 | 0.969 | 0.411 | 7.084 | −0.643 | −0.331 | 7.084 |
| 654 | 1.058 | 0.454 | 7.084 | −0.719 | −0.397 | 7.084 |
| 655 | 1.144 | 0.496 | 7.084 | −0.791 | −0.463 | 7.084 |
| 656 | 1.226 | 0.536 | 7.084 | −0.858 | −0.528 | 7.084 |
| 657 | 1.306 | 0.574 | 7.084 | −0.920 | −0.592 | 7.084 |
| 658 | 1.382 | 0.610 | 7.084 | −0.979 | −0.656 | 7.084 |
| 659 | 1.455 | 0.644 | 7.084 | −1.033 | −0.718 | 7.084 |
| 660 | 1.518 | 0.674 | 7.084 | −1.080 | −0.775 | 7.084 |
| 661 | 1.574 | 0.700 | 7.084 | −1.122 | −0.828 | 7.084 |
| 662 | 1.628 | 0.725 | 7.084 | −1.158 | −0.876 | 7.084 |
| 663 | 1.677 | 0.748 | 7.084 | −1.192 | −0.921 | 7.084 |
| 664 | 1.721 | 0.768 | 7.084 | −1.220 | −0.961 | 7.084 |
| 665 | 1.754 | 0.783 | 7.084 | −1.241 | −0.991 | 7.084 |
| 666 | 1.781 | 0.795 | 7.084 | −1.258 | −1.016 | 7.084 |
| 667 | 1.801 | 0.804 | 7.084 | −1.270 | −1.035 | 7.084 |
| 668 | 1.815 | 0.813 | 7.084 | −1.273 | −1.052 | 7.084 |
| 669 | 1.821 | 0.824 | 7.084 | −1.271 | −1.061 | 7.084 |
| 670 | 1.822 | 0.831 | 7.084 | −1.268 | −1.066 | 7.084 |
| 671 | 1.821 | 0.835 | 7.084 | −1.266 | −1.068 | 7.084 |
| 672 | 1.821 | 0.837 | 7.084 | −1.265 | −1.069 | 7.084 |
| 673 | −1.220 | −1.052 | 7.440 | 1.770 | 0.809 | 7.440 |
| 674 | −1.219 | −1.052 | 7.440 | 1.770 | 0.810 | 7.440 |
| 675 | −1.218 | −1.053 | 7.440 | 1.769 | 0.812 | 7.440 |
| 676 | −1.215 | −1.054 | 7.440 | 1.767 | 0.815 | 7.440 |
| 677 | −1.210 | −1.055 | 7.440 | 1.761 | 0.820 | 7.440 |
| 678 | −1.201 | −1.054 | 7.440 | 1.749 | 0.823 | 7.440 |
| 679 | −1.187 | −1.047 | 7.440 | 1.733 | 0.819 | 7.440 |
| 680 | −1.171 | −1.032 | 7.440 | 1.713 | 0.811 | 7.440 |
| 681 | −1.152 | −1.011 | 7.440 | 1.686 | 0.802 | 7.440 |
| 682 | −1.129 | −0.984 | 7.440 | 1.651 | 0.789 | 7.440 |
| 683 | −1.098 | −0.949 | 7.440 | 1.607 | 0.773 | 7.440 |
| 684 | −1.062 | −0.910 | 7.440 | 1.556 | 0.754 | 7.440 |
| 685 | −1.023 | −0.869 | 7.440 | 1.501 | 0.734 | 7.440 |
| 686 | −0.978 | −0.823 | 7.440 | 1.443 | 0.713 | 7.440 |
| 687 | −0.927 | −0.773 | 7.440 | 1.379 | 0.689 | 7.440 |
| 688 | −0.869 | −0.720 | 7.440 | 1.304 | 0.661 | 7.440 |

TABLE II-continued

| | Pressure Side Surface | | | Suction Side Surface | | |
|---|---|---|---|---|---|---|
| N | X | Y | Z | X | Y | Z |
| 689 | −0.808 | −0.665 | 7.440 | 1.225 | 0.632 | 7.440 |
| 690 | −0.743 | −0.610 | 7.440 | 1.144 | 0.602 | 7.440 |
| 691 | −0.673 | −0.554 | 7.440 | 1.059 | 0.569 | 7.440 |
| 692 | −0.600 | −0.497 | 7.440 | 0.971 | 0.535 | 7.440 |
| 693 | −0.523 | −0.440 | 7.440 | 0.879 | 0.500 | 7.440 |
| 694 | −0.441 | −0.383 | 7.440 | 0.785 | 0.462 | 7.440 |
| 695 | −0.356 | −0.324 | 7.440 | 0.687 | 0.422 | 7.440 |
| 696 | −0.267 | −0.265 | 7.440 | 0.587 | 0.380 | 7.440 |
| 697 | −0.177 | −0.208 | 7.440 | 0.487 | 0.336 | 7.440 |
| 698 | −0.086 | −0.152 | 7.440 | 0.388 | 0.291 | 7.440 |
| 699 | 0.006 | −0.096 | 7.440 | 0.289 | 0.244 | 7.440 |
| 700 | 0.098 | −0.042 | 7.440 | 0.192 | 0.196 | 7.440 |
| 701 | 0.191 | 0.010 | 7.440 | 0.095 | 0.146 | 7.440 |
| 702 | 0.284 | 0.062 | 7.440 | −0.001 | 0.093 | 7.440 |
| 703 | 0.378 | 0.113 | 7.440 | −0.095 | 0.039 | 7.440 |
| 704 | 0.473 | 0.163 | 7.440 | −0.188 | −0.018 | 7.440 |
| 705 | 0.568 | 0.213 | 7.440 | −0.279 | −0.077 | 7.440 |
| 706 | 0.663 | 0.261 | 7.440 | −0.369 | −0.139 | 7.440 |
| 707 | 0.758 | 0.309 | 7.440 | −0.457 | −0.204 | 7.440 |
| 708 | 0.851 | 0.355 | 7.440 | −0.540 | −0.268 | 7.440 |
| 709 | 0.941 | 0.399 | 7.440 | −0.618 | −0.333 | 7.440 |
| 710 | 1.028 | 0.440 | 7.440 | −0.692 | −0.398 | 7.440 |
| 711 | 1.111 | 0.480 | 7.440 | −0.762 | −0.462 | 7.440 |
| 712 | 1.192 | 0.518 | 7.440 | −0.827 | −0.525 | 7.440 |
| 713 | 1.269 | 0.555 | 7.440 | −0.887 | −0.588 | 7.440 |
| 714 | 1.343 | 0.589 | 7.440 | −0.944 | −0.649 | 7.440 |
| 715 | 1.414 | 0.622 | 7.440 | −0.996 | −0.710 | 7.440 |
| 716 | 1.476 | 0.651 | 7.440 | −1.042 | −0.766 | 7.440 |
| 717 | 1.531 | 0.676 | 7.440 | −1.083 | −0.817 | 7.440 |
| 718 | 1.583 | 0.700 | 7.440 | −1.118 | −0.863 | 7.440 |
| 719 | 1.631 | 0.722 | 7.440 | −1.150 | −0.907 | 7.440 |
| 720 | 1.674 | 0.741 | 7.440 | −1.178 | −0.946 | 7.440 |
| 721 | 1.706 | 0.756 | 7.440 | −1.198 | −0.976 | 7.440 |
| 722 | 1.732 | 0.768 | 7.440 | −1.215 | −1.000 | 7.440 |
| 723 | 1.751 | 0.777 | 7.440 | −1.225 | −1.018 | 7.440 |
| 724 | 1.765 | 0.785 | 7.440 | −1.228 | −1.034 | 7.440 |
| 725 | 1.771 | 0.795 | 7.440 | −1.226 | −1.043 | 7.440 |
| 726 | 1.772 | 0.802 | 7.440 | −1.223 | −1.048 | 7.440 |
| 727 | 1.771 | 0.807 | 7.440 | −1.221 | −1.050 | 7.440 |
| 728 | 1.771 | 0.808 | 7.440 | −1.220 | −1.051 | 7.440 |
| 729 | −1.200 | −1.043 | 7.595 | 1.747 | 0.796 | 7.595 |
| 730 | −1.200 | −1.044 | 7.595 | 1.746 | 0.797 | 7.595 |
| 731 | −1.198 | −1.045 | 7.595 | 1.746 | 0.799 | 7.595 |
| 732 | −1.196 | −1.046 | 7.595 | 1.743 | 0.802 | 7.595 |
| 733 | −1.190 | −1.047 | 7.595 | 1.738 | 0.807 | 7.595 |
| 734 | −1.182 | −1.045 | 7.595 | 1.726 | 0.810 | 7.595 |
| 735 | −1.168 | −1.038 | 7.595 | 1.710 | 0.806 | 7.595 |
| 736 | −1.152 | −1.024 | 7.595 | 1.690 | 0.798 | 7.595 |
| 737 | −1.134 | −1.002 | 7.595 | 1.663 | 0.788 | 7.595 |
| 738 | −1.111 | −0.976 | 7.595 | 1.629 | 0.776 | 7.595 |
| 739 | −1.081 | −0.941 | 7.595 | 1.586 | 0.760 | 7.595 |
| 740 | −1.046 | −0.902 | 7.595 | 1.535 | 0.742 | 7.595 |
| 741 | −1.008 | −0.861 | 7.595 | 1.481 | 0.722 | 7.595 |
| 742 | −0.964 | −0.815 | 7.595 | 1.424 | 0.701 | 7.595 |
| 743 | −0.914 | −0.765 | 7.595 | 1.360 | 0.677 | 7.595 |
| 744 | −0.858 | −0.712 | 7.595 | 1.286 | 0.650 | 7.595 |
| 745 | −0.798 | −0.658 | 7.595 | 1.209 | 0.621 | 7.595 |
| 746 | −0.734 | −0.603 | 7.595 | 1.129 | 0.591 | 7.595 |
| 747 | −0.666 | −0.547 | 7.595 | 1.045 | 0.559 | 7.595 |
| 748 | −0.594 | −0.491 | 7.595 | 0.958 | 0.525 | 7.595 |
| 749 | −0.517 | −0.434 | 7.595 | 0.868 | 0.490 | 7.595 |
| 750 | −0.437 | −0.377 | 7.595 | 0.775 | 0.452 | 7.595 |
| 751 | −0.353 | −0.319 | 7.595 | 0.679 | 0.413 | 7.595 |
| 752 | −0.265 | −0.261 | 7.595 | 0.580 | 0.371 | 7.595 |
| 753 | −0.177 | −0.204 | 7.595 | 0.481 | 0.328 | 7.595 |
| 754 | −0.087 | −0.148 | 7.595 | 0.384 | 0.283 | 7.595 |
| 755 | 0.003 | −0.094 | 7.595 | 0.287 | 0.237 | 7.595 |
| 756 | 0.094 | −0.041 | 7.595 | 0.190 | 0.189 | 7.595 |
| 757 | 0.186 | 0.011 | 7.595 | 0.095 | 0.140 | 7.595 |
| 758 | 0.279 | 0.063 | 7.595 | 0.001 | 0.088 | 7.595 |
| 759 | 0.371 | 0.113 | 7.595 | −0.092 | 0.034 | 7.595 |
| 760 | 0.465 | 0.162 | 7.595 | −0.184 | −0.022 | 7.595 |
| 761 | 0.558 | 0.211 | 7.595 | −0.274 | −0.081 | 7.595 |
| 762 | 0.652 | 0.258 | 7.595 | −0.362 | −0.142 | 7.595 |
| 763 | 0.747 | 0.305 | 7.595 | −0.449 | −0.206 | 7.595 |
| 764 | 0.838 | 0.350 | 7.595 | −0.531 | −0.270 | 7.595 |
| 765 | 0.927 | 0.393 | 7.595 | −0.608 | −0.334 | 7.595 |
| 766 | 1.013 | 0.434 | 7.595 | −0.681 | −0.397 | 7.595 |
| 767 | 1.095 | 0.473 | 7.595 | −0.749 | −0.461 | 7.595 |
| 768 | 1.175 | 0.511 | 7.595 | −0.813 | −0.523 | 7.595 |
| 769 | 1.251 | 0.546 | 7.595 | −0.873 | −0.585 | 7.595 |
| 770 | 1.325 | 0.580 | 7.595 | −0.929 | −0.646 | 7.595 |
| 771 | 1.395 | 0.613 | 7.595 | −0.980 | −0.706 | 7.595 |
| 772 | 1.456 | 0.640 | 7.595 | −1.026 | −0.761 | 7.595 |
| 773 | 1.510 | 0.665 | 7.595 | −1.066 | −0.812 | 7.595 |
| 774 | 1.561 | 0.689 | 7.595 | −1.100 | −0.857 | 7.595 |
| 775 | 1.609 | 0.711 | 7.595 | −1.132 | −0.901 | 7.595 |
| 776 | 1.651 | 0.729 | 7.595 | −1.159 | −0.939 | 7.595 |
| 777 | 1.683 | 0.744 | 7.595 | −1.179 | −0.968 | 7.595 |
| 778 | 1.709 | 0.756 | 7.595 | −1.196 | −0.992 | 7.595 |
| 779 | 1.728 | 0.764 | 7.595 | −1.206 | −1.011 | 7.595 |
| 780 | 1.742 | 0.772 | 7.595 | −1.209 | −1.026 | 7.595 |
| 781 | 1.748 | 0.782 | 7.595 | −1.207 | −1.035 | 7.595 |
| 782 | 1.748 | 0.789 | 7.595 | −1.204 | −1.040 | 7.595 |
| 783 | 1.748 | 0.794 | 7.595 | −1.202 | −1.042 | 7.595 |
| 784 | 1.747 | 0.795 | 7.595 | −1.201 | −1.043 | 7.595 |

In exemplary embodiments, TABLE III below contains Cartesian coordinate data of an airfoil shape 150 of an airfoil 100 of another stator vane 50, which is disposed in the mid stage 62 of the compressor section 14. Specifically, TABLE III below contains Cartesian coordinate data of an airfoil shape 150 of an airfoil 100 of a stator vane 50, which is disposed in the seventh stage S7 of the compressor section 14.

TABLE III

| | Pressure Side Surface | | | Suction Side Surface | | |
|---|---|---|---|---|---|---|
| N | X | Y | Z | X | Y | Z |
| 1 | −1.391 | −1.055 | 0.063 | 2.097 | 0.986 | 0.063 |
| 2 | −1.391 | −1.056 | 0.063 | 2.096 | 0.988 | 0.063 |
| 3 | −1.389 | −1.057 | 0.063 | 2.095 | 0.989 | 0.063 |
| 4 | −1.387 | −1.059 | 0.063 | 2.093 | 0.994 | 0.063 |
| 5 | −1.381 | −1.061 | 0.063 | 2.087 | 1.000 | 0.063 |
| 6 | −1.371 | −1.064 | 0.063 | 2.075 | 1.008 | 0.063 |
| 7 | −1.353 | −1.065 | 0.063 | 2.056 | 1.011 | 0.063 |
| 8 | −1.329 | −1.059 | 0.063 | 2.031 | 1.004 | 0.063 |
| 9 | −1.300 | −1.045 | 0.063 | 1.999 | 0.994 | 0.063 |
| 10 | −1.266 | −1.022 | 0.063 | 1.958 | 0.981 | 0.063 |
| 11 | −1.223 | −0.991 | 0.063 | 1.905 | 0.964 | 0.063 |
| 12 | −1.174 | −0.955 | 0.063 | 1.845 | 0.944 | 0.063 |
| 13 | −1.121 | −0.917 | 0.063 | 1.780 | 0.923 | 0.063 |
| 14 | −1.061 | −0.874 | 0.063 | 1.711 | 0.901 | 0.063 |
| 15 | −0.994 | −0.827 | 0.063 | 1.634 | 0.876 | 0.063 |
| 16 | −0.921 | −0.775 | 0.063 | 1.545 | 0.847 | 0.063 |
| 17 | −0.844 | −0.722 | 0.063 | 1.451 | 0.817 | 0.063 |
| 18 | −0.764 | −0.666 | 0.063 | 1.354 | 0.785 | 0.063 |
| 19 | −0.680 | −0.608 | 0.063 | 1.253 | 0.752 | 0.063 |
| 20 | −0.592 | −0.548 | 0.063 | 1.147 | 0.718 | 0.063 |
| 21 | −0.500 | −0.488 | 0.063 | 1.038 | 0.683 | 0.063 |
| 22 | −0.404 | −0.426 | 0.063 | 0.924 | 0.646 | 0.063 |
| 23 | −0.304 | −0.364 | 0.063 | 0.807 | 0.608 | 0.063 |
| 24 | −0.199 | −0.301 | 0.063 | 0.686 | 0.568 | 0.063 |
| 25 | −0.093 | −0.240 | 0.063 | 0.565 | 0.526 | 0.063 |
| 26 | 0.014 | −0.180 | 0.063 | 0.444 | 0.484 | 0.063 |
| 27 | 0.121 | −0.120 | 0.063 | 0.324 | 0.439 | 0.063 |
| 28 | 0.228 | −0.062 | 0.063 | 0.205 | 0.393 | 0.063 |
| 29 | 0.335 | −0.003 | 0.063 | 0.087 | 0.344 | 0.063 |
| 30 | 0.443 | 0.056 | 0.063 | −0.030 | 0.292 | 0.063 |
| 31 | 0.550 | 0.115 | 0.063 | −0.146 | 0.238 | 0.063 |
| 32 | 0.656 | 0.175 | 0.063 | −0.260 | 0.181 | 0.063 |
| 33 | 0.763 | 0.235 | 0.063 | −0.372 | 0.120 | 0.063 |
| 34 | 0.870 | 0.295 | 0.063 | −0.483 | 0.055 | 0.063 |
| 35 | 0.976 | 0.354 | 0.063 | −0.590 | −0.014 | 0.063 |
| 36 | 1.080 | 0.412 | 0.063 | −0.691 | −0.085 | 0.063 |
| 37 | 1.179 | 0.468 | 0.063 | −0.786 | −0.158 | 0.063 |

TABLE III-continued

| | Pressure Side Surface | | | Suction Side Surface | | |
|---|---|---|---|---|---|---|
| N | X | Y | Z | X | Y | Z |
| 38 | 1.276 | 0.521 | 0.063 | −0.873 | −0.233 | 0.063 |
| 39 | 1.369 | 0.571 | 0.063 | −0.953 | −0.309 | 0.063 |
| 40 | 1.459 | 0.619 | 0.063 | −1.027 | −0.387 | 0.063 |
| 41 | 1.545 | 0.665 | 0.063 | −1.094 | −0.464 | 0.063 |
| 42 | 1.629 | 0.708 | 0.063 | −1.154 | −0.541 | 0.063 |
| 43 | 1.708 | 0.750 | 0.063 | −1.208 | −0.618 | 0.063 |
| 44 | 1.777 | 0.785 | 0.063 | −1.254 | −0.690 | 0.063 |
| 45 | 1.839 | 0.816 | 0.063 | −1.294 | −0.755 | 0.063 |
| 46 | 1.897 | 0.846 | 0.063 | −1.327 | −0.815 | 0.063 |
| 47 | 1.952 | 0.873 | 0.063 | −1.357 | −0.871 | 0.063 |
| 48 | 1.999 | 0.897 | 0.063 | −1.382 | −0.921 | 0.063 |
| 49 | 2.036 | 0.915 | 0.063 | −1.399 | −0.960 | 0.063 |
| 50 | 2.065 | 0.930 | 0.063 | −1.408 | −0.992 | 0.063 |
| 51 | 2.086 | 0.942 | 0.063 | −1.409 | −1.018 | 0.063 |
| 52 | 2.097 | 0.956 | 0.063 | −1.405 | −1.037 | 0.063 |
| 53 | 2.099 | 0.970 | 0.063 | −1.400 | −1.046 | 0.063 |
| 54 | 2.099 | 0.979 | 0.063 | −1.396 | −1.051 | 0.063 |
| 55 | 2.098 | 0.983 | 0.063 | −1.393 | −1.054 | 0.063 |
| 56 | 2.097 | 0.985 | 0.063 | −1.392 | −1.055 | 0.063 |
| 57 | −1.411 | −1.097 | 1.134 | 2.096 | 0.985 | 1.134 |
| 58 | −1.410 | −1.097 | 1.134 | 2.096 | 0.986 | 1.134 |
| 59 | −1.409 | −1.098 | 1.134 | 2.095 | 0.988 | 1.134 |
| 60 | −1.406 | −1.100 | 1.134 | 2.092 | 0.992 | 1.134 |
| 61 | −1.400 | −1.103 | 1.134 | 2.086 | 0.998 | 1.134 |
| 62 | −1.390 | −1.104 | 1.134 | 2.073 | 1.006 | 1.134 |
| 63 | −1.372 | −1.103 | 1.134 | 2.054 | 1.007 | 1.134 |
| 64 | −1.349 | −1.094 | 1.134 | 2.030 | 0.999 | 1.134 |
| 65 | −1.321 | −1.077 | 1.134 | 1.997 | 0.988 | 1.134 |
| 66 | −1.289 | −1.051 | 1.134 | 1.957 | 0.975 | 1.134 |
| 67 | −1.247 | −1.017 | 1.134 | 1.904 | 0.958 | 1.134 |
| 68 | −1.199 | −0.979 | 1.134 | 1.843 | 0.938 | 1.134 |
| 69 | −1.147 | −0.938 | 1.134 | 1.778 | 0.916 | 1.134 |
| 70 | −1.089 | −0.893 | 1.134 | 1.709 | 0.894 | 1.134 |
| 71 | −1.023 | −0.843 | 1.134 | 1.632 | 0.868 | 1.134 |
| 72 | −0.951 | −0.789 | 1.134 | 1.543 | 0.838 | 1.134 |
| 73 | −0.875 | −0.733 | 1.134 | 1.450 | 0.807 | 1.134 |
| 74 | −0.795 | −0.674 | 1.134 | 1.353 | 0.774 | 1.134 |
| 75 | −0.711 | −0.615 | 1.134 | 1.251 | 0.740 | 1.134 |
| 76 | −0.623 | −0.554 | 1.134 | 1.146 | 0.705 | 1.134 |
| 77 | −0.531 | −0.492 | 1.134 | 1.037 | 0.668 | 1.134 |
| 78 | −0.435 | −0.429 | 1.134 | 0.923 | 0.629 | 1.134 |
| 79 | −0.334 | −0.365 | 1.134 | 0.806 | 0.588 | 1.134 |
| 80 | −0.228 | −0.301 | 1.134 | 0.685 | 0.545 | 1.134 |
| 81 | −0.122 | −0.239 | 1.134 | 0.565 | 0.501 | 1.134 |
| 82 | −0.015 | −0.177 | 1.134 | 0.445 | 0.456 | 1.134 |
| 83 | 0.093 | −0.117 | 1.134 | 0.326 | 0.409 | 1.134 |
| 84 | 0.201 | −0.057 | 1.134 | 0.207 | 0.361 | 1.134 |
| 85 | 0.309 | 0.002 | 1.134 | 0.090 | 0.309 | 1.134 |
| 86 | 0.417 | 0.062 | 1.134 | −0.027 | 0.256 | 1.134 |
| 87 | 0.525 | 0.121 | 1.134 | −0.142 | 0.200 | 1.134 |
| 88 | 0.633 | 0.181 | 1.134 | −0.256 | 0.140 | 1.134 |
| 89 | 0.742 | 0.240 | 1.134 | −0.368 | 0.077 | 1.134 |
| 90 | 0.850 | 0.299 | 1.134 | −0.477 | 0.011 | 1.134 |
| 91 | 0.958 | 0.359 | 1.134 | −0.584 | −0.060 | 1.134 |
| 92 | 1.063 | 0.416 | 1.134 | −0.685 | −0.132 | 1.134 |
| 93 | 1.164 | 0.470 | 1.134 | −0.778 | −0.207 | 1.134 |
| 94 | 1.262 | 0.523 | 1.134 | −0.865 | −0.283 | 1.134 |
| 95 | 1.357 | 0.573 | 1.134 | −0.946 | −0.359 | 1.134 |
| 96 | 1.448 | 0.620 | 1.134 | −1.020 | −0.436 | 1.134 |
| 97 | 1.535 | 0.666 | 1.134 | −1.087 | −0.514 | 1.134 |
| 98 | 1.620 | 0.709 | 1.134 | −1.149 | −0.590 | 1.134 |
| 99 | 1.700 | 0.750 | 1.134 | −1.204 | −0.666 | 1.134 |
| 100 | 1.770 | 0.785 | 1.134 | −1.253 | −0.737 | 1.134 |
| 101 | 1.833 | 0.816 | 1.134 | −1.294 | −0.801 | 1.134 |
| 102 | 1.891 | 0.846 | 1.134 | −1.330 | −0.860 | 1.134 |
| 103 | 1.947 | 0.873 | 1.134 | −1.362 | −0.915 | 1.134 |
| 104 | 1.995 | 0.897 | 1.134 | −1.389 | −0.964 | 1.134 |
| 105 | 2.032 | 0.915 | 1.134 | −1.409 | −1.001 | 1.134 |
| 106 | 2.061 | 0.929 | 1.134 | −1.422 | −1.033 | 1.134 |
| 107 | 2.083 | 0.941 | 1.134 | −1.426 | −1.058 | 1.134 |
| 108 | 2.095 | 0.955 | 1.134 | −1.424 | −1.077 | 1.134 |
| 109 | 2.099 | 0.968 | 1.134 | −1.419 | −1.087 | 1.134 |
| 110 | 2.098 | 0.977 | 1.134 | −1.415 | −1.093 | 1.134 |
| 111 | 2.097 | 0.981 | 1.134 | −1.413 | −1.095 | 1.134 |
| 112 | 2.097 | 0.983 | 1.134 | −1.412 | −1.096 | 1.134 |
| 113 | −1.419 | −1.124 | 1.890 | 2.094 | 0.982 | 1.890 |

TABLE III-continued

| | Pressure Side Surface | | | Suction Side Surface | | |
|---|---|---|---|---|---|---|
| N | X | Y | Z | X | Y | Z |
| 114 | −1.418 | −1.125 | 1.890 | 2.094 | 0.983 | 1.890 |
| 115 | −1.417 | −1.126 | 1.890 | 2.093 | 0.985 | 1.890 |
| 116 | −1.414 | −1.127 | 1.890 | 2.090 | 0.989 | 1.890 |
| 117 | −1.408 | −1.130 | 1.890 | 2.084 | 0.995 | 1.890 |
| 118 | −1.398 | −1.131 | 1.890 | 2.071 | 1.002 | 1.890 |
| 119 | −1.379 | −1.129 | 1.890 | 2.052 | 1.002 | 1.890 |
| 120 | −1.357 | −1.119 | 1.890 | 2.028 | 0.994 | 1.890 |
| 121 | −1.330 | −1.099 | 1.890 | 1.995 | 0.983 | 1.890 |
| 122 | −1.299 | −1.072 | 1.890 | 1.955 | 0.970 | 1.890 |
| 123 | −1.258 | −1.037 | 1.890 | 1.902 | 0.952 | 1.890 |
| 124 | −1.211 | −0.997 | 1.890 | 1.841 | 0.932 | 1.890 |
| 125 | −1.160 | −0.955 | 1.890 | 1.776 | 0.910 | 1.890 |
| 126 | −1.102 | −0.908 | 1.890 | 1.707 | 0.887 | 1.890 |
| 127 | −1.037 | −0.857 | 1.890 | 1.630 | 0.861 | 1.890 |
| 128 | −0.966 | −0.801 | 1.890 | 1.541 | 0.831 | 1.890 |
| 129 | −0.890 | −0.743 | 1.890 | 1.448 | 0.799 | 1.890 |
| 130 | −0.810 | −0.684 | 1.890 | 1.351 | 0.766 | 1.890 |
| 131 | −0.727 | −0.624 | 1.890 | 1.250 | 0.731 | 1.890 |
| 132 | −0.639 | −0.562 | 1.890 | 1.144 | 0.695 | 1.890 |
| 133 | −0.547 | −0.499 | 1.890 | 1.035 | 0.656 | 1.890 |
| 134 | −0.450 | −0.436 | 1.890 | 0.922 | 0.617 | 1.890 |
| 135 | −0.348 | −0.372 | 1.890 | 0.806 | 0.575 | 1.890 |
| 136 | −0.243 | −0.307 | 1.890 | 0.685 | 0.531 | 1.890 |
| 137 | −0.136 | −0.244 | 1.890 | 0.565 | 0.485 | 1.890 |
| 138 | −0.029 | −0.182 | 1.890 | 0.445 | 0.439 | 1.890 |
| 139 | 0.079 | −0.121 | 1.890 | 0.327 | 0.390 | 1.890 |
| 140 | 0.187 | −0.061 | 1.890 | 0.209 | 0.340 | 1.890 |
| 141 | 0.296 | 0.000 | 1.890 | 0.091 | 0.287 | 1.890 |
| 142 | 0.404 | 0.059 | 1.890 | −0.025 | 0.232 | 1.890 |
| 143 | 0.513 | 0.119 | 1.890 | −0.139 | 0.174 | 1.890 |
| 144 | 0.621 | 0.179 | 1.890 | −0.252 | 0.114 | 1.890 |
| 145 | 0.730 | 0.239 | 1.890 | −0.363 | 0.049 | 1.890 |
| 146 | 0.839 | 0.298 | 1.890 | −0.472 | −0.019 | 1.890 |
| 147 | 0.948 | 0.357 | 1.890 | −0.578 | −0.091 | 1.890 |
| 148 | 1.053 | 0.414 | 1.890 | −0.678 | −0.164 | 1.890 |
| 149 | 1.155 | 0.469 | 1.890 | −0.771 | −0.240 | 1.890 |
| 150 | 1.254 | 0.521 | 1.890 | −0.858 | −0.316 | 1.890 |
| 151 | 1.349 | 0.571 | 1.890 | −0.938 | −0.393 | 1.890 |
| 152 | 1.440 | 0.619 | 1.890 | −1.012 | −0.470 | 1.890 |
| 153 | 1.529 | 0.664 | 1.890 | −1.080 | −0.548 | 1.890 |
| 154 | 1.613 | 0.708 | 1.890 | −1.142 | −0.624 | 1.890 |
| 155 | 1.694 | 0.749 | 1.890 | −1.199 | −0.699 | 1.890 |
| 156 | 1.765 | 0.784 | 1.890 | −1.249 | −0.768 | 1.890 |
| 157 | 1.827 | 0.815 | 1.890 | −1.292 | −0.832 | 1.890 |
| 158 | 1.887 | 0.844 | 1.890 | −1.329 | −0.890 | 1.890 |
| 159 | 1.942 | 0.872 | 1.890 | −1.362 | −0.945 | 1.890 |
| 160 | 1.991 | 0.895 | 1.890 | −1.391 | −0.992 | 1.890 |
| 161 | 2.028 | 0.913 | 1.890 | −1.412 | −1.029 | 1.890 |
| 162 | 2.057 | 0.928 | 1.890 | −1.426 | −1.060 | 1.890 |
| 163 | 2.080 | 0.939 | 1.890 | −1.432 | −1.085 | 1.890 |
| 164 | 2.093 | 0.952 | 1.890 | −1.431 | −1.105 | 1.890 |
| 165 | 2.097 | 0.965 | 1.890 | −1.427 | −1.115 | 1.890 |
| 166 | 2.097 | 0.974 | 1.890 | −1.423 | −1.120 | 1.890 |
| 167 | 2.095 | 0.979 | 1.890 | −1.421 | −1.123 | 1.890 |
| 168 | 2.095 | 0.981 | 1.890 | −1.420 | −1.124 | 1.890 |
| 169 | −1.423 | −1.149 | 2.613 | 2.091 | 0.978 | 2.613 |
| 170 | −1.423 | −1.149 | 2.613 | 2.091 | 0.979 | 2.613 |
| 171 | −1.421 | −1.150 | 2.613 | 2.090 | 0.981 | 2.613 |
| 172 | −1.418 | −1.152 | 2.613 | 2.087 | 0.985 | 2.613 |
| 173 | −1.412 | −1.154 | 2.613 | 2.081 | 0.991 | 2.613 |
| 174 | −1.402 | −1.155 | 2.613 | 2.068 | 0.998 | 2.613 |
| 175 | −1.384 | −1.152 | 2.613 | 2.049 | 0.997 | 2.613 |
| 176 | −1.362 | −1.140 | 2.613 | 2.024 | 0.989 | 2.613 |
| 177 | −1.336 | −1.120 | 2.613 | 1.992 | 0.978 | 2.613 |
| 178 | −1.305 | −1.092 | 2.613 | 1.951 | 0.965 | 2.613 |
| 179 | −1.265 | −1.056 | 2.613 | 1.899 | 0.947 | 2.613 |
| 180 | −1.218 | −1.015 | 2.613 | 1.838 | 0.926 | 2.613 |
| 181 | −1.168 | −0.971 | 2.613 | 1.773 | 0.905 | 2.613 |
| 182 | −1.111 | −0.923 | 2.613 | 1.704 | 0.881 | 2.613 |
| 183 | −1.047 | −0.871 | 2.613 | 1.627 | 0.855 | 2.613 |
| 184 | −0.976 | −0.813 | 2.613 | 1.538 | 0.824 | 2.613 |
| 185 | −0.901 | −0.755 | 2.613 | 1.445 | 0.792 | 2.613 |
| 186 | −0.821 | −0.695 | 2.613 | 1.348 | 0.758 | 2.613 |
| 187 | −0.738 | −0.634 | 2.613 | 1.247 | 0.723 | 2.613 |
| 188 | −0.650 | −0.572 | 2.613 | 1.142 | 0.686 | 2.613 |
| 189 | −0.557 | −0.509 | 2.613 | 1.033 | 0.647 | 2.613 |

TABLE III-continued

| | Pressure Side Surface | | | Suction Side Surface | | |
|---|---|---|---|---|---|---|
| N | X | Y | Z | X | Y | Z |
| 190 | −0.460 | −0.445 | 2.613 | 0.921 | 0.607 | 2.613 |
| 191 | −0.359 | −0.380 | 2.613 | 0.804 | 0.564 | 2.613 |
| 192 | −0.253 | −0.316 | 2.613 | 0.684 | 0.519 | 2.613 |
| 193 | −0.146 | −0.252 | 2.613 | 0.564 | 0.472 | 2.613 |
| 194 | −0.039 | −0.190 | 2.613 | 0.445 | 0.424 | 2.613 |
| 195 | 0.069 | −0.128 | 2.613 | 0.327 | 0.374 | 2.613 |
| 196 | 0.178 | −0.067 | 2.613 | 0.209 | 0.322 | 2.613 |
| 197 | 0.286 | −0.007 | 2.613 | 0.093 | 0.268 | 2.613 |
| 198 | 0.395 | 0.054 | 2.613 | −0.022 | 0.212 | 2.613 |
| 199 | 0.504 | 0.114 | 2.613 | −0.136 | 0.152 | 2.613 |
| 200 | 0.613 | 0.174 | 2.613 | −0.248 | 0.090 | 2.613 |
| 201 | 0.722 | 0.234 | 2.613 | −0.358 | 0.024 | 2.613 |
| 202 | 0.831 | 0.294 | 2.613 | −0.466 | −0.045 | 2.613 |
| 203 | 0.940 | 0.353 | 2.613 | −0.572 | −0.119 | 2.613 |
| 204 | 1.046 | 0.410 | 2.613 | −0.671 | −0.194 | 2.613 |
| 205 | 1.148 | 0.465 | 2.613 | −0.763 | −0.270 | 2.613 |
| 206 | 1.247 | 0.518 | 2.613 | −0.849 | −0.347 | 2.613 |
| 207 | 1.342 | 0.568 | 2.613 | −0.929 | −0.424 | 2.613 |
| 208 | 1.434 | 0.616 | 2.613 | −1.003 | −0.501 | 2.613 |
| 209 | 1.522 | 0.661 | 2.613 | −1.071 | −0.578 | 2.613 |
| 210 | 1.607 | 0.705 | 2.613 | −1.134 | −0.654 | 2.613 |
| 211 | 1.689 | 0.746 | 2.613 | −1.192 | −0.728 | 2.613 |
| 212 | 1.759 | 0.781 | 2.613 | −1.243 | −0.797 | 2.613 |
| 213 | 1.822 | 0.812 | 2.613 | −1.287 | −0.860 | 2.613 |
| 214 | 1.882 | 0.841 | 2.613 | −1.325 | −0.917 | 2.613 |
| 215 | 1.938 | 0.869 | 2.613 | −1.360 | −0.971 | 2.613 |
| 216 | 1.986 | 0.892 | 2.613 | −1.390 | −1.018 | 2.613 |
| 217 | 2.023 | 0.910 | 2.613 | −1.412 | −1.055 | 2.613 |
| 218 | 2.053 | 0.925 | 2.613 | −1.428 | −1.085 | 2.613 |
| 219 | 2.076 | 0.935 | 2.613 | −1.435 | −1.109 | 2.613 |
| 220 | 2.089 | 0.948 | 2.613 | −1.435 | −1.129 | 2.613 |
| 221 | 2.094 | 0.962 | 2.613 | −1.431 | −1.139 | 2.613 |
| 222 | 2.093 | 0.970 | 2.613 | −1.428 | −1.144 | 2.613 |
| 223 | 2.092 | 0.975 | 2.613 | −1.425 | −1.147 | 2.613 |
| 224 | 2.092 | 0.977 | 2.613 | −1.424 | −1.148 | 2.613 |
| 225 | −1.423 | −1.185 | 3.729 | 2.083 | 0.969 | 3.729 |
| 226 | −1.422 | −1.185 | 3.729 | 2.083 | 0.970 | 3.729 |
| 227 | −1.420 | −1.186 | 3.729 | 2.082 | 0.972 | 3.729 |
| 228 | −1.418 | −1.188 | 3.729 | 2.079 | 0.976 | 3.729 |
| 229 | −1.411 | −1.190 | 3.729 | 2.073 | 0.982 | 3.729 |
| 230 | −1.401 | −1.190 | 3.729 | 2.059 | 0.988 | 3.729 |
| 231 | −1.383 | −1.185 | 3.729 | 2.041 | 0.986 | 3.729 |
| 232 | −1.362 | −1.172 | 3.729 | 2.016 | 0.978 | 3.729 |
| 233 | −1.337 | −1.150 | 3.729 | 1.984 | 0.967 | 3.729 |
| 234 | −1.307 | −1.121 | 3.729 | 1.943 | 0.953 | 3.729 |
| 235 | −1.268 | −1.084 | 3.729 | 1.891 | 0.935 | 3.729 |
| 236 | −1.223 | −1.041 | 3.729 | 1.830 | 0.914 | 3.729 |
| 237 | −1.174 | −0.997 | 3.729 | 1.766 | 0.892 | 3.729 |
| 238 | −1.118 | −0.947 | 3.729 | 1.697 | 0.868 | 3.729 |
| 239 | −1.055 | −0.893 | 3.729 | 1.620 | 0.842 | 3.729 |
| 240 | −0.985 | −0.834 | 3.729 | 1.532 | 0.811 | 3.729 |
| 241 | −0.910 | −0.774 | 3.729 | 1.439 | 0.778 | 3.729 |
| 242 | −0.832 | −0.713 | 3.729 | 1.342 | 0.744 | 3.729 |
| 243 | −0.748 | −0.651 | 3.729 | 1.242 | 0.708 | 3.729 |
| 244 | −0.661 | −0.588 | 3.729 | 1.138 | 0.670 | 3.729 |
| 245 | −0.569 | −0.525 | 3.729 | 1.029 | 0.630 | 3.729 |
| 246 | −0.472 | −0.460 | 3.729 | 0.917 | 0.588 | 3.729 |
| 247 | −0.370 | −0.395 | 3.729 | 0.802 | 0.544 | 3.729 |
| 248 | −0.265 | −0.329 | 3.729 | 0.682 | 0.497 | 3.729 |
| 249 | −0.158 | −0.265 | 3.729 | 0.563 | 0.449 | 3.729 |
| 250 | −0.051 | −0.202 | 3.729 | 0.445 | 0.399 | 3.729 |
| 251 | 0.057 | −0.140 | 3.729 | 0.328 | 0.348 | 3.729 |
| 252 | 0.166 | −0.078 | 3.729 | 0.212 | 0.294 | 3.729 |
| 253 | 0.274 | −0.017 | 3.729 | 0.097 | 0.238 | 3.729 |
| 254 | 0.383 | 0.044 | 3.729 | −0.017 | 0.179 | 3.729 |
| 255 | 0.492 | 0.104 | 3.729 | −0.130 | 0.117 | 3.729 |
| 256 | 0.600 | 0.165 | 3.729 | −0.240 | 0.053 | 3.729 |
| 257 | 0.709 | 0.226 | 3.729 | −0.349 | −0.015 | 3.729 |
| 258 | 0.818 | 0.286 | 3.729 | −0.456 | −0.086 | 3.729 |
| 259 | 0.928 | 0.346 | 3.729 | −0.560 | −0.161 | 3.729 |
| 260 | 1.033 | 0.403 | 3.729 | −0.657 | −0.237 | 3.729 |
| 261 | 1.136 | 0.458 | 3.729 | −0.749 | −0.314 | 3.729 |
| 262 | 1.235 | 0.511 | 3.729 | −0.834 | −0.392 | 3.729 |
| 263 | 1.330 | 0.561 | 3.729 | −0.914 | −0.469 | 3.729 |
| 264 | 1.422 | 0.609 | 3.729 | −0.987 | −0.547 | 3.729 |
| 265 | 1.511 | 0.655 | 3.729 | −1.055 | −0.623 | 3.729 |

TABLE III-continued

| | Pressure Side Surface | | | Suction Side Surface | | |
|---|---|---|---|---|---|---|
| N | X | Y | Z | X | Y | Z |
| 266 | 1.596 | 0.698 | 3.729 | −1.119 | −0.698 | 3.729 |
| 267 | 1.678 | 0.739 | 3.729 | −1.178 | −0.772 | 3.729 |
| 268 | 1.748 | 0.774 | 3.729 | −1.229 | −0.839 | 3.729 |
| 269 | 1.812 | 0.805 | 3.729 | −1.275 | −0.901 | 3.729 |
| 270 | 1.871 | 0.834 | 3.729 | −1.315 | −0.957 | 3.729 |
| 271 | 1.927 | 0.861 | 3.729 | −1.351 | −1.010 | 3.729 |
| 272 | 1.976 | 0.885 | 3.729 | −1.382 | −1.056 | 3.729 |
| 273 | 2.013 | 0.903 | 3.729 | −1.405 | −1.092 | 3.729 |
| 274 | 2.043 | 0.917 | 3.729 | −1.423 | −1.121 | 3.729 |
| 275 | 2.066 | 0.928 | 3.729 | −1.432 | −1.145 | 3.729 |
| 276 | 2.080 | 0.939 | 3.729 | −1.433 | −1.164 | 3.729 |
| 277 | 2.085 | 0.953 | 3.729 | −1.430 | −1.174 | 3.729 |
| 278 | 2.085 | 0.961 | 3.729 | −1.427 | −1.180 | 3.729 |
| 279 | 2.084 | 0.966 | 3.729 | −1.424 | −1.183 | 3.729 |
| 280 | 2.084 | 0.968 | 3.729 | −1.423 | −1.184 | 3.729 |
| 281 | −1.418 | −1.207 | 4.495 | 2.076 | 0.961 | 4.495 |
| 282 | −1.417 | −1.207 | 4.495 | 2.075 | 0.962 | 4.495 |
| 283 | −1.416 | −1.208 | 4.495 | 2.074 | 0.964 | 4.495 |
| 284 | −1.413 | −1.210 | 4.495 | 2.071 | 0.968 | 4.495 |
| 285 | −1.407 | −1.212 | 4.495 | 2.065 | 0.974 | 4.495 |
| 286 | −1.396 | −1.212 | 4.495 | 2.052 | 0.980 | 4.495 |
| 287 | −1.379 | −1.206 | 4.495 | 2.033 | 0.977 | 4.495 |
| 288 | −1.358 | −1.192 | 4.495 | 2.009 | 0.968 | 4.495 |
| 289 | −1.334 | −1.169 | 4.495 | 1.976 | 0.958 | 4.495 |
| 290 | −1.305 | −1.140 | 4.495 | 1.936 | 0.944 | 4.495 |
| 291 | −1.267 | −1.102 | 4.495 | 1.884 | 0.926 | 4.495 |
| 292 | −1.222 | −1.059 | 4.495 | 1.823 | 0.905 | 4.495 |
| 293 | −1.173 | −1.013 | 4.495 | 1.759 | 0.882 | 4.495 |
| 294 | −1.118 | −0.963 | 4.495 | 1.691 | 0.858 | 4.495 |
| 295 | −1.056 | −0.907 | 4.495 | 1.614 | 0.831 | 4.495 |
| 296 | −0.987 | −0.848 | 4.495 | 1.526 | 0.800 | 4.495 |
| 297 | −0.914 | −0.787 | 4.495 | 1.434 | 0.767 | 4.495 |
| 298 | −0.835 | −0.726 | 4.495 | 1.338 | 0.732 | 4.495 |
| 299 | −0.753 | −0.663 | 4.495 | 1.238 | 0.695 | 4.495 |
| 300 | −0.666 | −0.599 | 4.495 | 1.134 | 0.657 | 4.495 |
| 301 | −0.574 | −0.535 | 4.495 | 1.026 | 0.617 | 4.495 |
| 302 | −0.477 | −0.470 | 4.495 | 0.915 | 0.574 | 4.495 |
| 303 | −0.377 | −0.404 | 4.495 | 0.799 | 0.529 | 4.495 |
| 304 | −0.271 | −0.338 | 4.495 | 0.681 | 0.481 | 4.495 |
| 305 | −0.165 | −0.274 | 4.495 | 0.563 | 0.432 | 4.495 |
| 306 | −0.058 | −0.210 | 4.495 | 0.446 | 0.381 | 4.495 |
| 307 | 0.050 | −0.147 | 4.495 | 0.329 | 0.329 | 4.495 |
| 308 | 0.158 | −0.085 | 4.495 | 0.214 | 0.274 | 4.495 |
| 309 | 0.266 | −0.024 | 4.495 | 0.100 | 0.216 | 4.495 |
| 310 | 0.375 | 0.037 | 4.495 | −0.013 | 0.156 | 4.495 |
| 311 | 0.483 | 0.098 | 4.495 | −0.125 | 0.094 | 4.495 |
| 312 | 0.592 | 0.159 | 4.495 | −0.234 | 0.028 | 4.495 |
| 313 | 0.701 | 0.220 | 4.495 | −0.342 | −0.041 | 4.495 |
| 314 | 0.810 | 0.280 | 4.495 | −0.448 | −0.113 | 4.495 |
| 315 | 0.919 | 0.340 | 4.495 | −0.550 | −0.189 | 4.495 |
| 316 | 1.024 | 0.397 | 4.495 | −0.647 | −0.265 | 4.495 |
| 317 | 1.127 | 0.452 | 4.495 | −0.738 | −0.343 | 4.495 |
| 318 | 1.226 | 0.505 | 4.495 | −0.823 | −0.421 | 4.495 |
| 319 | 1.321 | 0.555 | 4.495 | −0.902 | −0.498 | 4.495 |
| 320 | 1.413 | 0.603 | 4.495 | −0.975 | −0.576 | 4.495 |
| 321 | 1.502 | 0.649 | 4.495 | −1.043 | −0.652 | 4.495 |
| 322 | 1.587 | 0.692 | 4.495 | −1.107 | −0.726 | 4.495 |
| 323 | 1.669 | 0.733 | 4.495 | −1.166 | −0.799 | 4.495 |
| 324 | 1.739 | 0.767 | 4.495 | −1.219 | −0.866 | 4.495 |
| 325 | 1.803 | 0.798 | 4.495 | −1.265 | −0.927 | 4.495 |
| 326 | 1.862 | 0.827 | 4.495 | −1.305 | −0.982 | 4.495 |
| 327 | 1.919 | 0.854 | 4.495 | −1.342 | −1.034 | 4.495 |
| 328 | 1.967 | 0.878 | 4.495 | −1.374 | −1.080 | 4.495 |
| 329 | 2.005 | 0.896 | 4.495 | −1.397 | −1.115 | 4.495 |
| 330 | 2.035 | 0.910 | 4.495 | −1.416 | −1.144 | 4.495 |
| 331 | 2.057 | 0.920 | 4.495 | −1.426 | −1.167 | 4.495 |
| 332 | 2.072 | 0.931 | 4.495 | −1.428 | −1.186 | 4.495 |
| 333 | 2.078 | 0.945 | 4.495 | −1.425 | −1.197 | 4.495 |
| 334 | 2.078 | 0.953 | 4.495 | −1.422 | −1.203 | 4.495 |
| 335 | 2.077 | 0.958 | 4.495 | −1.420 | −1.205 | 4.495 |
| 336 | 2.076 | 0.960 | 4.495 | −1.419 | −1.206 | 4.495 |
| 337 | −1.410 | −1.230 | 5.336 | 2.065 | 0.949 | 5.336 |
| 338 | −1.409 | −1.230 | 5.336 | 2.065 | 0.951 | 5.336 |
| 339 | −1.408 | −1.231 | 5.336 | 2.064 | 0.952 | 5.336 |
| 340 | −1.405 | −1.233 | 5.336 | 2.061 | 0.957 | 5.336 |
| 341 | −1.398 | −1.234 | 5.336 | 2.055 | 0.962 | 5.336 |

TABLE III-continued

| | Pressure Side Surface | | | Suction Side Surface | | |
|---|---|---|---|---|---|---|
| N | X | Y | Z | X | Y | Z |
| 342 | −1.388 | −1.234 | 5.336 | 2.041 | 0.967 | 5.336 |
| 343 | −1.371 | −1.228 | 5.336 | 2.022 | 0.964 | 5.336 |
| 344 | −1.351 | −1.213 | 5.336 | 1.998 | 0.955 | 5.336 |
| 345 | −1.327 | −1.190 | 5.336 | 1.966 | 0.944 | 5.336 |
| 346 | −1.299 | −1.160 | 5.336 | 1.926 | 0.930 | 5.336 |
| 347 | −1.261 | −1.121 | 5.336 | 1.874 | 0.912 | 5.336 |
| 348 | −1.218 | −1.077 | 5.336 | 1.814 | 0.891 | 5.336 |
| 349 | −1.170 | −1.031 | 5.336 | 1.750 | 0.868 | 5.336 |
| 350 | −1.116 | −0.979 | 5.336 | 1.682 | 0.844 | 5.336 |
| 351 | −1.055 | −0.923 | 5.336 | 1.606 | 0.817 | 5.336 |
| 352 | −0.987 | −0.863 | 5.336 | 1.519 | 0.785 | 5.336 |
| 353 | −0.914 | −0.801 | 5.336 | 1.427 | 0.751 | 5.336 |
| 354 | −0.838 | −0.738 | 5.336 | 1.331 | 0.716 | 5.336 |
| 355 | −0.756 | −0.674 | 5.336 | 1.232 | 0.679 | 5.336 |
| 356 | −0.670 | −0.610 | 5.336 | 1.129 | 0.640 | 5.336 |
| 357 | −0.578 | −0.546 | 5.336 | 1.022 | 0.599 | 5.336 |
| 358 | −0.482 | −0.480 | 5.336 | 0.911 | 0.556 | 5.336 |
| 359 | −0.382 | −0.414 | 5.336 | 0.797 | 0.510 | 5.336 |
| 360 | −0.277 | −0.347 | 5.336 | 0.680 | 0.462 | 5.336 |
| 361 | −0.171 | −0.282 | 5.336 | 0.563 | 0.411 | 5.336 |
| 362 | −0.065 | −0.218 | 5.336 | 0.446 | 0.360 | 5.336 |
| 363 | 0.042 | −0.155 | 5.336 | 0.331 | 0.306 | 5.336 |
| 364 | 0.150 | −0.093 | 5.336 | 0.217 | 0.250 | 5.336 |
| 365 | 0.257 | −0.031 | 5.336 | 0.104 | 0.191 | 5.336 |
| 366 | 0.365 | 0.030 | 5.336 | −0.008 | 0.130 | 5.336 |
| 367 | 0.474 | 0.091 | 5.336 | −0.118 | 0.067 | 5.336 |
| 368 | 0.582 | 0.152 | 5.336 | −0.227 | 0.000 | 5.336 |
| 369 | 0.691 | 0.213 | 5.336 | −0.333 | −0.070 | 5.336 |
| 370 | 0.799 | 0.273 | 5.336 | −0.437 | −0.143 | 5.336 |
| 371 | 0.908 | 0.333 | 5.336 | −0.539 | −0.219 | 5.336 |
| 372 | 1.014 | 0.390 | 5.336 | −0.635 | −0.296 | 5.336 |
| 373 | 1.116 | 0.445 | 5.336 | −0.724 | −0.374 | 5.336 |
| 374 | 1.215 | 0.498 | 5.336 | −0.808 | −0.453 | 5.336 |
| 375 | 1.310 | 0.547 | 5.336 | −0.886 | −0.530 | 5.336 |
| 376 | 1.402 | 0.595 | 5.336 | −0.960 | −0.607 | 5.336 |
| 377 | 1.491 | 0.640 | 5.336 | −1.028 | −0.682 | 5.336 |
| 378 | 1.576 | 0.683 | 5.336 | −1.092 | −0.756 | 5.336 |
| 379 | 1.657 | 0.724 | 5.336 | −1.152 | −0.828 | 5.336 |
| 380 | 1.728 | 0.758 | 5.336 | −1.205 | −0.894 | 5.336 |
| 381 | 1.791 | 0.789 | 5.336 | −1.252 | −0.954 | 5.336 |
| 382 | 1.851 | 0.818 | 5.336 | −1.292 | −1.009 | 5.336 |
| 383 | 1.907 | 0.844 | 5.336 | −1.330 | −1.060 | 5.336 |
| 384 | 1.956 | 0.868 | 5.336 | −1.363 | −1.104 | 5.336 |
| 385 | 1.993 | 0.885 | 5.336 | −1.387 | −1.139 | 5.336 |
| 386 | 2.023 | 0.899 | 5.336 | −1.406 | −1.167 | 5.336 |
| 387 | 2.046 | 0.910 | 5.336 | −1.416 | −1.190 | 5.336 |
| 388 | 2.061 | 0.920 | 5.336 | −1.419 | −1.209 | 5.336 |
| 389 | 2.067 | 0.933 | 5.336 | −1.417 | −1.219 | 5.336 |
| 390 | 2.067 | 0.941 | 5.336 | −1.414 | −1.225 | 5.336 |
| 391 | 2.066 | 0.946 | 5.336 | −1.412 | −1.228 | 5.336 |
| 392 | 2.066 | 0.948 | 5.336 | −1.410 | −1.229 | 5.336 |
| 393 | −1.396 | −1.247 | 6.218 | 2.052 | 0.940 | 6.218 |
| 394 | −1.395 | −1.248 | 6.218 | 2.051 | 0.941 | 6.218 |
| 395 | −1.394 | −1.249 | 6.218 | 2.050 | 0.943 | 6.218 |
| 396 | −1.391 | −1.250 | 6.218 | 2.047 | 0.947 | 6.218 |
| 397 | −1.385 | −1.252 | 6.218 | 2.041 | 0.953 | 6.218 |
| 398 | −1.374 | −1.251 | 6.218 | 2.027 | 0.958 | 6.218 |
| 399 | −1.357 | −1.245 | 6.218 | 2.009 | 0.954 | 6.218 |
| 400 | −1.338 | −1.230 | 6.218 | 1.985 | 0.946 | 6.218 |
| 401 | −1.315 | −1.206 | 6.218 | 1.953 | 0.935 | 6.218 |
| 402 | −1.287 | −1.175 | 6.218 | 1.913 | 0.921 | 6.218 |
| 403 | −1.250 | −1.136 | 6.218 | 1.862 | 0.903 | 6.218 |
| 404 | −1.207 | −1.092 | 6.218 | 1.802 | 0.881 | 6.218 |
| 405 | −1.161 | −1.044 | 6.218 | 1.739 | 0.859 | 6.218 |
| 406 | −1.109 | −0.992 | 6.218 | 1.671 | 0.834 | 6.218 |
| 407 | −1.049 | −0.935 | 6.218 | 1.596 | 0.807 | 6.218 |
| 408 | −0.982 | −0.873 | 6.218 | 1.508 | 0.775 | 6.218 |
| 409 | −0.911 | −0.810 | 6.218 | 1.417 | 0.742 | 6.218 |
| 410 | −0.836 | −0.746 | 6.218 | 1.323 | 0.706 | 6.218 |
| 411 | −0.756 | −0.681 | 6.218 | 1.224 | 0.669 | 6.218 |
| 412 | −0.671 | −0.616 | 6.218 | 1.121 | 0.630 | 6.218 |
| 413 | −0.581 | −0.550 | 6.218 | 1.015 | 0.589 | 6.218 |
| 414 | −0.486 | −0.483 | 6.218 | 0.905 | 0.545 | 6.218 |
| 415 | −0.387 | −0.417 | 6.218 | 0.792 | 0.499 | 6.218 |
| 416 | −0.283 | −0.350 | 6.218 | 0.676 | 0.450 | 6.218 |
| 417 | −0.177 | −0.285 | 6.218 | 0.560 | 0.399 | 6.218 |

TABLE III-continued

| | Pressure Side Surface | | | Suction Side Surface | | |
|---|---|---|---|---|---|---|
| N | X | Y | Z | X | Y | Z |
| 418 | −0.071 | −0.221 | 6.218 | 0.445 | 0.346 | 6.218 |
| 419 | 0.035 | −0.159 | 6.218 | 0.331 | 0.291 | 6.218 |
| 420 | 0.143 | −0.097 | 6.218 | 0.218 | 0.234 | 6.218 |
| 421 | 0.250 | −0.036 | 6.218 | 0.106 | 0.174 | 6.218 |
| 422 | 0.358 | 0.025 | 6.218 | −0.004 | 0.112 | 6.218 |
| 423 | 0.466 | 0.086 | 6.218 | −0.112 | 0.046 | 6.218 |
| 424 | 0.574 | 0.147 | 6.218 | −0.219 | −0.022 | 6.218 |
| 425 | 0.682 | 0.207 | 6.218 | −0.324 | −0.093 | 6.218 |
| 426 | 0.790 | 0.267 | 6.218 | −0.426 | −0.167 | 6.218 |
| 427 | 0.899 | 0.327 | 6.218 | −0.527 | −0.244 | 6.218 |
| 428 | 1.004 | 0.384 | 6.218 | −0.621 | −0.322 | 6.218 |
| 429 | 1.106 | 0.438 | 6.218 | −0.710 | −0.400 | 6.218 |
| 430 | 1.204 | 0.491 | 6.218 | −0.793 | −0.478 | 6.218 |
| 431 | 1.299 | 0.540 | 6.218 | −0.871 | −0.555 | 6.218 |
| 432 | 1.391 | 0.588 | 6.218 | −0.944 | −0.631 | 6.218 |
| 433 | 1.479 | 0.633 | 6.218 | −1.012 | −0.706 | 6.218 |
| 434 | 1.564 | 0.675 | 6.218 | −1.076 | −0.778 | 6.218 |
| 435 | 1.645 | 0.716 | 6.218 | −1.136 | −0.849 | 6.218 |
| 436 | 1.715 | 0.750 | 6.218 | −1.189 | −0.915 | 6.218 |
| 437 | 1.779 | 0.781 | 6.218 | −1.236 | −0.975 | 6.218 |
| 438 | 1.838 | 0.809 | 6.218 | −1.277 | −1.028 | 6.218 |
| 439 | 1.894 | 0.836 | 6.218 | −1.315 | −1.079 | 6.218 |
| 440 | 1.942 | 0.859 | 6.218 | −1.348 | −1.123 | 6.218 |
| 441 | 1.980 | 0.876 | 6.218 | −1.372 | −1.158 | 6.218 |
| 442 | 2.010 | 0.890 | 6.218 | −1.391 | −1.185 | 6.218 |
| 443 | 2.032 | 0.901 | 6.218 | −1.402 | −1.208 | 6.218 |
| 444 | 2.047 | 0.911 | 6.218 | −1.405 | −1.227 | 6.218 |
| 445 | 2.053 | 0.924 | 6.218 | −1.403 | −1.237 | 6.218 |
| 446 | 2.054 | 0.932 | 6.218 | −1.400 | −1.243 | 6.218 |
| 447 | 2.053 | 0.937 | 6.218 | −1.398 | −1.246 | 6.218 |
| 448 | 2.052 | 0.939 | 6.218 | −1.397 | −1.247 | 6.218 |
| 449 | −1.384 | −1.257 | 6.804 | 2.041 | 0.934 | 6.804 |
| 450 | −1.384 | −1.257 | 6.804 | 2.041 | 0.935 | 6.804 |
| 451 | −1.382 | −1.258 | 6.804 | 2.040 | 0.937 | 6.804 |
| 452 | −1.379 | −1.260 | 6.804 | 2.037 | 0.941 | 6.804 |
| 453 | −1.373 | −1.261 | 6.804 | 2.031 | 0.946 | 6.804 |
| 454 | −1.363 | −1.261 | 6.804 | 2.017 | 0.951 | 6.804 |
| 455 | −1.346 | −1.254 | 6.804 | 1.999 | 0.947 | 6.804 |
| 456 | −1.326 | −1.239 | 6.804 | 1.975 | 0.939 | 6.804 |
| 457 | −1.304 | −1.215 | 6.804 | 1.943 | 0.927 | 6.804 |
| 458 | −1.277 | −1.184 | 6.804 | 1.904 | 0.913 | 6.804 |
| 459 | −1.241 | −1.145 | 6.804 | 1.852 | 0.895 | 6.804 |
| 460 | −1.199 | −1.099 | 6.804 | 1.793 | 0.874 | 6.804 |
| 461 | −1.153 | −1.052 | 6.804 | 1.730 | 0.851 | 6.804 |
| 462 | −1.101 | −0.999 | 6.804 | 1.663 | 0.826 | 6.804 |
| 463 | −1.043 | −0.941 | 6.804 | 1.588 | 0.799 | 6.804 |
| 464 | −0.977 | −0.879 | 6.804 | 1.501 | 0.767 | 6.804 |
| 465 | −0.908 | −0.815 | 6.804 | 1.411 | 0.733 | 6.804 |
| 466 | −0.833 | −0.750 | 6.804 | 1.316 | 0.697 | 6.804 |
| 467 | −0.754 | −0.684 | 6.804 | 1.218 | 0.660 | 6.804 |
| 468 | −0.671 | −0.618 | 6.804 | 1.117 | 0.620 | 6.804 |
| 469 | −0.582 | −0.551 | 6.804 | 1.011 | 0.579 | 6.804 |
| 470 | −0.488 | −0.484 | 6.804 | 0.902 | 0.535 | 6.804 |
| 471 | −0.390 | −0.417 | 6.804 | 0.790 | 0.488 | 6.804 |
| 472 | −0.287 | −0.349 | 6.804 | 0.674 | 0.438 | 6.804 |
| 473 | −0.182 | −0.284 | 6.804 | 0.559 | 0.387 | 6.804 |
| 474 | −0.077 | −0.219 | 6.804 | 0.445 | 0.333 | 6.804 |
| 475 | 0.029 | −0.157 | 6.804 | 0.332 | 0.278 | 6.804 |
| 476 | 0.136 | −0.095 | 6.804 | 0.220 | 0.220 | 6.804 |
| 477 | 0.243 | −0.033 | 6.804 | 0.110 | 0.160 | 6.804 |
| 478 | 0.350 | 0.028 | 6.804 | 0.000 | 0.097 | 6.804 |
| 479 | 0.458 | 0.088 | 6.804 | −0.107 | 0.031 | 6.804 |
| 480 | 0.565 | 0.148 | 6.804 | −0.213 | −0.037 | 6.804 |
| 481 | 0.673 | 0.208 | 6.804 | −0.317 | −0.108 | 6.804 |
| 482 | 0.781 | 0.268 | 6.804 | −0.418 | −0.183 | 6.804 |
| 483 | 0.889 | 0.327 | 6.804 | −0.518 | −0.260 | 6.804 |
| 484 | 0.994 | 0.383 | 6.804 | −0.612 | −0.338 | 6.804 |
| 485 | 1.096 | 0.438 | 6.804 | −0.700 | −0.415 | 6.804 |
| 486 | 1.194 | 0.489 | 6.804 | −0.783 | −0.493 | 6.804 |
| 487 | 1.289 | 0.539 | 6.804 | −0.860 | −0.569 | 6.804 |
| 488 | 1.381 | 0.585 | 6.804 | −0.933 | −0.645 | 6.804 |
| 489 | 1.469 | 0.630 | 6.804 | −1.002 | −0.719 | 6.804 |
| 490 | 1.553 | 0.672 | 6.804 | −1.065 | −0.791 | 6.804 |
| 491 | 1.635 | 0.712 | 6.804 | −1.125 | −0.862 | 6.804 |
| 492 | 1.705 | 0.746 | 6.804 | −1.178 | −0.927 | 6.804 |
| 493 | 1.768 | 0.776 | 6.804 | −1.225 | −0.986 | 6.804 |

TABLE III-continued

| | Pressure Side Surface | | | Suction Side Surface | | |
|---|---|---|---|---|---|---|
| N | X | Y | Z | X | Y | Z |
| 494 | 1.827 | 0.804 | 6.804 | −1.266 | −1.039 | 6.804 |
| 495 | 1.883 | 0.831 | 6.804 | −1.304 | −1.089 | 6.804 |
| 496 | 1.931 | 0.853 | 6.804 | −1.336 | −1.133 | 6.804 |
| 497 | 1.969 | 0.871 | 6.804 | −1.361 | −1.168 | 6.804 |
| 498 | 1.999 | 0.884 | 6.804 | −1.380 | −1.195 | 6.804 |
| 499 | 2.021 | 0.895 | 6.804 | −1.391 | −1.218 | 6.804 |
| 500 | 2.036 | 0.905 | 6.804 | −1.394 | −1.236 | 6.804 |
| 501 | 2.043 | 0.917 | 6.804 | −1.392 | −1.247 | 6.804 |
| 502 | 2.043 | 0.926 | 6.804 | −1.388 | −1.253 | 6.804 |
| 503 | 2.042 | 0.930 | 6.804 | −1.386 | −1.255 | 6.804 |
| 504 | 2.042 | 0.932 | 6.804 | −1.385 | −1.256 | 6.804 |
| 505 | −1.367 | −1.264 | 7.560 | 2.026 | 0.927 | 7.560 |
| 506 | −1.366 | −1.265 | 7.560 | 2.025 | 0.929 | 7.560 |
| 507 | −1.364 | −1.265 | 7.560 | 2.024 | 0.930 | 7.560 |
| 508 | −1.362 | −1.267 | 7.560 | 2.022 | 0.935 | 7.560 |
| 509 | −1.355 | −1.268 | 7.560 | 2.015 | 0.940 | 7.560 |
| 510 | −1.345 | −1.268 | 7.560 | 2.001 | 0.944 | 7.560 |
| 511 | −1.328 | −1.261 | 7.560 | 1.983 | 0.939 | 7.560 |
| 512 | −1.309 | −1.246 | 7.560 | 1.960 | 0.931 | 7.560 |
| 513 | −1.287 | −1.222 | 7.560 | 1.928 | 0.920 | 7.560 |
| 514 | −1.260 | −1.191 | 7.560 | 1.889 | 0.906 | 7.560 |
| 515 | −1.225 | −1.151 | 7.560 | 1.838 | 0.887 | 7.560 |
| 516 | −1.184 | −1.105 | 7.560 | 1.780 | 0.866 | 7.560 |
| 517 | −1.140 | −1.057 | 7.560 | 1.717 | 0.843 | 7.560 |
| 518 | −1.089 | −1.004 | 7.560 | 1.651 | 0.818 | 7.560 |
| 519 | −1.032 | −0.945 | 7.560 | 1.576 | 0.790 | 7.560 |
| 520 | −0.968 | −0.882 | 7.560 | 1.491 | 0.758 | 7.560 |
| 521 | −0.900 | −0.817 | 7.560 | 1.401 | 0.724 | 7.560 |
| 522 | −0.828 | −0.751 | 7.560 | 1.308 | 0.688 | 7.560 |
| 523 | −0.751 | −0.684 | 7.560 | 1.211 | 0.650 | 7.560 |
| 524 | −0.669 | −0.616 | 7.560 | 1.110 | 0.610 | 7.560 |
| 525 | −0.582 | −0.548 | 7.560 | 1.006 | 0.567 | 7.560 |
| 526 | −0.490 | −0.480 | 7.560 | 0.898 | 0.523 | 7.560 |
| 527 | −0.393 | −0.412 | 7.560 | 0.787 | 0.475 | 7.560 |
| 528 | −0.291 | −0.343 | 7.560 | 0.673 | 0.425 | 7.560 |
| 529 | −0.188 | −0.277 | 7.560 | 0.559 | 0.373 | 7.560 |
| 530 | −0.084 | −0.212 | 7.560 | 0.446 | 0.319 | 7.560 |
| 531 | 0.021 | −0.149 | 7.560 | 0.335 | 0.263 | 7.560 |
| 532 | 0.127 | −0.086 | 7.560 | 0.224 | 0.205 | 7.560 |
| 533 | 0.233 | −0.025 | 7.560 | 0.115 | 0.144 | 7.560 |
| 534 | 0.339 | 0.036 | 7.560 | 0.007 | 0.081 | 7.560 |
| 535 | 0.446 | 0.096 | 7.560 | −0.099 | 0.015 | 7.560 |
| 536 | 0.553 | 0.156 | 7.560 | −0.204 | −0.053 | 7.560 |
| 537 | 0.660 | 0.215 | 7.560 | −0.307 | −0.125 | 7.560 |
| 538 | 0.768 | 0.274 | 7.560 | −0.407 | −0.199 | 7.560 |
| 539 | 0.876 | 0.332 | 7.560 | −0.506 | −0.276 | 7.560 |
| 540 | 0.981 | 0.388 | 7.560 | −0.599 | −0.353 | 7.560 |
| 541 | 1.082 | 0.441 | 7.560 | −0.686 | −0.430 | 7.560 |
| 542 | 1.180 | 0.492 | 7.560 | −0.768 | −0.507 | 7.560 |
| 543 | 1.275 | 0.540 | 7.560 | −0.846 | −0.583 | 7.560 |
| 544 | 1.366 | 0.586 | 7.560 | −0.918 | −0.658 | 7.560 |
| 545 | 1.454 | 0.630 | 7.560 | −0.986 | −0.731 | 7.560 |
| 546 | 1.538 | 0.671 | 7.560 | −1.050 | −0.803 | 7.560 |
| 547 | 1.619 | 0.710 | 7.560 | −1.109 | −0.873 | 7.560 |
| 548 | 1.690 | 0.743 | 7.560 | −1.162 | −0.937 | 7.560 |
| 549 | 1.752 | 0.773 | 7.560 | −1.209 | −0.996 | 7.560 |
| 550 | 1.812 | 0.801 | 7.560 | −1.250 | −1.048 | 7.560 |
| 551 | 1.867 | 0.827 | 7.560 | −1.287 | −1.098 | 7.560 |
| 552 | 1.915 | 0.849 | 7.560 | −1.320 | −1.142 | 7.560 |
| 553 | 1.953 | 0.866 | 7.560 | −1.344 | −1.175 | 7.560 |
| 554 | 1.982 | 0.880 | 7.560 | −1.363 | −1.203 | 7.560 |
| 555 | 2.005 | 0.890 | 7.560 | −1.374 | −1.225 | 7.560 |
| 556 | 2.020 | 0.899 | 7.560 | −1.376 | −1.244 | 7.560 |
| 557 | 2.027 | 0.911 | 7.560 | −1.374 | −1.254 | 7.560 |
| 558 | 2.028 | 0.920 | 7.560 | −1.371 | −1.260 | 7.560 |
| 559 | 2.027 | 0.924 | 7.560 | −1.368 | −1.262 | 7.560 |
| 560 | 2.026 | 0.926 | 7.560 | −1.367 | −1.264 | 7.560 |
| 561 | −1.357 | −1.266 | 7.938 | 2.018 | 0.925 | 7.938 |
| 562 | −1.356 | −1.267 | 7.938 | 2.017 | 0.926 | 7.938 |
| 563 | −1.355 | −1.267 | 7.938 | 2.016 | 0.928 | 7.938 |
| 564 | −1.352 | −1.269 | 7.938 | 2.013 | 0.932 | 7.938 |
| 565 | −1.345 | −1.270 | 7.938 | 2.007 | 0.938 | 7.938 |
| 566 | −1.335 | −1.270 | 7.938 | 1.993 | 0.942 | 7.938 |
| 567 | −1.318 | −1.263 | 7.938 | 1.975 | 0.937 | 7.938 |
| 568 | −1.299 | −1.248 | 7.938 | 1.952 | 0.928 | 7.938 |
| 569 | −1.277 | −1.224 | 7.938 | 1.921 | 0.917 | 7.938 |
| 570 | −1.251 | −1.193 | 7.938 | 1.882 | 0.903 | 7.938 |
| 571 | −1.216 | −1.153 | 7.938 | 1.831 | 0.884 | 7.938 |
| 572 | −1.176 | −1.107 | 7.938 | 1.773 | 0.863 | 7.938 |
| 573 | −1.132 | −1.059 | 7.938 | 1.710 | 0.840 | 7.938 |
| 574 | −1.082 | −1.005 | 7.938 | 1.644 | 0.815 | 7.938 |
| 575 | −1.026 | −0.946 | 7.938 | 1.571 | 0.787 | 7.938 |
| 576 | −0.963 | −0.882 | 7.938 | 1.485 | 0.755 | 7.938 |
| 577 | −0.896 | −0.817 | 7.938 | 1.396 | 0.720 | 7.938 |
| 578 | −0.824 | −0.750 | 7.938 | 1.303 | 0.684 | 7.938 |
| 579 | −0.748 | −0.683 | 7.938 | 1.207 | 0.646 | 7.938 |
| 580 | −0.667 | −0.614 | 7.938 | 1.107 | 0.606 | 7.938 |
| 581 | −0.581 | −0.546 | 7.938 | 1.003 | 0.563 | 7.938 |
| 582 | −0.490 | −0.477 | 7.938 | 0.896 | 0.518 | 7.938 |
| 583 | −0.394 | −0.408 | 7.938 | 0.786 | 0.471 | 7.938 |
| 584 | −0.293 | −0.339 | 7.938 | 0.672 | 0.420 | 7.938 |
| 585 | −0.191 | −0.272 | 7.938 | 0.559 | 0.367 | 7.938 |
| 586 | −0.088 | −0.207 | 7.938 | 0.447 | 0.313 | 7.938 |
| 587 | 0.017 | −0.143 | 7.938 | 0.336 | 0.257 | 7.938 |
| 588 | 0.122 | −0.081 | 7.938 | 0.226 | 0.198 | 7.938 |
| 589 | 0.228 | −0.019 | 7.938 | 0.117 | 0.138 | 7.938 |
| 590 | 0.334 | 0.041 | 7.938 | 0.010 | 0.074 | 7.938 |
| 591 | 0.440 | 0.101 | 7.938 | −0.096 | 0.008 | 7.938 |
| 592 | 0.547 | 0.161 | 7.938 | −0.200 | −0.060 | 7.938 |
| 593 | 0.654 | 0.220 | 7.938 | −0.302 | −0.131 | 7.938 |
| 594 | 0.762 | 0.278 | 7.938 | −0.402 | −0.205 | 7.938 |
| 595 | 0.869 | 0.336 | 7.938 | −0.500 | −0.282 | 7.938 |
| 596 | 0.974 | 0.391 | 7.938 | −0.592 | −0.359 | 7.938 |
| 597 | 1.075 | 0.444 | 7.938 | −0.679 | −0.436 | 7.938 |
| 598 | 1.173 | 0.494 | 7.938 | −0.761 | −0.512 | 7.938 |
| 599 | 1.268 | 0.542 | 7.938 | −0.838 | −0.588 | 7.938 |
| 600 | 1.359 | 0.587 | 7.938 | −0.911 | −0.662 | 7.938 |
| 601 | 1.447 | 0.630 | 7.938 | −0.978 | −0.735 | 7.938 |
| 602 | 1.531 | 0.671 | 7.938 | −1.042 | −0.807 | 7.938 |
| 603 | 1.612 | 0.710 | 7.938 | −1.101 | −0.876 | 7.938 |
| 604 | 1.682 | 0.743 | 7.938 | −1.154 | −0.940 | 7.938 |
| 605 | 1.744 | 0.772 | 7.938 | −1.200 | −0.999 | 7.938 |
| 606 | 1.804 | 0.800 | 7.938 | −1.241 | −1.051 | 7.938 |
| 607 | 1.859 | 0.825 | 7.938 | −1.279 | −1.101 | 7.938 |
| 608 | 1.907 | 0.848 | 7.938 | −1.311 | −1.144 | 7.938 |
| 609 | 1.944 | 0.864 | 7.938 | −1.335 | −1.178 | 7.938 |
| 610 | 1.974 | 0.878 | 7.938 | −1.354 | −1.205 | 7.938 |
| 611 | 1.996 | 0.888 | 7.938 | −1.364 | −1.228 | 7.938 |
| 612 | 2.012 | 0.897 | 7.938 | −1.366 | −1.246 | 7.938 |
| 613 | 2.019 | 0.909 | 7.938 | −1.364 | −1.256 | 7.938 |
| 614 | 2.020 | 0.917 | 7.938 | −1.361 | −1.262 | 7.938 |
| 615 | 2.019 | 0.922 | 7.938 | −1.359 | −1.265 | 7.938 |
| 616 | 2.018 | 0.924 | 7.938 | −1.357 | −1.266 | 7.938 |

It will also be appreciated that the airfoil 100 disclosed in any one of the above TABLES I through III may be scaled up or down geometrically for use in other similar turbine designs. Consequently, the coordinate values set forth in any one of TABLES I through III may be scaled upwardly or downwardly such that the airfoil profile shape remains unchanged. A scaled version of the coordinates in any one of TABLES I through III would be represented by X, Y, and Z coordinate values, with the X, Y, and Z non-dimensional coordinate values converted to units of distance (e.g., inches), multiplied or divided by a constant number.

As shown in FIG. 4, each airfoil 100 may define a stagger angle α (alpha) measured between the chord line 110 and the axial direction A of the gas turbine 10. Specifically, the stagger angle α may be measured between the chord line 110 of an airfoil 100 and the axial centerline 23 (or rotary axis) of the gas turbine 10 at the trailing edge 108 of the airfoil 100. The stagger angle α of each airfoil 100 disclosed herein may advantageously vary along the span-wise direction 118 (or radial direction R) according to a respective stagger angle distribution. The stagger angle distribution may be a collection of stagger angles α for a given airfoil 100 at each span-wise location (or radial location) along the airfoil 100.

In many embodiments, each stage S1-S22 of rotor blades 44 may include a unique stagger angle distribution, such that the collective utilization of the stages S1-S22 of rotor blades 44 will yield a highly efficient compressor section 14. For example, each of the airfoils 100 of the rotor blades 44 within the first stage S1 may have a first stagger angle distribution, each of the airfoils 100 of the rotor blades 44 within the second stage S2 may have a second stagger angle distribution, and so on for each rotating stage (S1-S22) of the compressor section 14.

Similarly, each stage S1-S22 of stator vanes 50 may include a unique stagger angle distribution, such that the collective utilization of the stages S1-S22 of stator vanes 50 will yield a highly efficient compressor section 14. For example, each of the airfoils 100 of the stator vanes 50 within the first stage S1 may have a first stagger angle distribution, each of the airfoils 100 of the stator vanes 50 within the second stage S2 may have a second stagger angle distribution, and so on for each stationary stage (S1-S22) of the compressor section 14.

Figure 5:
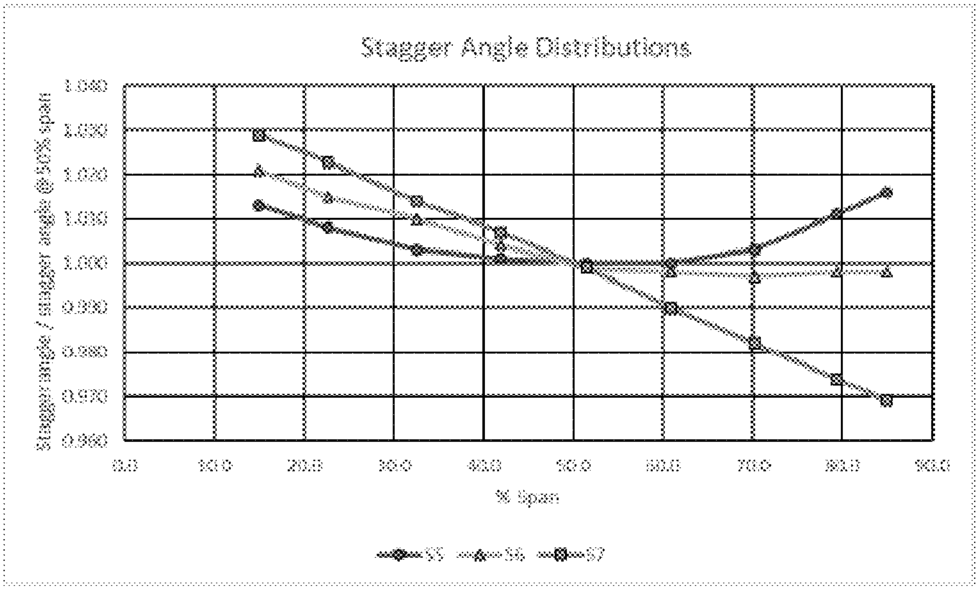
FIG. 5 illustrates a graph of a stagger angle distributions belonging to an airfoil disposed on a stator vane within a fifth stage of a compressor section, an airfoil disposed on a stator vane within a sixth stage of a compressor section, and an airfoil disposed on a stator vane within a seventh stage of a compressor section, in accordance with embodiments of the present disclosure.

In accordance with embodiments of the present disclosure, FIGS. 5 and 6 each illustrate a graph of a stagger angle distribution, which may belong to one or more airfoils 100 within a specified stage (e.g., S1-S22) of the compressor section 14. Each of the graphs may be in non-dimensional units. Specifically, the y-axis illustrates a percentage along the span-wise direction 118 (e.g., with 0% span representing the inner diameter and 100% span representing the outer diameter). For example, with a rotor blade 44, 0% span may represent the base of the airfoil 100, and 100% span may represent the tip of the airfoil 100. As for a stator vane 50, 0% span may represent the tip of the airfoil 100, and 100% span may represent the base of the airfoil 100. The x-axis illustrates a ratio between the stagger angle at a specified span-wise location and the mid-span stagger angle (e.g., at about 50% span).

Each of the stagger angle distributions is plotted between 15% span and 85% span of the respective airfoil 100 to which it belongs (e.g., 0%-15% span and 85%-100% span points are omitted). Each stagger angle distribution, when implemented in an airfoil 100 on a rotor blade 44 and/or a stator vane 50 within the compressor section 14, advantageously increases the aerodynamic efficiency of the airfoil 100 (as well as the entire compressor section 14) when compared to prior designs.

In particular, FIG. 5 is a graph of stagger angle distributions, plotted from 15% to 85% span of an airfoil 100 belonging to a stator vane 50 within the fifth stage S5 (i.e., a fifth stage stator vane); a stator vane 50 within the sixth stage S6 (i.e., a sixth stage stator vane); and a stator vane 50 within the seventh stage S7 (i.e., a seventh stage stator vane). In some embodiments, all of the stator vanes 50 within the fifth stage S5 of the compressor section 14 may include an airfoil 100 having a profile defined by the X, Y, and Z coordinate values of TABLE I and the stagger angle distribution according to TABLE VI and as shown in FIG. 5. Similarly, all of the stator vanes 50 within the sixth stage S6 of the compressor section may include an airfoil 100 having a profile defined by the X, Y, and Z coordinate values of TABLE II and the stagger angle distribution according to TABLE V and as shown in FIG. 5. Likewise, all of the stator vanes 50 within the seventh stage S7 of the compressor section may include an airfoil 100 having a profile defined by the X, Y, and Z coordinate values of TABLE III and the stagger angle distribution according to TABLE VI and as shown in FIG. 5. The stagger angle distributions shown in FIG. 5 are plotted according to the points in TABLES IV through VI below.

TABLE IV

| Stage Five Stator Vane Airfoil Stagger Angle Distribution | |
|---|---|
| (%) Span | — Stagger/midspan stagger |
| 15.00% | 1.013 |
| 22.77% | 1.008 |
| 32.53% | 1.003 |
| 42.14% | 1.001 |
| 51.62% | 1.000 |
| 60.99% | 1.000 |
| 70.26% | 1.003 |
| 79.45% | 1.011 |
| 85.00% | 1.016 |

TABLE V

| Stage Six Stator Vane Airfoil Stagger Angle Distribution | |
|---|---|
| (%) Span | — Stagger/midspan stagger |
| 15.00% | 1.021 |
| 22.51% | 1.015 |
| 32.19% | 1.010 |
| 41.77% | 1.004 |
| 51.28% | 0.999 |
| 60.71% | 0.998 |
| 70.06% | 0.997 |
| 79.34% | 0.998 |
| 85.00% | 0.998 |

TABLE VI

| Stage Seven Stator Vane Airfoil Stagger Angle Distribution | |
|---|---|
| (%) Span | — Stagger/midspan stagger |
| 15.00% | 1.029 |
| 22.96% | 1.023 |
| 32.66% | 1.014 |
| 42.20% | 1.007 |
| 51.64% | 0.999 |
| 60.96% | 0.990 |
| 70.20% | 0.982 |
| 79.37% | 0.974 |
| 85.00% | 0.969 |

The disclosed airfoil shape optimizes and is specific to the machine conditions and specifications. It provides a unique profile to achieve 1) interaction between other stages in the compressor section 14; 2) aerodynamic efficiency; and 3) normalized aerodynamic and mechanical blade loadings. The disclosed loci of points defined in any one of TABLES I through III allow the gas turbine 10 or any other suitable turbine to run in an efficient, safe and smooth manner. As also noted, the disclosed airfoil 100 may be adapted to any scale, as long as 1) interaction between other stages in the compressor section 14; 2) aerodynamic efficiency; and 3) normalized aerodynamic and mechanical blade loadings are maintained in the scaled turbine.

The airfoils 100 described herein thus improve overall gas turbine 10 efficiency. The airfoils 100 also meet all aeromechanical and stress requirements. For example, the airfoils 100 of the stator vanes 50 described herein thus are of specific shapes to meet aerodynamic, mechanical, and heat transfer requirements in an efficient and cost-effective manner.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

Further aspects of the invention are provided by the subject matter of the following clauses:

A stator vane comprising: an airfoil having an airfoil shape, the airfoil shape having a nominal profile substantially in accordance with Cartesian coordinate values of X, Y, and Z set forth in one of TABLE I, TABLE II, or TABLE III, the Cartesian coordinate values of X, Y, and Z being defined relative to a point data origin at a base of the airfoil, wherein the Cartesian coordinate values of X, Y, and Z are non-dimensional values that are convertible to dimensional distances expressed in a unit of distance by multiplying the Cartesian coordinate values of X, Y, and Z by a scaling factor of the airfoil in the unit of distance; and wherein X and Y values are connected by smooth continuing arcs to define airfoil profile sections at each Z value, the airfoil profile sections at Z values being joined smoothly with one another to form a complete airfoil shape.

The stator vane of the preceding clause, wherein the airfoil includes a stagger angle distribution, each stagger angle in the stagger angle distribution being measured between a chord line of the airfoil and a rotary axis of the airfoil; wherein, when the airfoil is defined by the Cartesian coordinate values of X, Y, and Z set forth in TABLE I, the stagger angle distribution is defined in accordance with TABLE IV; wherein, when the airfoil is defined by the Cartesian coordinate values of X, Y, and Z set forth in TABLE II, the stagger angle distribution is defined in accordance with TABLE V; and wherein, when the airfoil is defined by the Cartesian coordinate values of X, Y, and Z set forth in TABLE III, the stagger angle distribution is defined in accordance with TABLE VI.

The stator vane of any preceding clause, wherein the stator vane is a fifth stage compressor stator vane.

The stator vane of any of the first two clauses, wherein the stator vane is a sixth stage compressor stator vane.

The stator vane of any of the first two clauses, wherein the stator vane is seventh stage compressor stator vane.

The stator vane of any preceding clause, wherein the airfoil shape lies in an envelope within +/−5% of a chord length in a direction normal to any airfoil surface location.

The stator vane of any preceding clause, wherein the scaling factor is between about 0.01 inches and about 10 inches.

The stator vane of any preceding clause, wherein the X, Y, and Z values are scalable as a function of the same constant or number to provide a scaled-up or scaled-down airfoil.

A stator vane comprising: an airfoil having a nominal suction-side profile substantially in accordance with suction-side Cartesian coordinate values of X, Y, and Z set forth in one of TABLE I, TABLE II, or TABLE III, the Cartesian coordinate values of X, Y, and Z being defined relative to a point data origin at a base of the airfoil, wherein the Cartesian coordinate values of X, Y, and Z are non-dimensional values that are convertible to dimensional distances expressed in a unit of distance by multiplying the Cartesian coordinate values of X, Y, and Z by a scaling factor of the airfoil in the unit of distance; and wherein X and Y values are connected by smooth continuing arcs to define suction-side profile sections at each Z value, the suction-side profile sections at the Z values being joined smoothly with one another to form a complete airfoil suction-side shape.

The stator vane of the preceding clause, wherein the airfoil includes a stagger angle distribution, each stagger angle in the stagger angle distribution being measured between a chord line of the airfoil and a rotary axis of the airfoil; wherein, when the airfoil has the nominal suction-side profile defined by the Cartesian coordinate values of X, Y, and Z set forth in TABLE I, the stagger angle distribution is defined in accordance with TABLE IV; wherein, when the airfoil is defined by the Cartesian coordinate values of X, Y, and Z set forth in TABLE II, the stagger angle distribution is defined in accordance with TABLE V; and wherein, when the airfoil is defined by the Cartesian coordinate values of X, Y, and Z set forth in TABLE III, the stagger angle distribution is defined in accordance with TABLE VI.

The stator vane of any preceding clause, wherein the stator vane is a fifth stage compressor stator vane.

The stator vane of any preceding clause, wherein the stator vane is a sixth stage compressor stator vane.

The stator vane of any preceding clause, wherein the stator vane is a seventh stage compressor stator vane.

The stator vane of any preceding clause, wherein the nominal suction-side profile lies in an envelope within +/−5% of a chord length in a direction normal to any airfoil surface location.

The stator vane of any preceding clause, wherein the scaling factor is between about 0.01 inches and about 10 inches.

The stator vane of any preceding clause, wherein the X, Y, and Z values are scalable as a function of the same constant or number to provide a scaled-up or scaled-down airfoil.

A turbomachine comprising: a compressor section; a turbine section downstream from the compressor section; a combustion section downstream from the compressor section and upstream from the turbine section; and a stator vane disposed within the compressor section, the stator vane comprising: an airfoil having an airfoil shape, the airfoil shape having a nominal profile substantially in accordance with Cartesian coordinate values of X, Y, and Z set forth in one of TABLE I, TABLE II, or TABLE III, the Cartesian coordinate values of X, Y, and Z being defined relative to a point data origin at a base of the airfoil, wherein the Cartesian coordinate values of X, Y, and Z are non-dimensional values that are convertible to dimensional distances expressed in a unit of distance by multiplying the Cartesian coordinate values of X, Y, and Z by a height of the airfoil in the unit of distance; and wherein X and Y values are connected by smooth continuing arcs to define airfoil profile sections at each Z value, the airfoil profile sections at Z values being joined smoothly with one another to form a complete airfoil shape.

The turbomachine of the preceding clause, wherein the airfoil includes a stagger angle distribution, each stagger angle in the stagger angle distribution being measured between a chord line of the airfoil and a rotary axis of the airfoil; wherein, when the airfoil has the nominal suction-side profile defined by the Cartesian coordinate values of X, Y, and Z set forth in TABLE I, the stagger angle distribution is defined in accordance with TABLE IV; wherein, when the airfoil is defined by the Cartesian coordinate values of X, Y, and Z set forth in TABLE II, the stagger angle distribution is defined in accordance with TABLE V; and wherein, when the airfoil is defined by the Cartesian coordinate values of X, Y, and Z set forth in TABLE III, the stagger angle distribution is defined in accordance with TABLE VI.

The turbomachine of any preceding clause, wherein a fifth stage of the compressor section includes a plurality of stator vanes defined according to TABLE I, a sixth stage of the compressor section includes a plurality of stator vanes defined according to TABLE II, and a seventh stage of the compressor section includes a plurality of stator vanes defined according to TABLE III.

What is claimed is:

1. A stator vane comprising:

an airfoil having an airfoil shape, the airfoil shape having a nominal profile substantially in accordance with Cartesian coordinate values of X, Y, and Z set forth in one of TABLE I, TABLE II, or TABLE III, the Cartesian coordinate values of X, Y, and Z being defined relative to a point data origin at a base of the airfoil, wherein the Cartesian coordinate values of X, Y, and Z are non-dimensional values that are convertible to dimensional distances expressed in a unit of distance by multiplying the Cartesian coordinate values of X, Y, and Z by a scaling factor of the airfoil in the unit of distance; and wherein X and Y values are connected by smooth continuing arcs to define airfoil profile sections at each Z value, the airfoil profile sections at Z values being joined smoothly with one another to form a complete airfoil shape.

2. The stator vane of claim 1, wherein the airfoil includes a stagger angle distribution, each stagger angle in the stagger angle distribution being measured between a chord line of the airfoil and a rotary axis of the airfoil; wherein, when the airfoil is defined by the Cartesian coordinate values of X, Y, and Z set forth in TABLE I, the stagger angle distribution is defined in accordance with TABLE IV; wherein, when the airfoil is defined by the Cartesian coordinate values of X, Y, and Z set forth in TABLE II, the stagger angle distribution is defined in accordance with TABLE V; and wherein, when the airfoil is defined by the Cartesian coordinate values of X, Y, and Z set forth in TABLE III, the stagger angle distribution is defined in accordance with TABLE VI.

3. The stator vane of claim 1, wherein the stator vane is a fifth stage compressor stator vane.

4. The stator vane of claim 1, wherein the stator vane is a sixth stage compressor stator vane.

5. The stator vane of claim 1, wherein the stator vane is seventh stage compressor stator vane.

6. The stator vane of claim 1, wherein the airfoil shape lies in an envelope within +/−5% of a chord length in a direction normal to any airfoil surface location.

7. The stator vane of claim 1, wherein the scaling factor is between about 0.01 inches and about 10 inches.

8. The stator vane of claim 1, wherein the X, Y, and Z values are scalable as a function of the same constant or number to provide a scaled-up or scaled-down airfoil.

9. A stator vane comprising:

an airfoil having a nominal suction-side profile substantially in accordance with suction-side Cartesian coordinate values of X, Y, and Z set forth in one of TABLE I, TABLE II, or TABLE III, the Cartesian coordinate values of X, Y, and Z being defined relative to a point data origin at a base of the airfoil, wherein the Cartesian coordinate values of X, Y, and Z are non-dimensional values that are convertible to dimensional distances expressed in a unit of distance by multiplying the Cartesian coordinate values of X, Y, and Z by a scaling factor of the airfoil in the unit of distance; and wherein X and Y values are connected by smooth continuing arcs to define suction-side profile sections at each Z value, the suction-side profile sections at the Z values being joined smoothly with one another to form a complete airfoil suction-side shape.

10. The stator vane of claim 9, wherein the airfoil includes a stagger angle distribution, each stagger angle in the stagger angle distribution being measured between a chord line of the airfoil and a rotary axis of the airfoil; wherein, when the airfoil has the nominal suction-side profile defined by the Cartesian coordinate values of X, Y, and Z set forth in TABLE I, the stagger angle distribution is defined in accordance with TABLE IV; wherein, when the airfoil is defined by the Cartesian coordinate values of X, Y, and Z set forth in TABLE II, the stagger angle distribution is defined in accordance with TABLE V; and wherein, when the airfoil is defined by the Cartesian coordinate values of X, Y, and Z set forth in TABLE III, the stagger angle distribution is defined in accordance with TABLE VI.

11. The stator vane of claim 9, wherein the stator vane is a fifth stage compressor stator vane.

12. The stator vane of claim 9, wherein the stator vane is a sixth stage compressor stator vane.

13. The stator vane of claim 9, wherein the stator vane is a seventh stage compressor stator vane.

14. The stator vane of claim 9, wherein the nominal suction-side profile lies in an envelope within +/−5% of a chord length in a direction normal to any airfoil surface location.

15. The stator vane of claim 9, wherein the scaling factor is between about 0.01 inches and about 10 inches.

16. The stator vane of claim 9, wherein the X, Y, and Z values are scalable as a function of the same constant or number to provide a scaled-up or scaled-down airfoil.

17. A turbomachine comprising:

a compressor section;

a turbine section downstream from the compressor section;

a combustion section downstream from the compressor section and upstream from the turbine section; and a stator vane disposed within the compressor section, the stator vane comprising:

an airfoil having an airfoil shape, the airfoil shape having a nominal profile substantially in accordance with Cartesian coordinate values of X, Y, and Z set forth in one of TABLE I, TABLE II, or TABLE III, the Cartesian coordinate values of X, Y, and Z being defined relative to a point data origin at a base of the airfoil, wherein the Cartesian coordinate values of X, Y, and Z are non-dimensional values that are convertible to dimensional distances expressed in a unit of distance by multiplying the Cartesian coordinate values of X, Y, and Z by a height of the airfoil in the unit of distance; and wherein X and Y values are connected by smooth continuing arcs to define airfoil profile sections at each Z value, the airfoil profile sections at Z values being joined smoothly with one another to form a complete airfoil shape.

18. The turbomachine of claim 17, wherein the airfoil includes a stagger angle distribution, each stagger angle in the stagger angle distribution being measured between a chord line of the airfoil and a rotary axis of the airfoil; wherein, when the airfoil has the nominal suction-side profile defined by the Cartesian coordinate values of X, Y, and Z set forth in TABLE I, the stagger angle distribution is defined in accordance with TABLE IV; wherein, when the airfoil is defined by the Cartesian coordinate values of X, Y, and Z set forth in TABLE II, the stagger angle distribution is defined in accordance with TABLE V; and wherein, when the airfoil is defined by the Cartesian coordinate values of X, Y, and Z set forth in TABLE III, the stagger angle distribution is defined in accordance with TABLE VI.

19. The turbomachine of claim 17, wherein a fifth stage of the compressor section includes a plurality of stator vanes defined according to TABLE I, a sixth stage of the compressor section includes a plurality of stator vanes defined according to TABLE II, and a seventh stage of the compressor section includes a plurality of stator vanes defined according to TABLE III.

* * * * *